US012739726B2

(12) United States Patent
Wu

(10) Patent No.: US 12,739,726 B2
(45) Date of Patent: Sep. 15, 2026

(54) MANAGING UE CONFIGURATIONS WHEN A CONDITIONAL PROCEDURE FAILS

(71) Applicant: GOOGLE LLC, Mountain View, CA (US)

(72) Inventor: Chih-Hsiang Wu, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 227 days.

(21) Appl. No.: 18/271,207

(22) PCT Filed: Jan. 7, 2022

(86) PCT No.: PCT/US2022/011578
§ 371 (c)(1),
(2) Date: Jul. 6, 2023

(87) PCT Pub. No.: WO2022/150565
PCT Pub. Date: Jul. 14, 2022

(65) Prior Publication Data

US 2024/0073771 A1 Feb. 29, 2024

Related U.S. Application Data

(60) Provisional application No. 63/199,550, filed on Jan. 7, 2021.

(51) Int. Cl.
*H04W 36/36* (2009.01)
*H04W 36/00* (2009.01)

(52) U.S. Cl.
CPC ..... *H04W 36/362* (2023.05); *H04W 36/0079* (2018.08); *H04W 36/36* (2013.01)

(58) Field of Classification Search
CPC ............................ H04W 36/362; H04W 36/36
(Continued)

(56) References Cited

U.S. PATENT DOCUMENTS

2015/0289266 A1* 10/2015 Hsu .................. H04W 72/0446 370/329
2019/0373441 A1* 12/2019 Ryu ........................ H04W 8/08
(Continued)

FOREIGN PATENT DOCUMENTS

ES 2749953 T3 3/2020
WO WO-2021/092102 A1 5/2021
WO WO-2021/162802 A1 8/2021

OTHER PUBLICATIONS

International Search Report and Written Opinion for Application No. PCT/US2022/011578, dated Apr. 7, 2022.
(Continued)

*Primary Examiner* — Qutbuddin Ghulamali
(74) *Attorney, Agent, or Firm* — MARSHALL, GERSTEIN & BORUN LLP

(57) ABSTRACT

A user equipment (UE) in communication with a radio access network (RAN) in accordance with a first configuration (i) receives (1102) from the RAN, a conditional configuration for application in a conditional procedure when a corresponding condition is satisfied; (ii) subsequently to receiving the conditional configuration, applies (1104) a second configuration received from the RAN; (iii) detects (1106), after applying the second configuration, a failure to execute the conditional procedure; and (iv) in response to the detecting, continues (1108) to apply the second configuration or notifies the RAN of the UE reverting back to the first configuration.

15 Claims, 35 Drawing Sheets

(58) Field of Classification Search
USPC .......................................................... 455/436
See application file for complete search history.

(56) References Cited

U.S. PATENT DOCUMENTS

| | | | | |
|---|---|---|---|---|
| 2022/0022121 | A1 * | 1/2022 | Eklöf | H04W 36/00837 |
| 2022/0070740 | A1 * | 3/2022 | Futaki | H04W 36/0061 |
| 2022/0191751 | A1 * | 6/2022 | Rune | H04W 36/0058 |
| 2022/0232448 | A1 * | 7/2022 | Ebrahim Rezagah | H04W 36/305 |
| 2022/0295366 | A1 * | 9/2022 | Teyeb | H04W 76/30 |
| 2022/0386191 | A1 * | 12/2022 | Wu | H04W 28/18 |

OTHER PUBLICATIONS

Nokia et al., “MN-Initiated Reconfigurations During Conditional PSCell Change,” 3GPP Draft (Feb. 14, 2020).
Ericsson, “Inability to Comply with Conditional Reconfiguration,” 3GPP Draft (Oct. 22, 2020).
“3rd Generation Partnership Project; Technical Specification Group Radio Access Network; NR; Radio Resource Control (RRC) Protocol Specification (Release 16),” 3GPP Standard Technical Specification (Jan. 6, 2021).
Nokia et al., “Configuration Management for Conditional Handover,” 3GPP Draft (Feb. 16, 2018).
Qualcomm Incorporation, “LTE Conditional HO Design Consideration,” 3GPP Draft (Mar. 29, 2019).
“3rd Generation Partnership Project; Technical Specification Group Radio Access Network; Evolved Universal Terrestrial Radio Access (E-UTRA) and NR; Multi-connectivity; Stage 2 (Release 16),” 3GPP TS 37.340 V16.3.0 (2020).
“3rd Generation Partnership Project; Technical Specification Group Radio Access Network; Evolved Universal Terrestrial Radio Access (E-UTRA); Packet Data Convergence Protocol (PDCP) specification (Release 16),” 3GPP TS 36.323 V16.3.0 (2020).
“3rd Generation Partnership Project; Technical Specification Group Radio Access Network; Evolved Universal Terrestrial Radio Access (E-UTRA); Radio Resource Control (RRC); Protocol specification (Release 16),” 3GPP TS 36.331 V16.2.1 (2020).
“3rd Generation Partnership Project; Technical Specification Group Radio Access Network; NR; Packet Data Convergence Protocol (PDCP) specification (Release 16),” 3GPP TS 38.323 V16.2.0 (2020).
“3rd Generation Partnership Project; Technical Specification Group Radio Access Network; NR; Radio Resource Control (RRC) protocol specification (Release 16),” 3GPP TS 38.331 V16.2.0 (2020).
First Examination Report for India Application No. 202347048820, dated Jul. 13, 2026.

* cited by examiner

MANAGING UE CONFIGURATIONS WHEN A CONDITIONAL PROCEDURE FAILS

CROSS-REFERENCE TO RELATED APPLICATIONS

This patent application is a national stage application, filed under 35 U.S.C. § 371, of International Application No. PCT/US2022/011578, filed Jan. 7, 2022 and entitled "MANAGING UE CONFIGURATIONS WHEN A CONDITIONAL PROCEDURE FAILS," which claims priority to U.S. Provisional Application No. 63/199,550, filed Jan. 7, 2021 and entitled "MANAGING UE CONFIGURATIONS WHEN A CONDITIONAL PROCEDURE FAILS," the disclosures of which are incorporated by reference herein in their entireties.

This disclosure relates generally to wireless communications and, more particularly, to managing a failure caused by a conditional procedure.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides signaling radio bearers (SRBs) and data radio bearers (DRBs) to the Radio Resource Control (RRC) sublayer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating as the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. MCG DRBs use the lower-layer resources of only the MN, SCG DRBs use the lower-layer resources of only the SN, and split DRBs use the lower-layer resources of both the MCG and the SCG. DRBs terminated at the MN but using the lower-layer resources of only the SN can be referred to as MN-terminated SCG DRBs. DRBs terminated at the SN but using the lower-layer resources of only the MN can be referred to as SN-terminated MCG DRBs.

The UE in some scenarios can concurrently utilize resources of multiple RAN nodes (e.g., base stations or components of a distributed base station), interconnected by a backhaul. When these network nodes support different radio access technologies (RATs), this type of connectivity is referred to as Multi-Radio Dual Connectivity (MR-DC). When a UE operates in MR-DC, one base station operates as an MN that covers a primary cell (PCell), and the other base station operates as an SN that covers a primary secondary cell (PSCell). The UE communicates with the MN (via the PCell) and the SN (via the PSCell). In other scenarios, the UE utilizes resources of one base station at a time. One base station and/or the UE determines that the UE should establish a radio connection with another base station. For example, one base station can determine to hand the UE over to the second base station, and initiate a handover procedure.

3GPP technical specifications (TS) 36.300 and 38.300 (v16.3.0) describes procedures for handover (or called reconfiguration with sync) scenarios. When these procedures do not involve conditions that are checked at the UE, these procedures can be referred to as immediate or non-conditional handover procedures. When these procedures involve conditions that are checked at the UE, these procedures can be referred to as conditional handover (CHO) procedures.

3GPP TS 37.340 (v16.3.0) describes procedures for a UE to change PSCells in DC scenarios. These procedures involve messaging (e.g., RRC signaling and preparation) between radio access network (RAN) nodes. When these procedures do not involve conditions that are checked at the UE, these procedures can be referred to as immediate or non-conditional PSCell change procedures. When these procedures involve conditions that are checked at the UE, these procedures can be referred to as conditional PSCell change (CPC) procedures.

3GPP specification TS 37.340 v16.3.0 describes procedures for a UE to add or change an SN in DC scenarios. These procedures involve messaging (e.g., RRC signaling and preparation) between RAN nodes. When these procedures do not involve conditions that are checked at the UE, these procedures can be referred to as immediate or non-conditional SN addition/change procedures. When these procedures involve conditions that are checked at the UE, these procedures can be referred to as conditional SN addition/change (CSAC) procedures, also known as conditional PSCell addition/change (CPAC) procedures.

To configure a CHO, CSAC, or CPC procedure, the RAN provides a condition to the UE, along with a configuration (e.g., a set of random-access preambles, etc.) that will enable the UE to communicate with the appropriate base station, or via the appropriate cell, when the condition is satisfied. For example, for CHO, the RAN provides the UE with a condition to be satisfied before the UE can add a candidate base station or a candidate PCell, and a configuration that enables the UE to communicate with that candidate base station or candidate PCell after the condition has been satisfied. As another example, for CSAC or CPC, the RAN provides the UE with a condition to be satisfied before the UE can add a candidate base station as an SN or a candidate PSCell, and a configuration that enables the UE to communicate with that candidate base station or candidate PSCell after the condition has been satisfied. As such, in each of the CHO, CSAC, or CPC procedures, the UE does not immediately apply the conditional configuration upon receiving the conditional configuration; the UE waits until a condition is satisfied to apply the conditional configuration.

In some scenarios, when the UE determines that a condition associated with a conditional configuration for a CHO, CSAC, or CPC procedure is satisfied, the UE is unable to comply with the conditional configuration (or at least part of the conditional configuration), and thus fails to apply the conditional configuration. This results in a failure to execute the CHO, CSAC, or CPC. According to the existing standards (e.g., 3GPP TS 38.331 v16.2.0), it is not clear how the UE and the RAN should manage prior non-conditional configurations when a failure to successfully apply a conditional configuration occurs.

SUMMARY

Generally speaking, a RAN and/or UE implement a mechanism for managing configurations while recovering from a failed conditional procedure, such as a failed CHO, CSAC, or CPC procedure. In some implementations, when the UE fails to apply a conditional configuration for a conditional procedure, the UE utilizes any configuration(s) received from the RAN subsequent to the conditional configuration, to match those utilized by the RAN. Usage of consistent configuration(s) avoids communication failure between the UE and the RAN due to mismatched configurations. In other implementations, the UE utilizes a configuration received from the RAN prior to receiving the conditional configuration, and the RAN uses configuration(s) that are compatible with the configuration the UE uses.

One example embodiment of these techniques is a configuration method implemented in a UE in communication with a RAN in accordance with a first configuration. The method can be executed by processing hardware and includes receiving, from the RAN, a conditional configuration for application in a conditional procedure when a corresponding condition is satisfied; subsequently to receiving the conditional configuration, applying a second configuration received from the RAN; detecting, after applying the second configuration, a failure to execute the conditional procedure; and in response to the detecting, continuing to apply the second configuration or notifying the RAN of the UE reverting back to the first configuration. Another example embodiment of these techniques is a UE including processing hardware configured to execute the method above.

Yet another example embodiment of these techniques is a method in a RAN for configuring a UE in communication with the RAN in accordance with a first configuration. The method can be executed by processing hardware and includes transmitting, to the UE, a conditional configuration for application in a conditional procedure when a corresponding condition is satisfied; subsequently to transmitting the conditional configuration, transmitting a second configuration to the UE; receiving, from the UE, an indication that the UE has failed to perform the conditional procedure; and in response to the indication, continuing to use the first configuration to communicate with the UE. Still another embodiment of these techniques is one or more network nodes including processing hardware configured to execute the method above.

DETAILED DESCRIPTION OF THE DRAWINGS

As discussed in detail below, a UE and/or a base station manage a configuration, after the UE encounters reconfiguration failure or conditional procedure execution failure when a condition for performing a conditional procedure is satisfied. The UE and base station can continue to communicate with each other after recovering the failure. The UE and base station can implement the techniques discussed below to retain a configuration for communication after recovering the failure.

Figure 1A:
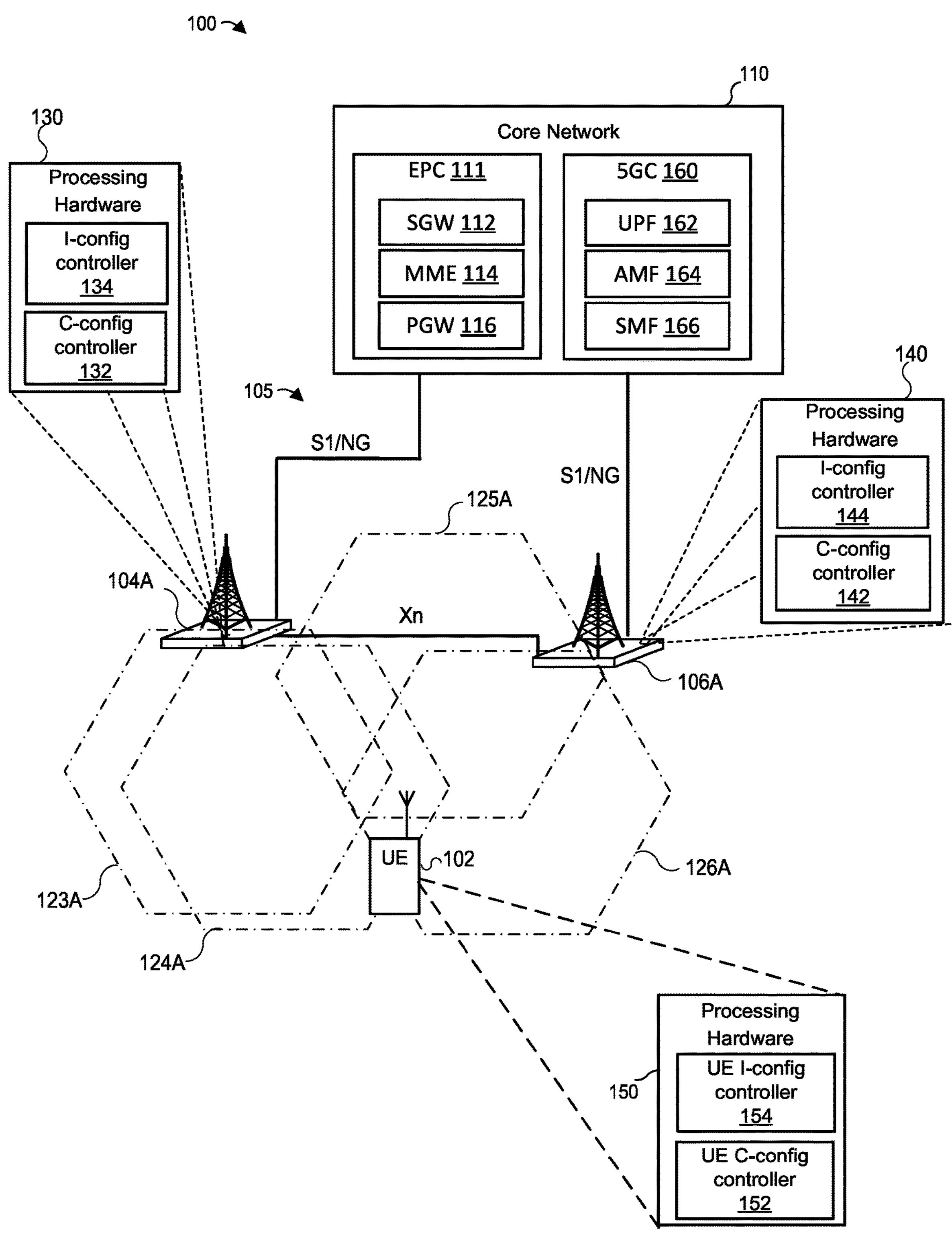
FIG. 1A is a block diagram of an example system in which a RAN and UE can implement the techniques for managing configurations when recovering from a failed conditional procedure.

Referring first to FIG. 1A, an example wireless communication system 100 includes a UE 102, a base station (BS) 104A, a base station 106A, and a core network (CN) 110. The base stations 104A and 106A can operate in a RAN 105 connected to the same core network (CN) 110. The CN 110 can be implemented as an evolved packet core (EPC) 111 or a fifth generation (5G) core (5GC) 160, for example.

Among other components, the EPC 111 can include a Serving Gateway (SGW) 112, a Mobility Management Entity (MME) 114, and a Packet Data Network Gateway (PGW) 116. The SGW 112 in general is configured to transfer user-plane packets related to audio calls, video calls, Internet traffic, etc., and the MME 114 is configured to manage authentication, registration, paging, and other related functions. The PGW 116 is generally configured to provide connectivity from the UE 102 to one or more external packet data networks, e.g., an Internet network and/or an Internet Protocol (IP) Multimedia Subsystem (IMS) network. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1A, the base station 104A supports a cell 124A, and the base station 106A supports a cell 126A. The cells 124A and 126A can partially overlap, so that the UE 102 can communicate in DC with the base station 104A and the base station 106A operating as an MN and an SN, respectively. The base station 104A can additionally support a cell 123A which can overlap with the cell 124A. The base station 106A can additionally support a cell 125A which can overlap with the cell 126A. To directly exchange messages during DC scenarios and other scenarios discussed below, the MN 104A and the SN 106A can support an X2 or Xn interface. In general, the CN 110 can connect to any suitable number of base stations supporting NR cells and/or EUTRA cells. An example configuration in which the EPC 110 is connected to additional base stations is discussed below with reference to FIG. 1B.

The base station 104A is equipped with processing hardware 130 that can include one or more general-purpose processors such as CPUs and non-transitory computer-readable memory storing machine-readable instructions executable on the one or more general-purpose processors, and/or special-purpose processing units. The processing hardware 130 in an example implementation includes a conditional configuration controller 132 configured to manage conditional configuration(s) for one or more conditional procedures (e.g., CHO, CPC, and/or CSAC procedures), when the base station 104A operates as an MN. The processing hardware 130 also includes an immediate configuration controller 134 configured to manage immediate configuration(s) for one or more immediate procedures (e.g., RRC connection reestablishment, RRC reconfiguration, SCG failure information, immediate handover, and/or immediate PSCell addition/change with or without SN change procedures).

The base station 106A is equipped with processing hardware 140 that can also include one or more general-purpose processors such as CPUs and non-transitory computer-readable memory storing machine-readable instructions executable on the one or more general-purpose processors, and/or special-purpose processing units. The processing hardware 140 in an example implementation includes a conditional configuration controller 142 configured to manage conditional configuration(s) for one or more conditional procedures (e.g., CHO, CPC, and/or CSAC procedures), when the base station 106A operates as an SN. The processing hardware 140 also includes an immediate configuration controller 144 configured to manage immediate configuration(s) for one or more immediate procedures (e.g., RRC connection reestablishment, RRC reconfiguration, SCG failure information, immediate handover, and/or immediate PSCell addition/change with or without SN change procedures).

Still referring to FIG. 1A, the UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes a UE conditional configuration controller 152 configured to manage conditional configuration(s) for one or conditional procedures (e.g., CHO, CPC, and/or CSAC procedures). The processing hardware 150 also includes an immediate configuration controller 154 configured to manage immediate configuration(s) for one or more immediate procedures (e.g., RRC connection reestablishment, RRC reconfiguration, SCG failure information, immediate handover, and/or immediate PSCell addition/change with or without SN change procedures).

More particularly, each of the conditional configuration controllers 132, 142, and 152 can implement at least some of the techniques discussed with reference to the messaging and flow diagrams below to receive a conditional configuration, release the conditional configuration in response to certain events, apply the conditional configuration, etc. For example, when the UE 102 determines that a condition associated with a conditional configuration for CHO, CPC, or CSAC is satisfied, the UE 102 can apply the conditional configuration. As used herein, the term "condition" may refer to a single, detectable state or event (e.g., a particular signal quality metric exceeding a threshold), or to a logical combination of such states or events (e.g., Condition A and Condition B, or (Condition A or Condition B) and Condition C, etc.). Although FIG. 1A illustrates the conditional configuration controllers 132 and 142 as separate components, in at least some of the scenarios the base stations 104A and 106A can have similar implementations and in different scenarios operate as MN or SN nodes. In these implementations, each of the base stations 104A and 106A can implement both the conditional configuration controller 132 and the conditional configuration controller 142 to support MN and SN functionality, respectively.

In operation, the UE 102 can use a radio bearer (e.g., a DRB or an SRB) that at different times terminates at the MN 104A or the SN 106A. The UE 102 can apply one or more security keys when communicating on the radio bearer, in the uplink (from the UE 102 to a BS) and/or downlink (from a BS to the UE 102) direction. The UE 102 in some cases can use different RATs to communicate with the base stations 104A and 106A. Although the examples below may refer specifically to specific RAT types, 5G NR or EUTRA, in general the techniques of this disclosure also can apply to other suitable radio access and/or core network technologies.

Figure 1B:
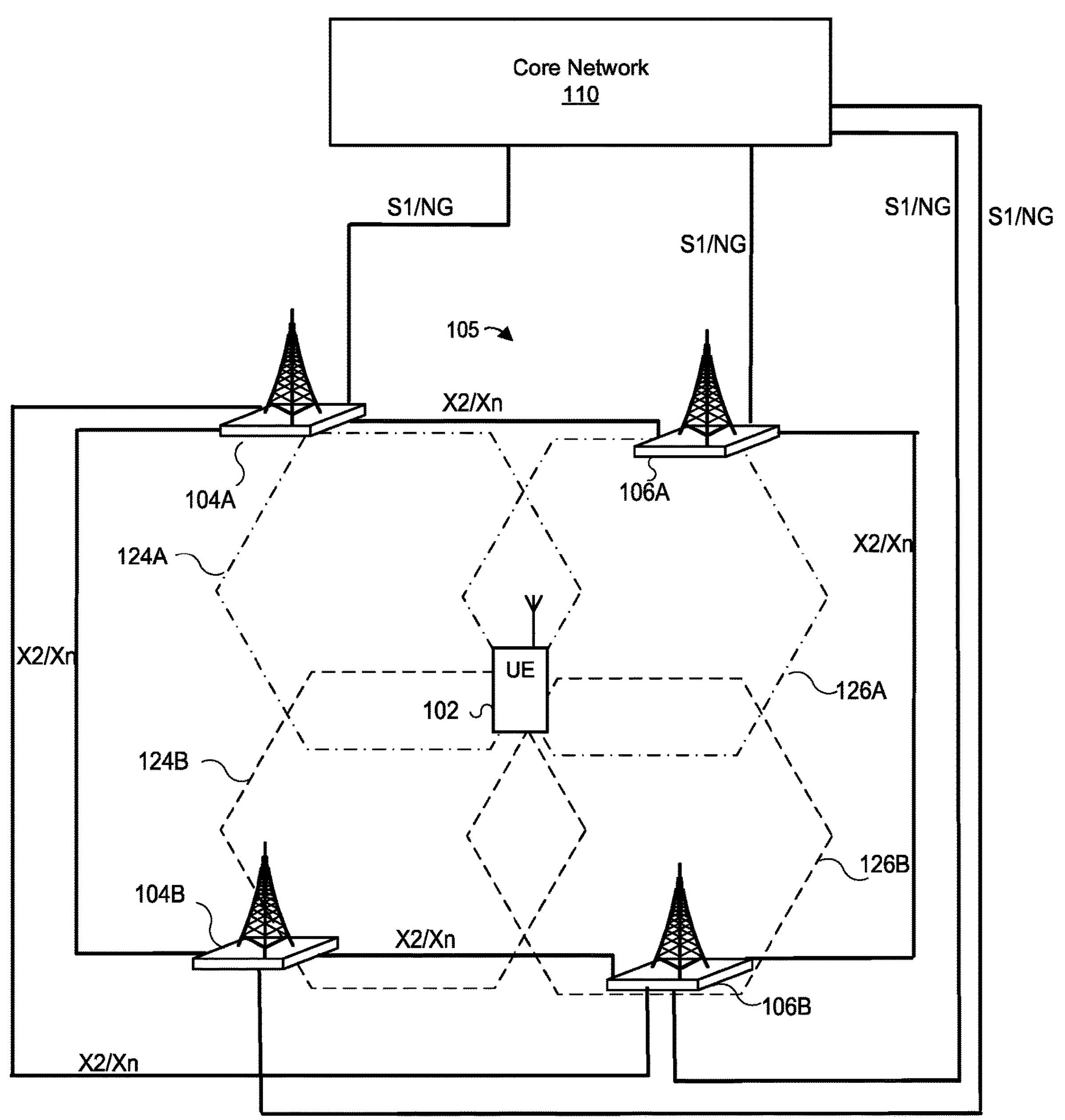
FIG. 1B is another block diagram of an example system in which a RAN and UE can implement the techniques of this disclosure for managing configurations while recovering from a failed conditional procedure.

FIG. 1B depicts an example wireless communication system 100 in which communication devices can implement these techniques. The wireless communication system 100 includes a UE 102, a base station 104A, a base station 104B, a base station 106A, a base station 106B and a CN 110. The base stations 104B and 106B may have similar processing hardware as the base station 106A. The wireless communication system 100 may support various mobility procedures (e.g., immediate or conditional handover, immediate or conditional SN addition, etc.) and modes of operation (e.g., SC or DC).

In some scenarios, the wireless communication system 100 supports immediate handovers between cells. In one scenario, for example, the UE 102 initially connects to the base station 104A, and the base station 104A later performs preparation for an immediate handover with the base station 106A via an interface (e.g., X2 or Xn). In this scenario, the base stations 104A and 106A operate as a source base station and a target base station, respectively. In the handover preparation, the source base station 104A sends a Handover Request message to the target base station 106A. In response, the target base station 106A includes an immediate handover command message in a Handover Request Acknowledge message, and sends the Handover Request Acknowledge message to the source base station 104A. The source base station 104A then transmits a handover command message to the UE 102 in response to receiving the Handover Request Acknowledge message.

Upon receiving the immediate handover command message, the UE 102 immediately reacts to the immediate handover command, by attempting to connect to the target base station 106A. To connect to the target base station 106A, the UE 102 may perform a random access procedure with the target base station 106A, and then (after gaining access to a channel) transmit a handover complete message to the target base station 106A via a cell (e.g., cell 126A) of the base station 106A (i.e., in response to the immediate handover command).

In some implementations, the wireless communication system 100 also supports conditional handovers. In one scenario, for example, the UE 102 initially connects to the base station 104A, and the base station 104A later performs a conditional handover preparation procedure with the base station 104B via an interface (e.g., X2 or Xn) to prepare for a potential handover of the UE 102 to the base station 104B. In this scenario, the base stations 104A and 104B operate a source base station and a candidate base station, respectively. In the conditional handover preparation procedure, the source base station 104A sends a Handover Request message to the candidate base station 104B. In response, the candidate base station 104B includes a conditional handover command message in a Handover Request Acknowledge message, and sends the Handover Request Acknowledge message to the source base station 104A. The source base station 104A then transmits the conditional handover command message to the UE 102, in response to receiving the Handover Request Acknowledge message.

Upon receiving the conditional handover command message, the UE 102 does not immediately react to the message by attempting to connect to the candidate base station 104B. Instead, the UE 102 connects to the candidate base station 104B according to the conditional handover command message only if the UE 102 determines that a condition is satisfied for handing over to a candidate cell 124B of the candidate base station 104B. The base station 104B provides a configuration for the candidate cell 124B (i.e., a configuration that the UE 102 can use to connect with the base station 104B via the candidate cell 124B) in the conditional handover command message.

Before the condition is met, the UE 102 has not yet connected to the candidate base station 104B. In other words, the candidate base station 104B has not yet connected and served the UE 102. In some implementations, the condition can be that a signal strength/quality, as measured by the UE 102 on the candidate cell 124B of the candidate base station 104B, is "good" enough, and/or a signal strength/quality, as measured by the UE 102 on the cell 124A of the source base station 104A, is poor. For example, the condition may be satisfied if one or more measurement results obtained by the UE 102 (when performing measurements on the candidate cell 126A) exceed a threshold that is configured by the source base station 104A, which could be a pre-determined or pre-configured threshold, and/or if one or more measurement results obtained by the UE 102 (when performing measurements on the candidate cell 124B) exceed a threshold that is configured by the source base station 104A, which could be a pre-determined or pre-configured threshold. In some implementations, the condition can be that a signal strength/quality, as measured by the UE 102 on the candidate cell 124B is better than a signal strength/quality, as measured by the UE 102 on the cell 124A, by at least some threshold value (e.g., at least an offset). The threshold value can be configured by the source base station 104A or a pre-determined or pre-configured offset. If the UE 102 determines that the condition is satisfied, the candidate base station 104B becomes the target base station 104B for the UE 102, and the UE 102 attempts to connect to the target base station 104B. To connect to the target base station 104B, the UE 102 may perform a random access procedure with the target base station 104B, and then (after gaining access to a channel) transmit a handover complete message via the candidate cell 124B to the target base station 104B. After the UE 102 successfully completes the random access procedure and/or transmits the handover complete message, the target base station 104B becomes the source base station 104B for the UE 102, and the UE 102 starts communicating data with the source base station 104B.

In some scenarios, the base station 104A can perform an immediate SN addition procedure to configure the UE 102 to operate in DC with the base station 104A (via a PCell 123A) and the base station 106A (via a PSCell 125A), as illustrated in FIG. 1A. The base stations 104A and 106A operate as an MN and an SN for the UE 102, respectively. The UE 102 in some cases can operate using the MR-DC connectivity mode, e.g., communicate with the base station 104A using 5G NR and communicate with the base station 106A using EUTRA, or communicate with the base station 104A using EUTRA and communicate with the base station 106A using 5G NR.

At some point, the MN 104A or the SN 106A can perform an immediate PSCell change procedure to change the PSCell of the UE 102 from the PSCell 125A to PSCell 126A while the UE 102 is in DC with the MN 104A and the SN 106A. Alternatively, the MN 104A can perform an immediate SN change procedure to change the SN of the UE 102 from the base station 106A (source SN, or "S-SN") to the base station 104B (target SN, or "T-SN") while the UE 102 is in DC with the MN 104A and the S-SN 106A. In another scenario, the SN 106A can perform an immediate PSCell change procedure to change the PSCell of the UE 102 from the PSCell 125A to PSCell 126A. In one implementation, the SN 106A can transmit a configuration changing the PSCell to cell 126A to the UE 102 via a signaling radio bearer (SRB) (e.g., SRB3) for the immediate PSCell change procedure. In another implementation, the SN 106A can transmit a configuration changing the PSCell to the cell 126A to the UE 102 via the MN 104A for the immediate PSCell change procedure. The MN 104A may transmit the configuration immediately changing the PSCell to the cell 126A to the UE 102 via SRB1.

In other scenarios, the base station 104A can perform a conditional SN Addition procedure (i.e., CSAC, CPAC) to first configure the base station 106B as a candidate SN (C-SN) for the UE 102. At this time, the UE 102 can be in single connectivity (SC) with the base station 104A or in DC with the base station 104A and the base station 106A. If the UE 102 is in DC with the base station 104A and the base station 106A, the MN 104A may determine to perform the conditional SN Addition procedure in response to a request received from the base station 106A or in response to one or more measurement results received from the UE 102 or obtained by the MN 104A from measurements on signals received from the UE 102. In contrast to the immediate SN addition case discussed above, the UE 102 does not immediately attempt to connect to the C-SN 106B. In this scenario, the base station 104A again operates as an MN, but the base station 106B initially operates as a C-SN rather than an SN.

More particularly, when the UE 102 receives a configuration for the C-SN 106B, the UE 102 does not connect to the C-SN 106B until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the C-SN 106B, so that the C-SN 106B begins to operate as the SN 106B for the UE 102. Thus, while the base station 106B operates as a C-SN rather than an SN, the base station 106B is not yet connected to the UE 102, and accordingly is not yet servicing the UE 102. In some implementations, the UE 102 may disconnect from the SN 106A to connect to the C-SN 106B.

In yet other scenarios, the UE 102 is in DC with the MN 104A (via the PCell 124) and SN 106A (via the PSCell 125A). The SN 106A can perform a CPC procedure to configure a candidate PSCell (C-PSCell) 126A for the UE 102. If the UE 102 is configured an SRB (e.g., SRB3) to exchange RRC messages with the SN 106A, the SN 106A may transmit a configuration for the C-PSCell 126A to the UE 102 via the SRB, e.g., in response to one or more measurement results which may be received from the UE 102 via the SRB or via the MN 104A or may be obtained by the SN 106A from measurements on signals received from the UE 102. In case of via the MN 104A, the MN 104A receives the configuration for the C-PSCell 126A. In contrast to the immediate PSCell change procedure discussed above, the UE 102 does not immediately disconnect from the PSCell and attempt to connect to the C-PSCell 126A.

More particularly, when the UE 102 receives a configuration for the C-PSCell 126A, the UE 102 does not connect to the C-PSCell 126A until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the C-PSCell 126A, so that the C-PSCell 126A begins to operate as the PSCell 126A for the UE 102. Thus, while the cell 126A operates as a C-PSCell rather than a PSCell, the SN 106A may not yet connect to the UE 102 via the cell 126A. In some implementations, the UE 102 may disconnect from the PSCell to connect to the C-PSCell 126A.

In some scenarios, the condition associated with CSAC or CPC can be signal strength/quality, which the UE 102 detects on the C-PSCell 126A of the SN 106A or on a C-PSCell 126B of C-SN 106B, exceeding a certain threshold or otherwise corresponding to an acceptable measurement. For example, when the one or more measurement results the UE 102 obtains on the C-PSCell 126A are above a threshold configured by the MN 104A or the SN 106A, above a pre-determined or pre-configured threshold or better than a measurement result the UE 102 obtains on the PSCell 125A by at least some threshold value (e.g., at least an offset), the UE 102 determines that the condition is satisfied. The threshold value can be configured by the MN 104A or SN 106A, or can be a pre-determined or pre-configured offset. When the UE 102 determines that the signal strength/quality on the C-PSCell 126A of the SN 106A is sufficiently good (again, measured relative to one or more quantitative thresholds or other quantitative metrics), the UE 102 can perform a random access procedure on the C-PSCell 126A with the SN 106A to connect to the SN 106A. Once the UE 102 successfully completes the random access procedure on the C-PSCell 126A, the C-PSCell 126A becomes a PSCell 126A for the UE 102. The SN 106A then can start communicating data (user-plane data or control-plane data) with the UE 102 via the PSCell 126A. In another example, when the one or more measurement results the UE 102 obtains on the C-PSCell 126B are above a threshold configured by the MN 104A or the C-SN 106B, above a pre-determined or pre-configured threshold or better than a measurement result the UE 102 obtains on the PSCell 125A by at least some threshold value (e.g., at least an offset), the UE 102 determines that the condition is satisfied. The threshold value can be configured by the MN 104A, SN 106A, or C-SN 106B, or can be a pre-determined or pre-configured offset. When the UE 102 determines that the signal strength/quality on the C-PSCell 126B of the C-SN 106B is sufficiently good (again, measured relative to one or more quantitative thresholds or other quantitative metrics), the UE 102 can perform a random access procedure on the C-PSCell 126B with the C-SN 106B to connect to the C-SN 106B. Once the UE 102 successfully completes the random access procedure on the C-PSCell 126B, the C-PSCell 126B becomes a PSCell 126B for the UE 102, and the C-SN 106B becomes an SN 106B. The SN 106B then can start communicating data (user-plane data or control-plane data) with the UE 102 via the PSCell 126B.

In various configurations of the wireless communication system 100, the base station 104A can be implemented as a master eNB (MeNB) or a master gNB (MgNB), and the base station 106A or 106B can be implemented as a secondary gNB (SgNB) or a candidate SgNB (C-SgNB). The UE 102 can communicate with the base station 104A and the base station 106A or 106B ("106A/B") via the same RAT such as EUTRA or NR, or different RATs. When the base station 104A is an MeNB and the base station 106A is an SgNB, the UE 102 can be in EUTRA-NR DC (EN-DC) with the MeNB and the SgNB. In this scenario, the MeNB 104A may or may not configure the base station 106B as a C-SgNB to the UE 102. The SgNB 106A may configure cell 126A as a C-PSCell to the UE 102. When the base station 104A is an MeNB and the base station 106A is a C-SgNB for the UE 102, the UE 102 can be in SC with the MeNB. In this scenario, the MeNB 104A may or may not configure the base station 106B as another C-SgNB to the UE 102.

In some cases, an MeNB, an SeNB, or a C-SgNB is implemented as an ng-eNB rather than an eNB. When the base station 104A is a master ng-eNB (Mng-eNB) and the base station 106A is a SgNB, the UE 102 can be in next generation (NG) EUTRA-NR DC (NGEN-DC) with the Mng-eNB and the SgNB. In this scenario, the MeNB 104A may or may not configure the base station 106B as a C-SgNB to the UE 102. The SgNB 106A may configure cell 126A as a C-PSCell to the UE 102. When the base station 104A is an Mng-NB and the base station 106A is a C-SgNB for the UE 102, the UE 102 can be in SC with the Mng-NB. In this scenario, the Mng-eNB 104A may or may not configure the base station 106B as another C-SgNB to the UE 102.

When the base station 104A is an MgNB and the base station 106A/B is an SgNB, the UE 102 may be in NR-NR DC (NR-DC) with the MgNB and the SgNB. In this scenario, the MeNB 104A may or may not configure the base station 106B as a C-SgNB to the UE 102. The SgNB 106A may configure cell 126A as a C-PSCell to the UE 102. When the base station 104A is an MgNB and the base station 106A is a C-SgNB for the UE 102, the UE 102 may be in SC with the MgNB. In this scenario, the MgNB 104A may or may not configure the base station 106B as another C-SgNB to the UE 102.

When the base station 104A is an MgNB and the base station 106A/B is a secondary ng-eNB (Sng-eNB), the UE 102 may be in NR-EUTRA DC (NE-DC) with the MgNB and the Sng-eNB. In this scenario, the MgNB 104A may or may not configure the base station 106B as a C-Sng-eNB to the UE 102. The Sng-eNB 106A may configure cell 126A as a C-PSCell to the UE 102. When the base station 104A is an MgNB and the base station 106A is a candidate Sng-eNB (C-Sng-eNB) for the UE 102, the UE 102 may be in SC with the MgNB. In this scenario, the MgNB 104A may or may not configure the base station 106B as another C-Sng-eNB to the UE 102.

The base stations 104A, 104B, 106A, and 106B can connect to the same CN 110, which can be an evolved packet core (EPC) 111 or a fifth-generation core (5GC) 160. The base station 104A can be implemented as an eNB supporting an Si interface for communicating with the EPC 111, an ng-eNB supporting an NG interface for communicating with the 5GC 160, or as a base station that supports the NR radio interface as well as an NG interface for communicating with the 5GC 160. The base station 106A can be implemented as an EN-DC gNB (en-gNB) with an Si interface to the EPC 111, an en-gNB that does not connect to the EPC 111, a gNB that supports the NR radio interface as well as an NG interface to the 5GC 160, or a ng-eNB that supports an EUTRA radio interface as well as an NG interface to the 5GC 160. To directly exchange messages during the scenarios discussed below, the base stations 104A, 104B, 106A, and 106B can support an X2 or Xn interface.

As illustrated in FIG. 1B, the base station 104A supports a cell 124A, the base station 104B supports a cell 124B, the base station 106A supports a cell 126A, and the base station 106B supports a cell 126B. The cells 124A and 126A can partially overlap, as can the cells 124A and 126B, so that the UE 102 can communicate in DC with the base station 104A (operating as an MN) and the base station 106A (operating as an SN) and, upon completing an SN change, with the base station 104A (operating as MN) and the base station 106B (operating as an SN). More particularly, when the UE 102 is in DC with the base station 104A and the base station 106A or 106B, the base station 104A operates as an MeNB, a Mng-eNB or a MgNB, and the base station 106A or 106B operates as an SgNB or an Sng-eNB. The cells 124A and 124B can partially overlap, so that the UE 102 can communicate with the base station 104A and, upon completing a handover, with the base station 104B.

In general, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure also can apply to other suitable radio access and/or core network technologies such as sixth generation (6G) radio access and/or 6G core network or 5G NR-6G DC.

Figure 1C:
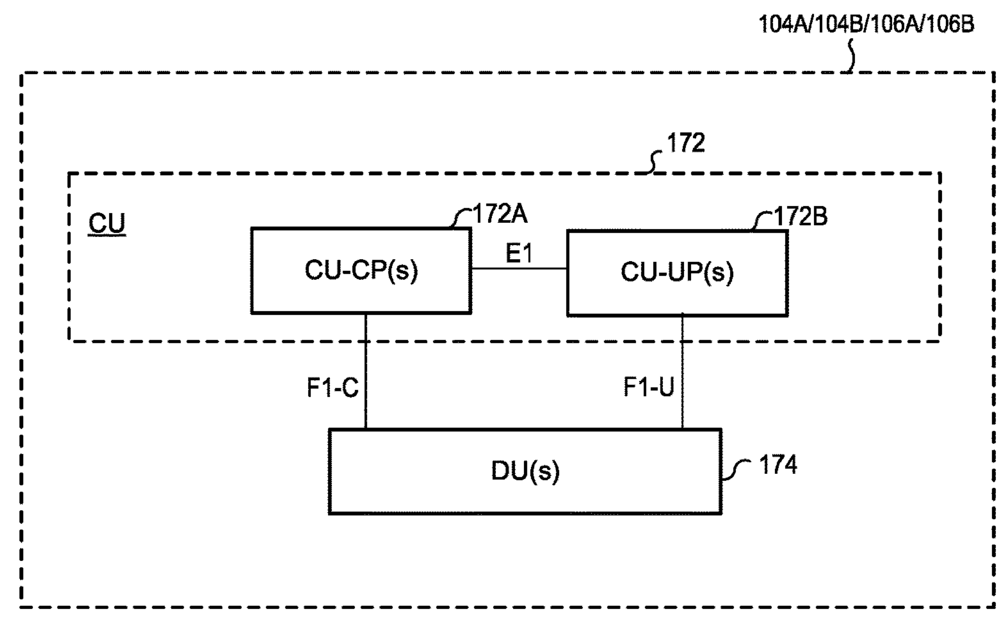
FIG. 1C is a block diagram of an example base station in which a centralized unit (CU) and a distributed unit (DU) can operate in the system of FIG. 1A or FIG. 1B.

FIG. 1C depicts an example, distributed or disaggregated implementation of any one or more of the base stations 104A, 104B, 106A, 106B. In this implementation, the base station 104A, 104B, 106A, or 106B includes a central unit (CU) 172 and one or more DUs 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include the processing hardware 130 or 140 of FIG. 1A.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a medium access control (MAC) controller configured to manage or control one or more MAC operations or procedures (e.g., a random access procedure), and a radio link control (RLC) controller configured to manage or control one or more RLC operations or procedures when the base station (e.g., base station 106A) operates as an MN or an SN. The process hardware can also include a physical layer controller configured to manage or control one or more physical layer operations or procedures.

In some implementations, the CU 172 can include a logical node CU-CP 172A that hosts the control plane part of the Packet Data Convergence Protocol (PDCP) protocol of the CU 172. The CU 172 can also include logical node(s) CU-UP 172B that hosts the user plane part of the PDCP protocol and/or Service Data Adaptation Protocol (SDAP) protocol of the CU 172. The CU-CP 172A can transmit control information (e.g., RRC messages, F1 application protocol messages), and the CU-UP 172B can transmit the data packets (e.g., SDAP PDUs or Internet Protocol packets).

The CU-CP 172A can be connected to multiple CU-UP 172B through the E1 interface. The CU-CP 172A selects the appropriate CU-UP 172B for the requested services for the UE 102. In some implementations, a single CU-UP 172B can be connected to multiple CU-CP 172A through the E1 interface. The CU-CP 172A can be connected to one or more DU 174*s* through an F1-C interface. The CU-UP 172B can be connected to one or more DU 174 through the F1-U interface under the control of the same CU-CP 172A. In some implementations, one DU 174 can be connected to multiple CU-UP 172B under the control of the same CU-CP 172A. In such implementations, the connectivity between a CU-UP 172B and a DU 174 is established by the CU-CP 172A using Bearer Context Management functions.

Figure 2:
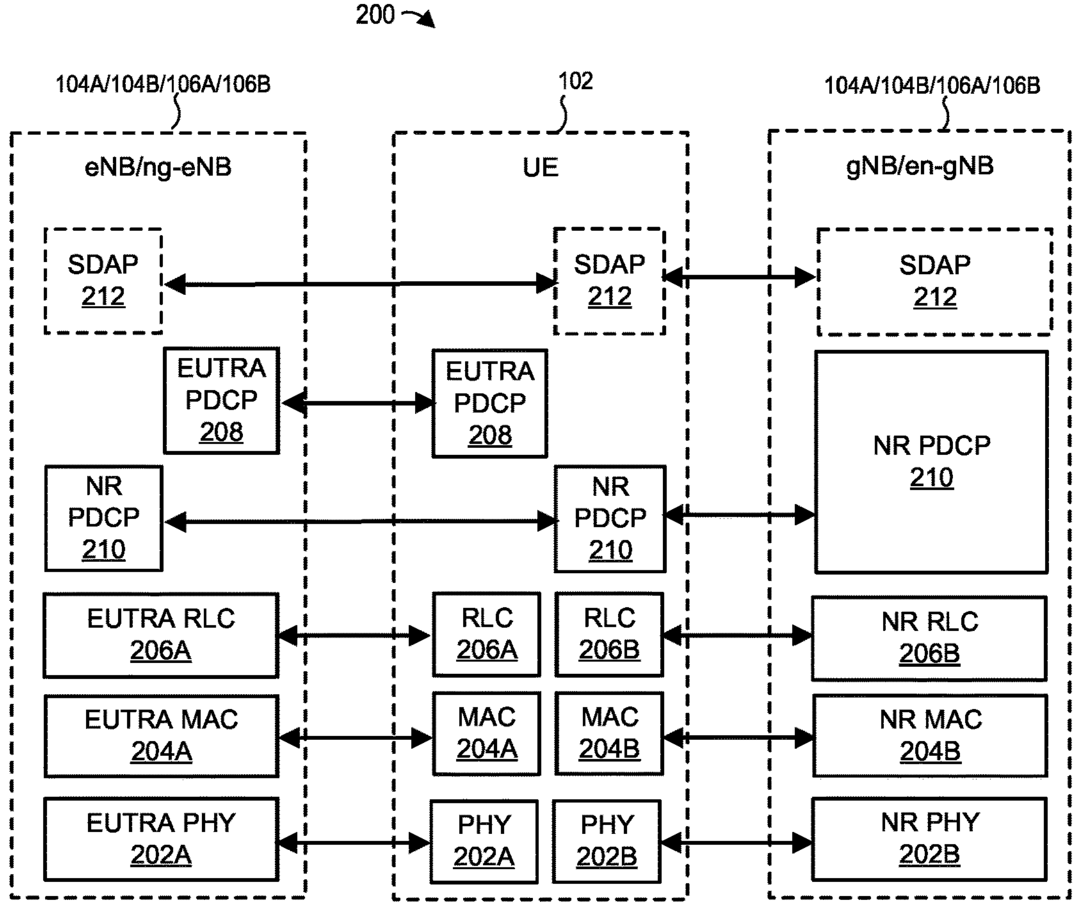
FIG. 2 is a block diagram of an example protocol stack according to which the UE of FIG. 1A communicates with base station(s)

FIG. 2 illustrates, in a simplified manner, an example protocol stack 200 according to which the UE 102 can communicate with an eNB/ng-eNB or a gNB (e.g., one or more of the base stations 104A, 104B, 106A, 106B).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to an EUTRA PDCP sublayer 208 and, in some cases, to a NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides data transfer services to the NR PDCP sublayer 210. The NR PDCP sublayer 210 in turn can provide data transfer services to an Ethernet protocol layer (not shown in FIG. 2), an Internet Protocol (IP) layer (not shown in FIG. 2), Service Data Adaptation Protocol (SDAP) 212 and/or a radio resource control (RRC) sublayer (not shown in FIG. 2). The UE 102, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102 can support layering of NR PDCP 210 over EUTRA RLC 206A, and SDAP sublayer 212 over the NR PDCP sublayer 210.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages or non-access-stratum (NAS) messages, for example. On a user plane, the EUTRA PDCP sublayer 208 and the NR PDCP sublayer 210 can provide DRBs to support data exchange. Data exchanged on the NR PDCP sublayer 210 can be SDAP PDUs, Internet Protocol (IP) packets or Ethernet packets.

In scenarios where the UE 102 operates in EN-DC with the base station 104A operating as an MeNB and the base station 106A operating as an SgNB, the wireless communication system 100 can provide the UE 102 with an MN-terminated bearer that uses EUTRA PDCP sublayer 208, or an MN-terminated bearer that uses NR PDCP sublayer 210. The wireless communication system 100 in various scenarios can also provide the UE 102 with an SN-terminated bearer, which uses only the NR PDCP sublayer 210. The MN-terminated bearer can be an MCG bearer, a split bearer or a MN-terminated SCG bearer. The SN-terminated bearer can be an SCG bearer, a split bearer or an SN-terminated MCG bearer. The MN-terminated bearer can be an SRB (e.g., SRB1 or SRB2) or a DRB. The SN-terminated bearer can be an SRB or a DRB.

Next, several example scenarios in which a UE and a base station manage respective configurations after conditional reconfiguration failure or conditional reconfiguration execution failure, are discussed with reference to FIGS. 3-6.

FIGS. 3A-3F illustrate scenarios that resolve inconsistent configuration usage after CPC reconfiguration failure or CPC execution failure.

Figure 3A:
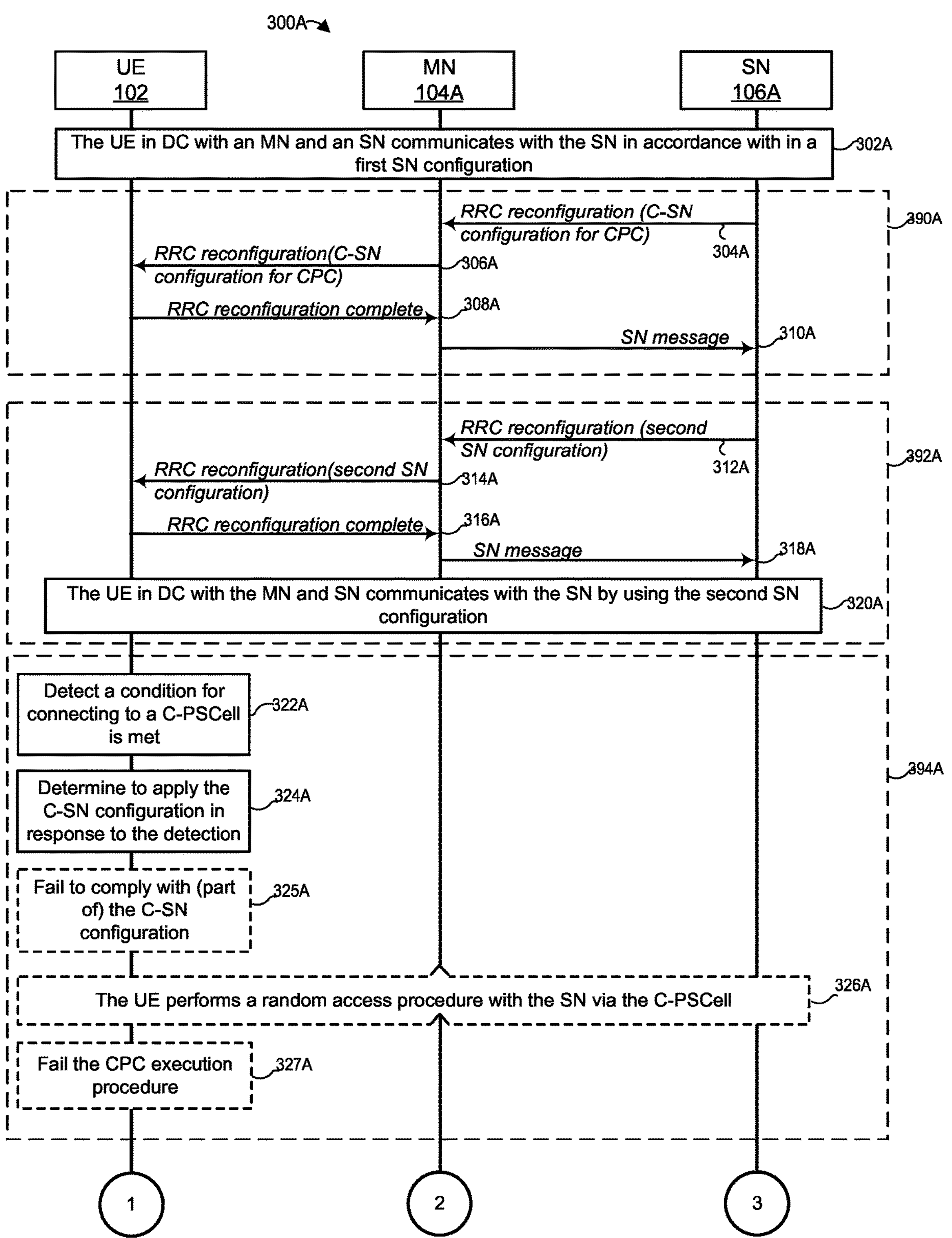
FIG. 3A is a messaging diagram of an example scenario in which a UE initially uses a first SN configuration, receives a conditional configuration followed by a second SN configuration, continues using the second configuration after failing the conditional procedure, and performs an SCG recovery procedure to receive a third SN configuration.
Figure 3A:
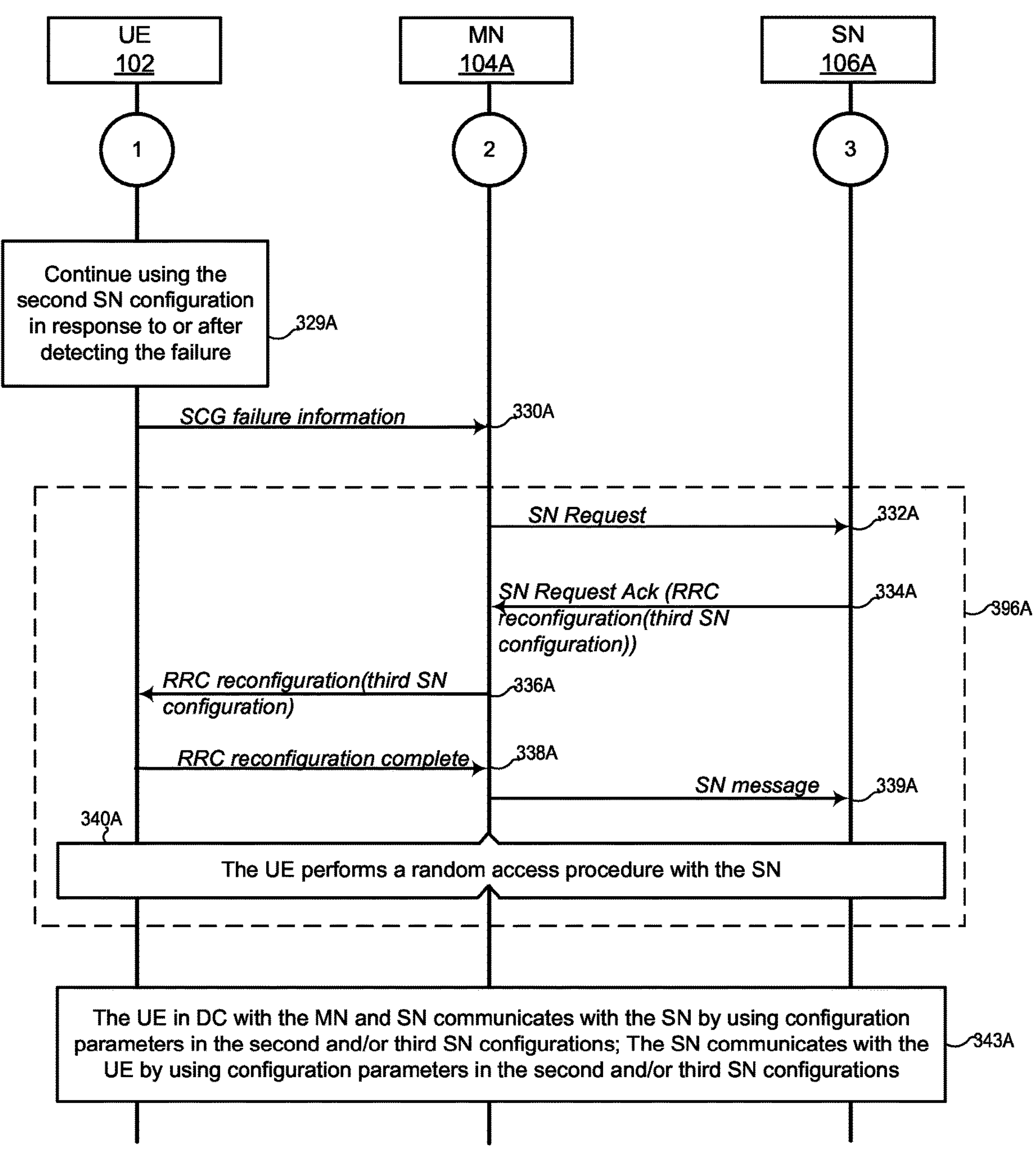

Referring first to FIG. 3A, the base station 104A in a scenario 300A operates as an MN, and the base station 106A operates as an SN.

Initially, the UE 102 communicates 302A data (e.g., uplink (UL) data PDUs and/or downlink (DL) data PDUs) in DC with the MN 104A and the SN 106A (e.g., via PSCell 125A). More particularly, the UE 102 can communicate 302A data and control signals with SN 106A via a PSCell 125A in accordance with a first SN configuration. The first SN configuration can include one or more configuration parameters that the UE 102 uses to communicate with the SN 106A. For example, the data includes downlink and/or uplink PDUs that the SN 106A transmits to the UE 102. In another example, the control signals can include downlink control signals and uplink control signals. The downlink control signals can include channel state information reference signals, tracking reference signals, and/or physical downlink control channel (PDCCH) that the SN 106A transmits to the UE 102. The uplink control signals can include hybrid automatic repeat request (HARQ) acknowledgement or negative acknowledgement, channel state information, scheduling request, and/or sounding reference signal.

At a later time, the SN 106A determines that it should generate a C-SN configuration for a CPC procedure so that the UE 102 can communicate with the SN 106A via a C-PSCell (e.g., cell 126A) when a condition is satisfied. The SN 106A can make this determination based on one or more measurement results received from the UE 102 via the MN 104A, from the UE 102 directly (e.g., via an SRB established between the UE 102 and the SN 106A or via a physical control channel), or obtained by the SN 106A from measurements on signals, control channels, or data channels received from the UE 102, for example, or another suitable event. The SN 106A in some cases can make this determination more accurately by estimating that the UE 102 is moving towards the coverage area of the cell 126A, according to uplink signals received from the UE 102 or positioning measurement result(s) received from the UE 102, for example.

In response to this determination, the SN 106A transmits 304A a first RRC reconfiguration message including the C-SN configuration to the MN 104A, which in turn transmits 306A the first RRC reconfiguration message to the UE 102. In some implementations, the SN 106A sends 306A an SN message (e.g., SN Modification Request Acknowledge message or SN Modification Required message) including the first RRC reconfiguration message to the MN 104A. In some implementations, the SN 106A generates a conditional configuration (e.g., CondReconfigurationAddMod-r16 or CondReconfigToAddMod-r16 IE) including the C-SN configuration and generates a first RRC reconfiguration message including the conditional configuration. The SN 106A transmits 304A the first RRC reconfiguration message to the MN 104A, which in turn transmits 306A the first RRC reconfiguration message including the conditional configuration to the UE 102.

In some implementations, the UE 102 may transmit 308A a first RRC reconfiguration complete message to the MN 104A in response to the first RRC reconfiguration message. After or in response to receiving the first RRC reconfiguration complete message, the MN 104A may transmit 310A a first SN message (e.g., SN Reconfiguration Complete message or SN Modification Confirm message) to the SN 106A. In one implementation, the MN 104A can include the first RRC reconfiguration complete message in the first SN message.

In some implementations, the MN 104A or SN 106A may configure an SRB (e.g., SRB3) utilizing radio resources of the SN 106A to exchange RRC messages between the UE 102 and the SN 106A. In such implementations, the SN 106A can transmit the first RRC reconfiguration message to the UE 102 on the SRB directly (i.e., not via the MN 104A), and the UE 102 can transmit the first RRC reconfiguration complete message to the SN 106A on the SRB directly (i.e., not via the MN 104A). The events 304A, 306A, 308A, and 310A are collectively referred to in FIG. 3A as the CPC configuration procedure 390A.

To transmit the first RRC reconfiguration message, the MN 104A in one implementation transmits 306A a first RRC container message including the first RRC reconfiguration message to the UE 102. In response, the UE 102 in one implementation transmits 308A a first RRC container response message to the MN 104A to transmit 308A the first RRC reconfiguration complete message. The MN 104A may transmit 310A the first SN message to the SN 106A in response to the first RRC container response message. In turn, the MN 104A may include the first RRC reconfiguration complete message in the first SN message.

At a later time, the SN 106A initiates 392A an RRC reconfiguration procedure with the UE 102. Particularly, the SN 106A sends 312A a second RRC reconfiguration message including a second SN configuration to the MN 104A, which in turn transmits the 314A the second RRC reconfiguration message to the UE 102. In contrast to the C-SN configuration for a CPC procedure that the UE 102 applies only when the UE 102 determines that a condition associated with the C-SN configuration is satisfied, the second SN configuration is an immediate or non-conditional configuration. Accordingly, in response to the second RRC reconfiguration message, the UE 102 immediately applies the second SN configuration and may transmit 316A a second RRC reconfiguration complete message to the MN 104A. After or in response to receiving the second RRC reconfiguration complete message, the MN 104A may transmit 318A a second SN message (e.g., SN Reconfiguration Complete message or SN Modification Confirm message) to the SN 106A. In one implementation, the MN 104A can include the second RRC reconfiguration complete message in the second SN message. If the SRB is configured to exchange RRC messages between the UE 102 and SN 106A as described above, the SN 106A can transmit the second RRC reconfiguration message to the UE 102 on the SRB directly, and the UE 102 can transmit the second RRC reconfiguration complete message to the SN 106A on the SRB directly.

In some implementations, the second SN configuration can include one or more configuration parameters, which modifies or releases the configuration parameter(s) in the first SN configuration or are additional configuration parameter(s) not included in the first SN configuration. After applying the second SN configuration, the UE 102 in DC with the MN 104A and SN 106A communicates 320A data and control signals (similar to communication 302A as described above) with the SN 106A by using the second SN configuration. The events 312A, 314A, 316A, 318A, and 320A are collectively referred to in FIG. 3A as the RRC reconfiguration procedure 392A.

To transmit the second RRC reconfiguration message, the MN 104A in one implementation transmits a second RRC container message including the second RRC reconfiguration message to the UE 102. In response, the UE 102 in one implementation transmits a second RRC container response message to the MN 104A to transmit 316A the second RRC reconfiguration complete message. The MN 104A may transmit 318A the second SN message to the SN 106A in response to the second RRC container response message. In turn, the MN 104A may include the second RRC reconfiguration complete message in the second SN message.

After performing the RRC reconfiguration procedure 392A, the UE 102 detects 322A that a condition for connecting to a C-PSCell 126A is satisfied. The UE 102 determines 324A to apply the C-SN configuration received at event 306A in response to the detection. In response to the determination, the UE 102 in some implementations performs a compliance check on the C-SN configuration, and according to the compliance check, if the UE 102 fails 325A to comply with the C-SN configuration (or at least part of the C-SN configuration), the UE 102 fails 327A a CPC execution procedure, i.e., CPC execution failure. If the UE 102 complies with the C-SN configuration as a result of the compliance check, the UE 102 initiates 326A a random access procedure on the C-PSCell 126A, but if the UE 102 fails to complete the random access procedure, the UE 102 determines that it has still failed 327A the CPC execution procedure. The events 322A, 324A, 325A, 326A, and 327A are collectively referred to in FIG. 3A as the CPC execution failure procedure 394A.

In response to the CPC reconfiguration failure or CPC execution failure, the UE 102 continues 329A using the second SN configuration received during the RRC reconfiguration procedure 392A instead of, e.g., in accordance with section 5.3.5.8.2 in 3GPP TS 38.331 v16.2.0, the first SN configuration. The UE 102 then transmits 330A an SCG failure information message (e.g., SCGFailureInformationNR message) to the MN 104A to indicate the CPC reconfiguration failure or CPC execution failure. In some implementations, the UE 102 can include a failure type (e.g., failureType-r15 or failureType field) in the SCG failure information message to indicate the failure. For example, the UE 102 can indicate SCG reconfiguration failure (e.g., scg-reconfigFailure) in the failure type to indicate the CPC reconfiguration failure. In another example, the UE 102 can indicate the CPC reconfiguration failure or CPC execution failure in the failure type (e.g., failureType-v1610). In yet another example, the UE 102 can indicate synchronous reconfiguration failure for SCG (e.g., synchReconfigFailureSCG) in the failure type to indicate the CPC execution failure.

After the MN 104A receives 330A the SCG failure information message, the MN 104A can initiate 396A an SCG failure recovery procedure with the SN 106A and UE 102 to recover from the CPC reconfiguration failure or the CPC execution failure, by sending 332A an SN Request message (e.g., SN Modification Request message) to the SN 106A. In response, the SN 106A generates a third RRC reconfiguration message including a third SN configuration. The SN 106A sends 334A to the MN 104A an SN Request Acknowledge message (e.g., SN Modification Request Acknowledge message) including the third RRC reconfiguration message. In turn, the MN 104A transmits 336A the third RRC reconfiguration message to the UE 102, similar to event 314A. In response, the UE 102 transmits 338A a third RRC reconfiguration complete message to the MN 104A, similar to event 316A. After or in response to receiving the third RRC reconfiguration complete message, the MN 104A can send 339A a third SN message to the SN 106A, similar to event 318A. The UE 102 performs 340A a random access procedure on a cell (e.g., PSCell 125A, 126A, or other suitable cell other) in response to or receiving in accordance with the third SN configuration. In some implementations, the UE 102 performs 340A the random access procedure using one or more random access configurations in the third SN configuration. The events 332A, 334A, 336A, 338A, 339A, and 340A are collectively referred to in FIG. 3A as the SCG failure recovery procedure 396A. During the SCG failure recovery procedure 396A, the SN 106A also retains the most recent configuration (i.e., the second SN configuration) provided to the UE 102 prior to the CPC execution failure procedure 394A.

After successfully completing 340A the random access procedure on the cell with the SN 106A, the UE 102 in DC with both the MN 104A and the SN 106A can communicate 343A data and control signals with the SN 106A by using consistent (i.e., same) configuration parameters (i.e., second and/or third SN configurations). In implementations in which the third SN configuration is a delta configuration that augments the second SN configuration, the UE 102 can communicate 343A with the SN 106A by using the second and third SN configurations. In other implementations in which the third SN configuration is a complete and self-contained configuration (i.e., a full configuration) that does not augment the second SN configuration, the UE 102 can communicate 343A with the SN 106A by using the third SN configuration only.

When the SN 106A is implemented as an ng-eNB, the RRC reconfiguration message (i.e., the first or second RRC reconfiguration message) is an RRCConnectionReconfiguration message, and the RRC reconfiguration complete message (i.e., the first or second RRC reconfiguration complete message) is an RRCConnectionReconfigurationComplete message. When the SN 106A is implemented as a gNB, the RRC reconfiguration message is an RRCReconfiguration message, and the RRC reconfiguration complete message is an RRCReconfigurationComplete message. When the MN 104A is implemented as an eNB or ng-eNB, the RRC container message (i.e., the first or second RRC container message) is an RRCConnectionReconfiguration message, and the RRC container response message (i.e., the first or second RRC container response message) is an RRCConnectionReconfigurationComplete message. When the MN 104A is implemented as a gNB, the RRC container message is an RRCReconfiguration message, and the RRC container response message is an RRCReconfigurationComplete message.

In some implementations, the random access procedure can be a four-step random access procedure or a two-step random access procedure. In other implementations, the random access procedure can be a contention-based random access procedure or a contention-free random access procedure. In some implementations, the UE 102 may include an RRC reconfiguration complete message in "message 3" of the four-step random access procedure or in a message A of the two-step random access procedure, according to the C-SN configuration.

In some implementations, the SN 106A includes a trigger condition configuration (e.g., triggerCondition-r16 or condExecutionCond-r16 field) specifying the condition that the UE 102 detects at event 322A, in the conditional configuration generated by the SN 106A at event 304A. The SN 106A may include a configuration ID identifying the conditional configuration or the C-SN configuration in the conditional configuration. The UE 102 may use the condition to determine whether to connect to the C-PSCell 126A. If the UE 102 determines that the condition is satisfied, the UE 102 attempts to use the conditional configuration to connect to the C-PSCell 126A. That is, the condition (or "triggering condition") triggers the UE 102 to connect to the C-PSCell 126A or to execute the C-SN configuration. However, if the UE 102 does not determine that the condition is satisfied, the UE 102 does not connect to the C-PSCell 126A.

The C-SN configuration in some implementations can be a complete and self-contained configuration (i.e., a full configuration). The C-SN configuration may include a full configuration indication (an information element (IE) or a field) that identifies the C-SN configuration as a full configuration. The UE 102 in this case would be able to use the C-SN configuration to communicate with the SN 106A without relying on any other SN configuration. In other implementations, the C-SN configuration can include a delta configuration, or one or more configurations that augment a previously received SN configuration. The UE 102 in this case would be able to use the delta C-SN configuration together with a previously received SN configuration to communicate with the SN 106A.

The C-SN configuration can include multiple configuration parameters for the UE 102 to apply to communicate with the SN 106A via a C-PSCell 126A if the UE 102 determines that the condition is satisfied. The multiple configuration parameters may configure the C-PSCell 126A and zero, one, or more candidate secondary cells (C-SCells) of the SN 106A to the UE 102. The multiple configuration parameters may configure radio resources for the UE 102 to communicate with the SN 106A via the C-PSCell 126A and zero, one, or more C-SCells of the SN 106A. The multiple configuration parameters may configure zero, one, or more radio bearers, such as one or more SRBs (e.g., SRB1 and/or SRB2) and/or one or more DRBs.

The SN configuration (i.e., the first SN configuration, the second SN configuration, or the third SN configuration) can include multiple configuration parameters for the UE 102 to communicate with the SN 106A via the PSCell (e.g., PSCell 125A) and zero, one, or more secondary cells (SCells) of the SN 106A. The multiple configuration parameters may configure radio resources for the UE 102 to communicate with the SN 106A via the PSCell and zero, one, or more SCells of the SN 106A. The multiple configuration parameters may configure zero, one, or more radio bearers, such as an SRB and/or one or more DRBs.

In some implementations, the C-SN configuration can include a group configuration (CellGroupConfig) IE that configures the C-PSCell 126A and zero, one, or more C-SCells of the SN 106A. In one implementation, the C-SN configuration may include a radio bearer configuration (e.g., RadioBearerConfg IE, DRB-ToAddModList IE or SRB-ToAddModList IE, DRB-ToAddMod IE or SRB-ToAddMod IE). In another implementation, the C-SN configuration may not include a radio bearer configuration. In various implementations, the C-SN configuration can be an RRCReconfiguration message, RRCReconfiguration-IEs, or the CellGroupConfig IE conforming to 3GPP TS 38.331. The full configuration indication may be a field or an IE conforming to 3GPP TS 38.331. In other implementations, the C-SN configuration can include an SCG-ConfigPartSCG-r12 IE that configures the C-PSCell 126A and zero, one, or more C-SCells of the SN 106A. In some implementations, the C-SN configuration is an RRCConnectionReconfiguration message, RRCConnectionReconfiguration-IEs, or the ConfigPartSCG-r12 IE conforming to 3GPP TS 36.331. The full configuration indication may be a field or an IE conforming to 3GPP TS 36.331.

In some implementations, the SN configuration (i.e., the first, second, or third SN configuration) can include a CellGroupConfg IE that configures the PSCell (e.g., PSCell 125A) and may configure zero, one, or more SCells of the SN 106A. In one implementation, the SN configuration can be an RRCReconfiguration message, RRCReconfiguration-IEs or the CellGroupConfg IE conforming to 3GPP TS 38.331. In other implementations, the SN configuration can include an SCG-ConfigPartSCG-r12 IE that configures the PSCell and may configure zero, one, or more SCells of the SN 106A. In one implementation, the SN configuration can be an RRCConnectionReconfiguration message, RRCConnectionReconfiguration-IEs or the ConfigPartSCG-r12 IE conforming to 3GPP TS 36.331.

Figure 3B:
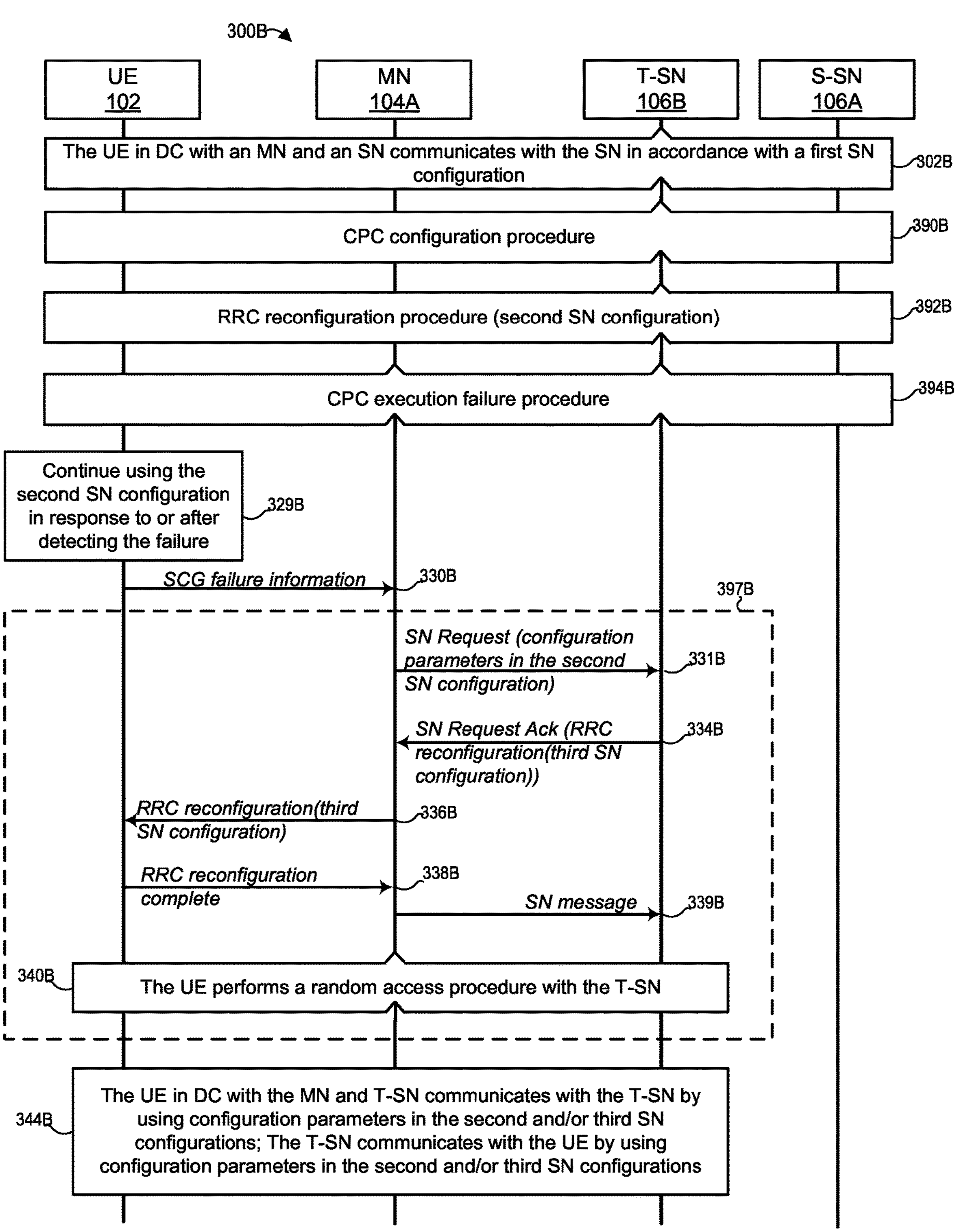
FIG. 3B is a messaging diagram of a scenario similar to that of FIG. 3A, but with the third SN configuration pertaining to a new, target SN.

Referring now to FIG. 3B, whereas the UE 102 of FIG. 3A communicates in DC with the MN 104A and the SN 106A by using consistent configuration parameters, the UE 102 of FIG. 3B communicates in DC with the MN 104A and a different SN (e.g., T-SN 106B) by using consistent configuration parameters. Otherwise, any of the implementations described above in reference to FIG. 3A can generally be applied to scenario 300B of FIG. 3B.

The base station 104A in a scenario 300B operates as an MN, the base station 106A operates as a source SN (S-SN), and the base station 106B operates as a target SN (T-SN). Events 302B, 390B, 392B, 394B, 329B, and 330B occur in scenario 300B, similar to events 302A, 390A, 392A, 394A, 329A, and 330A of scenario 300A, respectively.

After the MN 104A receives 330B the SCG failure information message, the MN 104A initiates an SCG failure recovery procedure 397B, similar to the SCG failure recovery procedure 396A, except with a different SN (e.g., the T-SN 106B) for the UE 102 to recover from the CPC reconfiguration failure or the CPC execution failure. Particularly, the MN 104A can initiate 397B the SCG failure recovery procedure with the T-SN 106B by sending 331B an SN Request message including the second SN configuration to the T-SN 106B. Including second SN configuration parameters in the SN Request message may assist the T-SN 106B in determining the third SN configuration and its format (e.g., delta or full). In response, the T-SN 106B generates a third RRC reconfiguration message including a third SN configuration and sends 334B to the MN 104A an SN Request Acknowledge message including the third RRC reconfiguration message. In turn, the MN 104A transmits 336B the third RRC reconfiguration message to the UE 102. In response, the UE 102 transmits 338B a third RRC reconfiguration complete message to the MN 104A. After or in response to receiving the third RRC reconfiguration complete message, the MN 104A can send 339B a third SN message to the T-SN 106B. The UE 102 performs 340B a random access procedure on a cell (e.g., PSCell 126B, or other suitable cell other) in response to receiving or in accordance with the third SN configuration. The events 331B, 334B, 336B, 338B, 339B, and 340B are collectively referred to in FIG. 3B as the SCG failure recovery procedure 397B.

Accordingly, the UE 102 in DC with both the MN 104A and the T-SN 106B can communicate 344B data and control signals with the T-SN 106B by using consistent (i.e., same) configuration parameters (i.e., second and/or third SN configurations). The third SN configuration can be a delta configuration in some implementations, or a full configuration in other implementations, as described above in FIG. 3A.

Figure 3C:
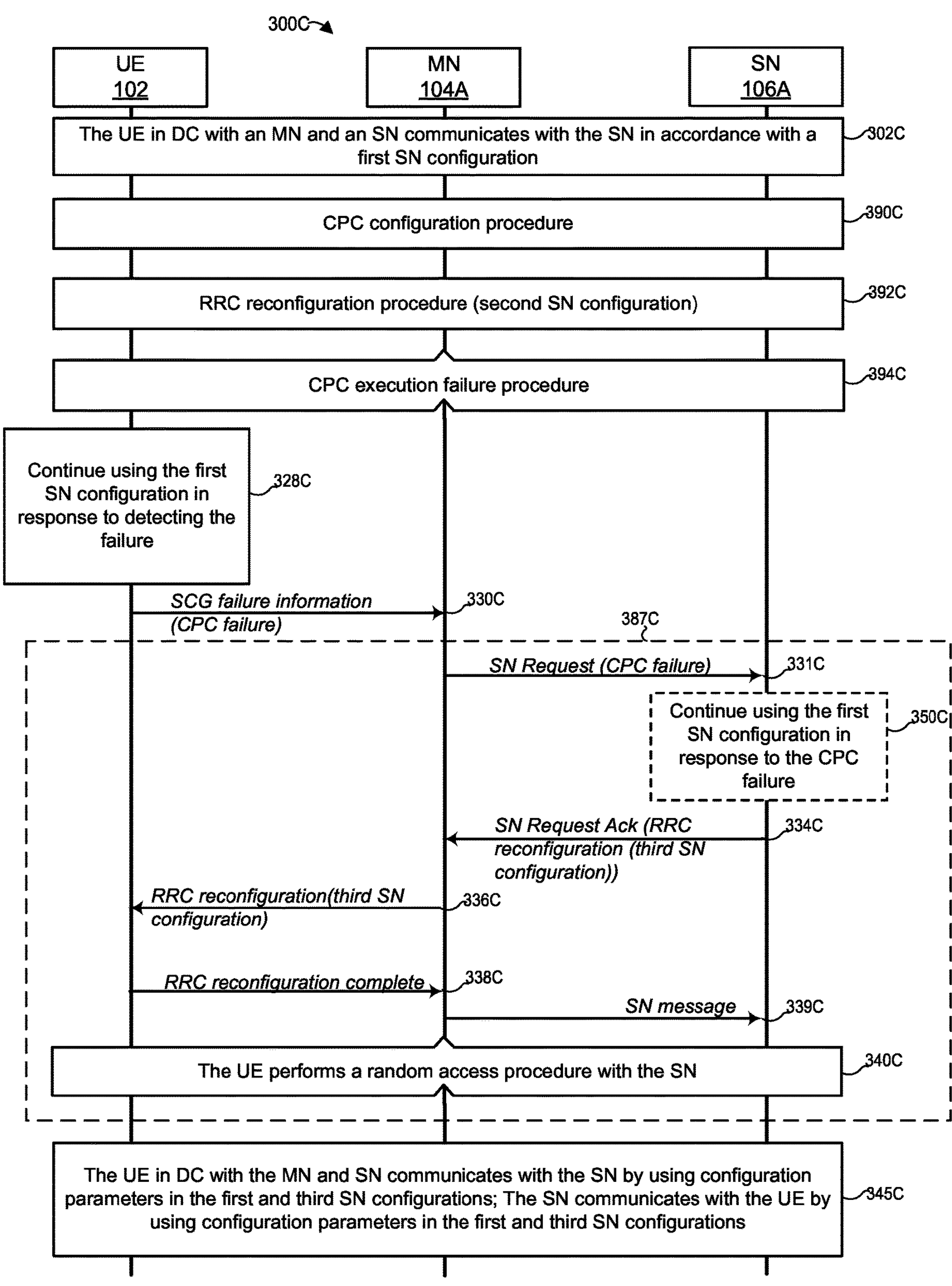
FIG. 3C is a messaging diagram of an example scenario in which a UE initially uses a first SN configuration, receives a conditional configuration followed by a second SN configuration, uses the first configuration after failing the conditional procedure, notifies the RAN of reverting back to the first configuration, and then receives a delta (third) SN configuration from the RAN.

Referring now to FIG. 3C, whereas the UE 102 of FIG. 3A communicates in DC with the MN 104A and the SN 106A by using consistent configuration parameters (i.e., second and/or third SN configurations), the UE 102 of FIG. 3C communicates in DC with the MN 104A and the SN 106A by using different but consistent configuration parameters (i.e., first and third SN configurations). Otherwise, any of the implementations described above in reference to FIG. 3A can generally be applied to scenario 300C of FIG. 3C.

The base station 104A in a scenario 300C operates as an MN and the base station 106A operates as an SN. Events 302C, 390C, 392C, and 394C occur in scenario 300C, similar to events 302A, 390A, 392A, and 394A of scenario 300A, respectively.

In contrast to the UE 102 of FIG. 3A that continues 329A using the second SN configuration received during the RRC reconfiguration procedure 392A, the UE 102 of FIG. 3C continues 328C using the first SN configuration, e.g., in accordance with section 5.3.5.8.2 in 3GPP TS 38.331 v16.2.0. Subsequently, the UE 102 transmits 330C an SCG failure information message to the MN 104A to indicate the failure, and to notify the MN 104A of the UE 102 reverting back to the first SN configuration.

Based on the SCG failure information message, the MN 104A determines that the UE 102 detected the CPC reconfiguration failure or CPC execution failure and reverted back to using the first SN configuration instead of maintaining the second SN configuration. In some implementations, the SCG failure information message includes an explicit indication of the CPC execution failure that triggers logic stored in the MN 104A to make the determination. In other implementations, the SCG failure information message includes no such explicit indication, and the MN 104A determines that the UE 102 detected the CPC reconfiguration failure or CPC execution failure based on the timing of receiving the SCG failure information message from the UE 102. For instance, the MN 104A can be configured to set a timer when the second SN configuration was sent to the UE 102 during the RRC reconfiguration procedure 392C. If the MN 104A receives the SCG failure information message from the UE 102 before the timer expires, the MN 104A determines that the UE 102 detected immediate failure (e.g., immediate PSCell change failure). If the MN 104A receives the SCG failure information message from the UE 102 after the timer expires, the MN 104A determines that the UE 102 detected conditional failure (e.g., the CPC reconfiguration failure or CPC execution failure).

In any case, based on the SCG failure information message, the MN 104A sends 331C an SN Request message to the SN 106A to instruct the SN 106A to continue using the first SN configuration instead of the second SN configuration. In some implementations, the SN Request message can include an explicit indication of the CPC execution failure, similar to the explicit indication of the CPC execution failure included in the SCG failure information message described above. In these implementations, the SN 106A can determine to continue using the first SN configuration in response to the explicit indication irrespective of the MN 104A determining to revert back to using the first SN configuration or maintain the second SN configuration.

In response to receiving the SN Request message, the SN 106A continues 350C using the first SN configuration instead of the second SN configuration to communicate with the UE 102. In addition, in response to the SN Request message, the SN 106A generates a third RRC reconfiguration message including a third SN configuration (e.g., a delta configuration that augments the first SN configuration) and sends 334C to the MN 104A an SN Request Acknowledge message including the third RRC reconfiguration message. In turn, the MN 104A transmits 336C the third RRC reconfiguration message to the UE 102. In response, the UE 102 transmits 338C a third RRC reconfiguration complete message to the MN 104A. After or in response to receiving the third RRC reconfiguration complete message, the MN 104A can send 339C a third SN message to the SN 106A. The UE 102 performs 340C a random access procedure on a cell (e.g., PSCell 125A, 126A, or other suitable cell other) in response to receiving or in accordance with the third SN configuration. The events 331C, 350C, 334C, 336C, 338C, 339C, and 340C are collectively referred to in FIG. 3C as the SCG failure recovery procedure 387C.

Accordingly, the UE 102 in DC with both the MN 104A and the SN 106A can communicate 345C data and control signals with the SN 106A by using consistent (i.e., same) configuration parameters (i.e., first and third SN configurations).

Figure 3D:
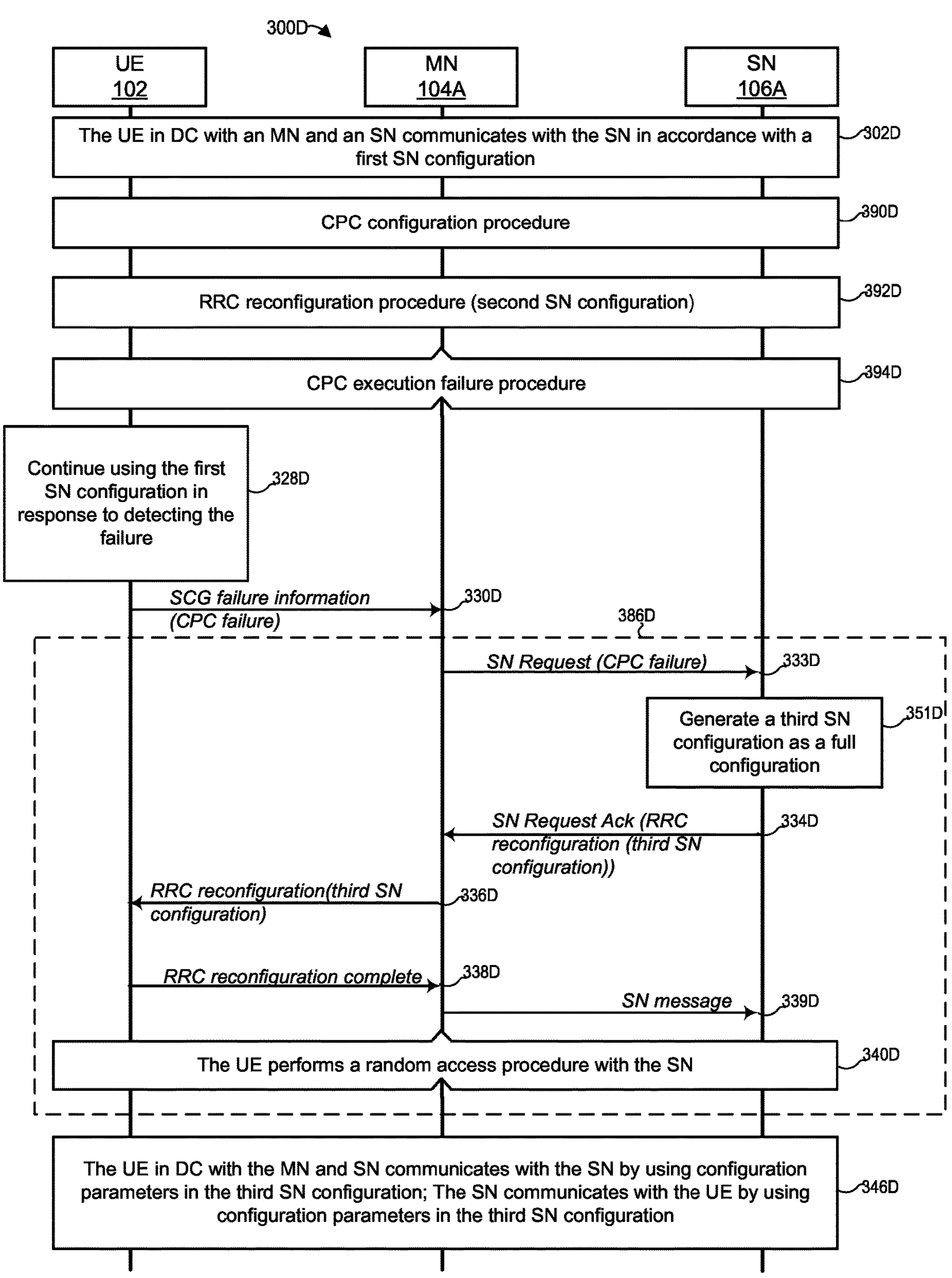
FIG. 3D is a messaging diagram of a scenario similar to that of FIG. 3C, but with the RAN supplying a full configuration as the third SN configuration.

Referring now to FIG. 3D, whereas the UE 102 of FIG. 3C communicates in DC with the MN 104A and the SN 106A by using consistent configuration parameters (i.e., first and third SN configurations), the UE 102 of FIG. 3D communicates in DC with the MN 104A and the SN 106A by using only the third SN configuration, which is a full configuration. Otherwise, any of the implementations described above in reference to FIG. 3C can generally be applied to scenario 300D of FIG. 3D.

The base station 104A in a scenario 300D operates as an MN and the base station 106A operates as an SN. Events 302D, 390D, 392D, 394D, 328D, and 330D occur in scenario 300D, similar to events 302C, 390C, 392C, 394C, 328C, and 330C of scenario 300C, respectively.

In response to receiving 330D the SCG failure information message from the UE 102, the MN 104A sends 333D an SN Request message to the SN 106A, similar to event 331C, except the SN Request message triggers the SN 106A to generate a third SN configuration as a full configuration instead of instructing the SN 106A to continue using the first SN configuration, in some implementations. By virtue of the full configuration being independent of the first SN configuration, the SN 106A need not continue using the first SN configuration as in event 350C. In other implementations, the MN 104A determines, based on the SCG failure information message, whether the UE 102 detected conditional failure or immediate failure, as described above in FIG. 3C. The MN 104A can send 333D the SN Request message to the SN 106A to instruct the SN 106A to generate the third SN configuration as a full configuration if the MN 104A determines that the UE 102 detected conditional failure, or to generate the third SN configuration as a delta configuration that augments the first SN configuration if the MN 104A determines that the UE 102 detected immediate failure.

In response to the SN Request message, the SN 106A generates 351D the third SN configuration. Subsequently, the SN 106A generates a third RRC reconfiguration message including the third SN configuration and sends 334D to the MN 104A an SN Request Acknowledge message including the third RRC reconfiguration message. In turn, the MN 104A transmits 336D the third RRC reconfiguration message to the UE 102. In response, the UE 102 transmits 338D a third RRC reconfiguration complete message to the MN 104A. After or in response to receiving the third RRC reconfiguration complete message, the MN 104A can send 339D a third SN message to the SN 106A. The UE 102 performs 340D a random access procedure on a cell (e.g., PSCell 125A, 126A, or other suitable cell other) in response to receiving or in accordance with the third SN configuration. The events 333D, 351D, 334D, 336D, 338D, 339D, and 340D are collectively referred to in FIG. 3D as the SCG failure recovery procedure 386D.

In implementations in which the third SN configuration is a full configuration and therefore does not augment the first SN configuration used by the UE 102 in event 328D, the UE 102 in DC with both the MN 104A and the SN 106A can communicate 346D data and control signals with the SN 106A by using consistent (i.e., same) configuration parameters (i.e., only the third SN configuration). In implementations in which the third SN configuration is a delta configuration that augments the first SN configuration, the UE 102 in DC can communicate 346D data and control signals with the SN 106A by using consistent (i.e., same) configuration parameters (i.e., the first and third SN configurations).

Figure 3E:
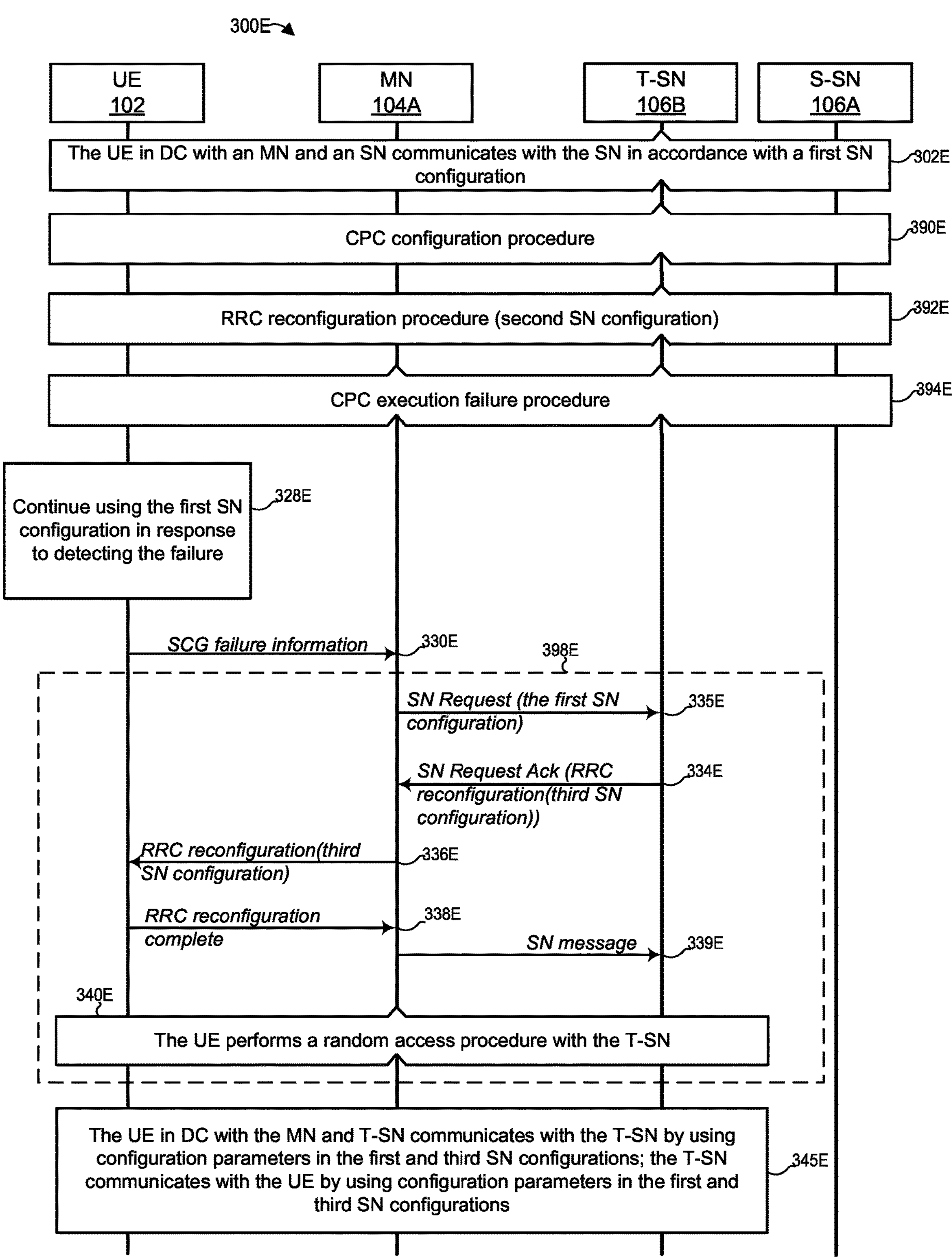
FIG. 3E is a messaging diagram of an example scenario in which a UE initially uses a first SN configuration, receives a conditional configuration followed by a second SN configuration, uses the first configuration after failing the conditional procedure, notifies the RAN of SCG failure, and receives a third SN configuration pertaining to a new (target) SN.

Referring now to FIG. 3E, whereas the UE 102 of FIG. 3B communicates in DC with the MN 104A and T-SN 106B by using consistent configuration parameters (i.e., second and/or third SN configurations), the UE 102 of FIG. 3E communicates in DC with the MN 104A and T-SN 106B by using consistent configuration parameters (i.e., first and third SN configurations). Otherwise, any of the implementations described above in reference to FIG. 3B can generally be applied to scenario 300E of FIG. 3E.

The base station 104A in a scenario 300E operates as an MN, the base station 106A operates as an S-SN, and the base station 106B operates as a T-SN. Events 302E, 390E, 392E, and 394E occur in scenario 300E, similar to events 302B, 390B, 392B, and 394B of scenario 300B, respectively.

In contrast to the UE 102 of FIG. 3B that continues using the second SN configuration in response to or after detecting the CPC reconfiguration failure or CPC execution failure in event 329B, the UE 102 of FIG. 3E continues 328E using the first SN configuration, similar to event 328C. Subsequently, the UE 102 transmits 330E an SCG failure information message to the MN 104A, similar to event 330B.

After the MN 104A receives 330E the SCG failure information message, the MN 104A initiates an SCG failure recovery procedure 398E, similar to the SCG failure recovery procedure 397B, except the MN 104A sends the first SN configuration instead of the second SN configuration to the T-SN 106B for the T-SN 106B to generate a third SN configuration as a delta configuration that augments the first SN configuration. Particularly, the MN 104A sends 335E an SN Request message including the first SN configuration to the T-SN 106B. Including first SN configuration parameters in the SN Request message may assist the T-SN 106B in determining the third SN configuration as a delta configuration. In response, the T-SN 106B generates a third RRC reconfiguration message including the third SN configuration (i.e., a delta configuration) and sends 334E to the MN 104A an SN Request Acknowledge message including the third RRC reconfiguration message. In turn, the MN 104A transmits 336E the third RRC reconfiguration message to the UE 102. In response, the UE 102 transmits 338E a third RRC reconfiguration complete message to the MN 104A. After or in response to receiving the third RRC reconfiguration complete message, the MN 104A can send 339E a third SN message to the T-SN 106B. The UE 102 performs 340E a random access procedure on a cell (e.g., PSCell 126B, or other suitable cell other) in response to receiving or in accordance with the third SN configuration. The events 335E, 334E, 336E, 338E, 339E, and 340E are collectively referred to in FIG. 3E as the SCG failure recovery procedure 398E.

Accordingly, the UE 102 in DC with both the MN 104A and the T-SN 106B can communicate 345E data and control signals with the T-SN 106B by using consistent (i.e., same) configuration parameters (i.e., first and third SN configurations).

Figure 3F:
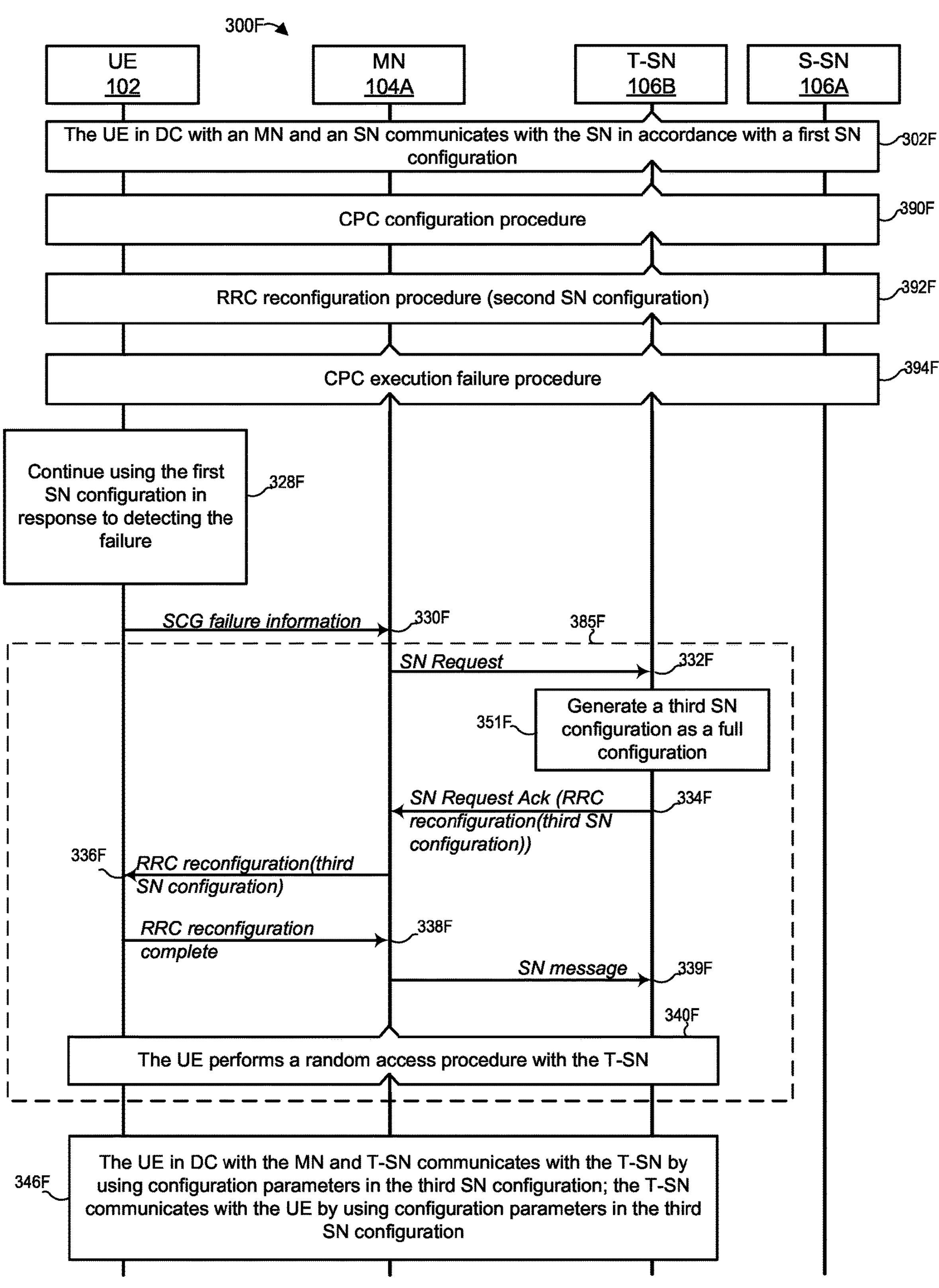
FIG. 3F is a messaging diagram of a scenario similar to that of FIG. 3E, but with the RAN supplying a full configuration as the third SN configuration for the target SN.

Referring now to FIG. 3F, whereas the UE 102 of FIG. 3E communicates in DC with the MN 104A and T-SN 106B by using consistent configuration parameters (i.e., first and third SN configurations, where the third SN configuration is a delta configuration), the UE 102 of FIG. 3F communicates in DC with the MN 104A and the T-SN 106B by using only the third SN configuration, which is a full configuration. Otherwise, any of the implementations described above in reference to FIG. 3E can generally be applied to scenario 300F of FIG. 3F.

The base station 104A in a scenario 300F operates as an MN, the base station 106A operates as an S-SN, and the base station 106B operates as a T-SN. Events 302F, 390F, 392F, 394F, 328F, and 330F occur in scenario 300F, similar to events 302E, 390E, 392E, 394E, 328E, and 330E of scenario 300E, respectively.

After the MN 104A receives 330F the SCG failure information message, the MN 104A initiates an SCG failure recovery procedure 385F, similar to the SCG failure recovery procedure 398E, except the T-SN 106B generates a third SN configuration always as a full configuration. That is, the T-SN 106B generates the third SN configuration as a full configuration by default, irrespective of whether the MN 104A provides the configuration (i.e., first SN configuration) utilized by the UE 102 in an SN Request message to the T-SN 106B, and irrespective of whether the SN Request message contains an explicit indication of the CPC execution failure. Particularly, the MN 104A sends 332F an SN Request message to the T-SN 106B. In some embodiments, the SN Request message can include an explicit indication of the CPC execution failure, similar to event 333D. In response, the T-SN 106B generates 351F a third SN configuration as a full configuration, similar to the manner in which the SN 106A generates the third SN configuration at event 351D, and sends 334F a third RRC reconfiguration message including the third SN configuration to the MN 104A in an SN Request Acknowledge message. In turn, the MN 104A transmits 336F the third RRC reconfiguration message to the UE 102. In response, the UE 102 transmits 338F a third RRC reconfiguration complete message to the MN 104A. After or in response to receiving the third RRC reconfiguration complete message, the MN 104A can send 339F a third SN message to the T-SN 106B. The UE 102 performs 340F a random access procedure on a cell (e.g., PSCell 126B, or other suitable cell other) in response to receiving or in accordance with the third SN configuration. The events 332F, 351F, 334F, 336F, 338F, 339F, and 340F are collectively referred to in FIG. 3F as the SCG failure recovery procedure 385F.

Because the third SN configuration is a full configuration and therefore does not augment the first SN configuration used by the UE 102 in event 328F, the UE 102 in DC with both the MN 104A and the T-SN 106B can communicate 346F data and control signals with the T-SN 106B by using consistent (i.e., same) configuration parameters (i.e., only the third SN configuration).

Turning now to FIGS. 4A-4F, these figures illustrate scenarios that resolve inconsistent configuration usage after CSAC reconfiguration failure or CSAC execution failure.

Figure 4A:
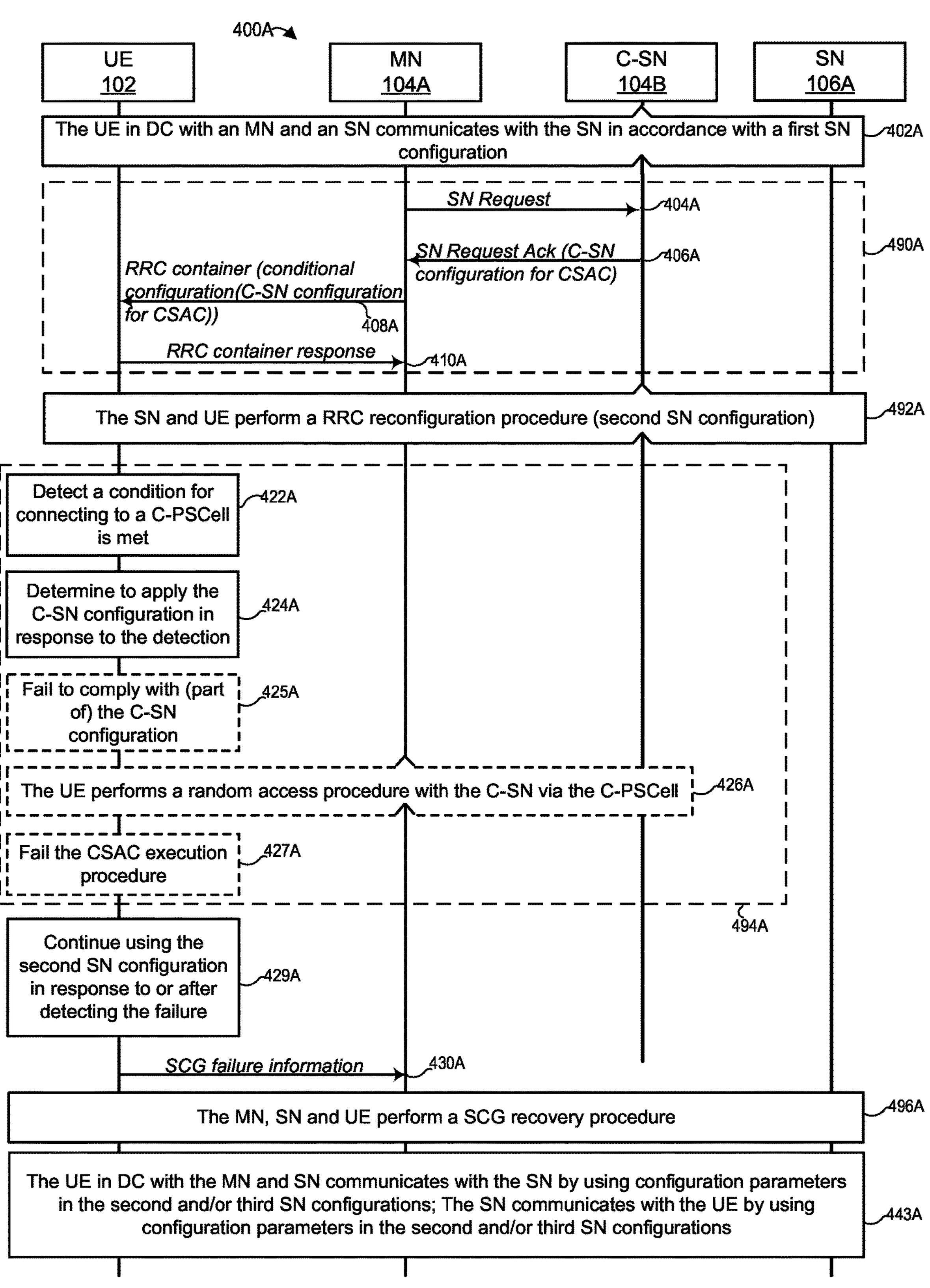
FIGS. 4A-F are messaging diagrams of scenarios generally similar to those of FIGS. 3A-F, respectively, but for CSAC or CPAC procedures.

Referring first to FIG. 4A, the base station 104A in a scenario 400A operates as an MN, the base station 106A operates as an SN, and the base station 104B operates as a C-SN.

Initially, the UE 102 communicates 402A data (e.g., UL data PDUs and/or DL data PDUs) in DC with the MN 104A and the SN 106A (e.g., via PSCell 126A) in accordance with a first SN configuration, similar to event 302A.

At a later time, the MN 104A determines to request, from the C-SN 104B, a conditional configuration (e.g., C-SN configuration) to provide to the UE 102 for a CSAC procedure so that the UE 102 can communicate with the C-SN 104B via a C-PSCell (e.g., cell 124B) when a condition is satisfied. The MN 104A can make this determination based on one or more measurement results received from the UE 102 directly (e.g., via an SRB established between the UE 102 and the MN 104A or via a physical control channel) that are above (or below) one or more predetermined thresholds, or from the MN 104A having analyzed measurements on signals, control channels, or data channels received from the UE 102, for example, or another suitable event (e.g., the UE 102 is moving toward the C-SN 104B).

In response to this determination, the MN 104A transmits 404A an SN Request message to the C-SN 104B. In response to the SN Request message, the C-SN 104B generates a C-SN configuration, which includes information that would enable the UE 102 to communicate with the C-SN 104B via a C-PSCell (e.g., cell 124B). The C-SN 104B includes the C-SN configuration in an SN Request Acknowledge message for the UE 102, and subsequently transmits 406A the SN Request Acknowledge message to the MN 104A in response to the SN Request message. In some implementations, the SN Request message can be an SN Addition Request or SN Modification Request message, and the SN Request Acknowledge message can be an SN Addition Request Acknowledge or SN Modification Request Acknowledge message.

The MN 104A transmits 408A an RRC reconfiguration message including the C-SN configuration to the UE 102, which in turn optionally transmits 410A an RRC reconfiguration complete message to the MN 104A in response to receiving the RRC reconfiguration message. In some implementations, the MN 104A may include the C-SN configuration message in an RRC container message and then include the RRC container message in the RRC reconfiguration message. In some implementations, the MN 104A includes, in the C-SN configuration, the RRC container message or in the RRC reconfiguration message, a condition (or conditions) for the UE 102 to detect, so that the UE 102 can communicate with the C-SN 104B if the condition is satisfied. The MN 104A can include the C-SN configuration in a conditional configuration field or IE of the RRC reconfiguration message. The MN 104A can further include a configuration ID associated to the C-SN configuration in the conditional configuration field/IE, so that the UE 102 can identify and store the C-SN configuration. The MN 104A may allocate the configuration ID, or receive the configuration ID from the C-SN 104B. The events 404A, 406A, 408A, and 410A are collectively referred to in FIG. 4A as the CSAC configuration procedure 490A.

At a later time, the SN 106A initiates 492A an RRC reconfiguration procedure with the UE 102, similar to event 392A. Consequently, the UE 102 immediately applies the second SN configuration received from the SN 106A via the MN 104A and consequently communicates in DC with the MN 104A and SN 106A by using the second SN configuration.

After performing 492A the RRC reconfiguration procedure, the UE 102 detects 422A that a condition for connecting to a C-PSCell 124B is satisfied, similar to event 322A. The UE 102 determines 424A to apply the C-SN configuration received at event 408A in response to the detection, similar to event 324A. In response to the determination, the UE 102 in some implementations performs a compliance check on the C-SN configuration, and according to the compliance check, if the UE 102 fails 425A to comply with the C-SN configuration (or at least part of the C-SN configuration), the UE 102 fails 427A a CSAC execution procedure, i.e., CSAC execution failure. If the UE 102 complies with the C-SN configuration as a result of the compliance check, the UE 102 initiates 426A a random access procedure on the C-PSCell 124B, similar to event 326A, but if the UE 102 fails to complete the random access procedure, the UE 102 determines that it has still failed 427A the CSAC execution procedure. The events 422A, 424A, 425A, 426A, and 427A are collectively referred to in FIG. 4A as the CSAC execution failure procedure 494A.

In response to the CSAC reconfiguration failure or CSAC execution failure, the UE 102 continues 428A using the second SN configuration received during the RRC reconfiguration procedure 492A instead of, in accordance with section 5.3.5.8.2 in 3GPP TS 38.331 v16.3.0, the first SN configuration, similar to event 328A. The UE 102 then transmits 430A an SCG failure information message (e.g., SCGFailureInformationNR message) to the MN 104A to indicate the failure, similar to event 330A.

After the MN 104A receives 430A the SCG failure information message, the MN 104A can initiate 496A an SCG failure recovery procedure with the SN 106A and UE 102 to recover from the CSAC reconfiguration failure or the CSAC execution failure, similar to event 396A. Consequently, the UE 102 receives a third SN configuration from the SN 106A via the MN 104A and performs a random access procedure on a cell (e.g., PSCell 126A, 124B, or other suitable cell other) in response to receiving or in accordance with the third SN configuration.

After successfully completing the random access procedure on the cell with the SN 106A at event 496A, the UE 102 in DC with both the MN 104A and the SN 106A can communicate 443A data and control signals with the SN 106A by using consistent (i.e., same) configuration parameters (i.e., second and/or third SN configurations). In implementations in which the third SN configuration is a delta configuration that augments the second SN configuration, the UE 102 can communicate 443A with the SN 106A by using the second and third SN configurations. In other implementations in which the third SN configuration is a complete and self-contained configuration (i.e., a full configuration) that does not augment the second SN configuration, the UE 102 can communicate 443A with the SN 106A by using the third SN configuration only.

Any of the RRC messages (e.g., RRC reconfiguration message(s), the RRC reconfiguration complete message(s), the RRC container message(s), RRC container response message(s)), random access procedure, and configurations (e.g., trigger condition configuration, conditional configuration, C-SN configuration, SN configuration(s)) utilized in scenario 400A can correspond to those described in scenario 300A.

Figure 4B:
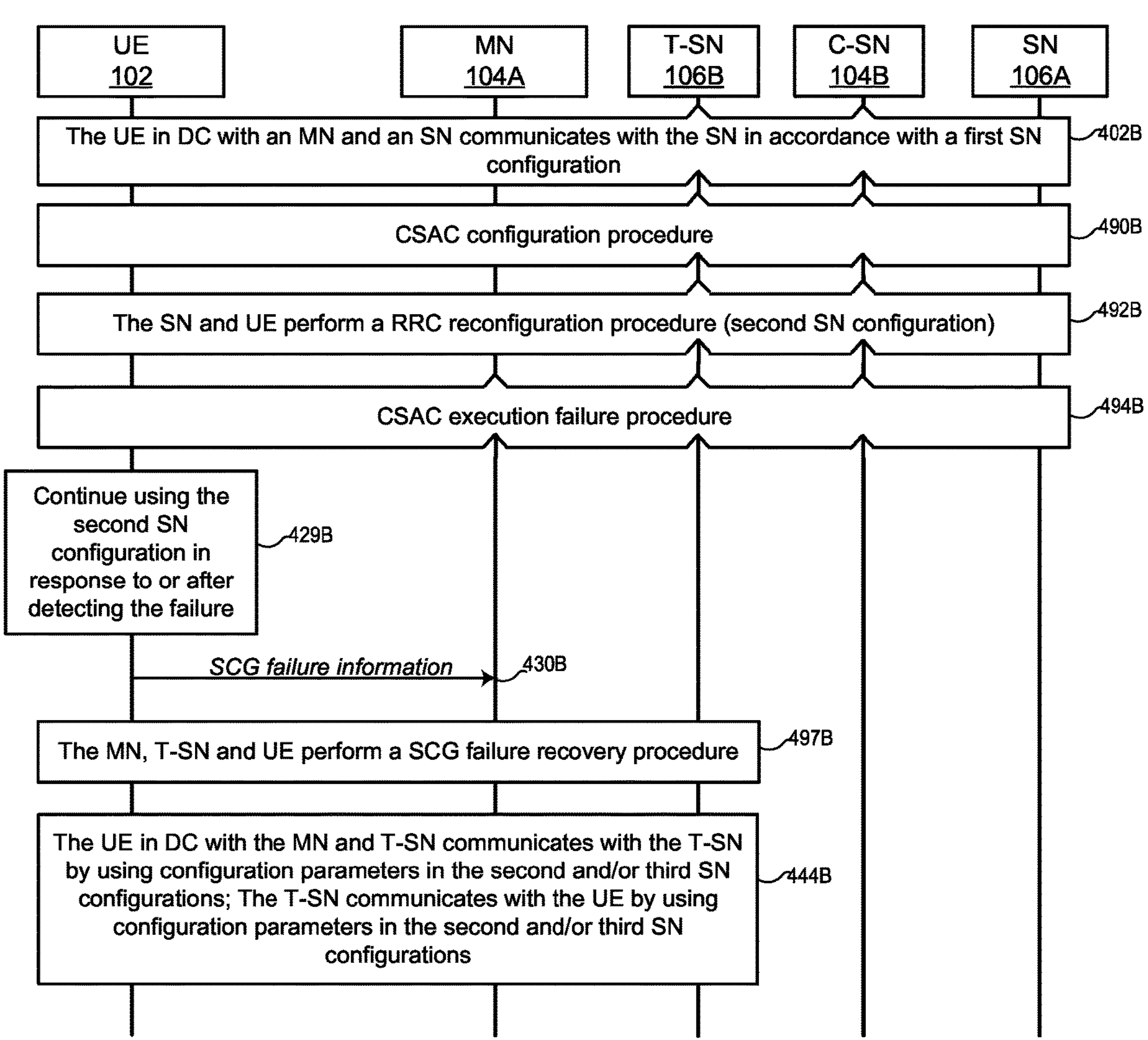

Referring now to FIG. 4B, whereas the UE 102 of FIG. 4A communicates in DC with the MN 104A and the SN 106A by using consistent configuration parameters, the UE 102 of FIG. 4B communicates in DC with the MN 104A and a different SN (e.g., T-SN 106B) by using consistent configuration parameters. Otherwise, any of the implementations described above in reference to FIG. 4A can generally be applied to scenario 400B of FIG. 4B.

The base station 104A in a scenario 400B operates as an MN, the base station 106A operates as a source SN (S-SN), the base station 104B operates as a C-SN, and the base station 106B operates as a target SN (T-SN). Events 402B, 490B, 492B, 494B, 429B, and 430B occur in scenario 400B, similar to events 402A, 490A, 492A, 494A, 429A, and 430A of scenario 400A, respectively.

After the MN 104A receives 430B the SCG failure information message, the MN 104A initiates an SCG failure recovery procedure 497B with a different SN (e.g., the T-SN 106B), similar to the SCG failure recovery procedure 397B, for the UE 102 to recover from the CSAC reconfiguration failure or the CSAC execution failure.

Accordingly, the UE 102 in DC with both the MN 104A and the T-SN 106B can communicate 444B data and control signals with the T-SN 106B by using consistent (i.e., same) configuration parameters (i.e., second and/or third SN configurations). The third SN configuration can be a delta configuration in some implementations, or a full configuration in other implementations, as described above in FIG. 4A.

Figure 4C:
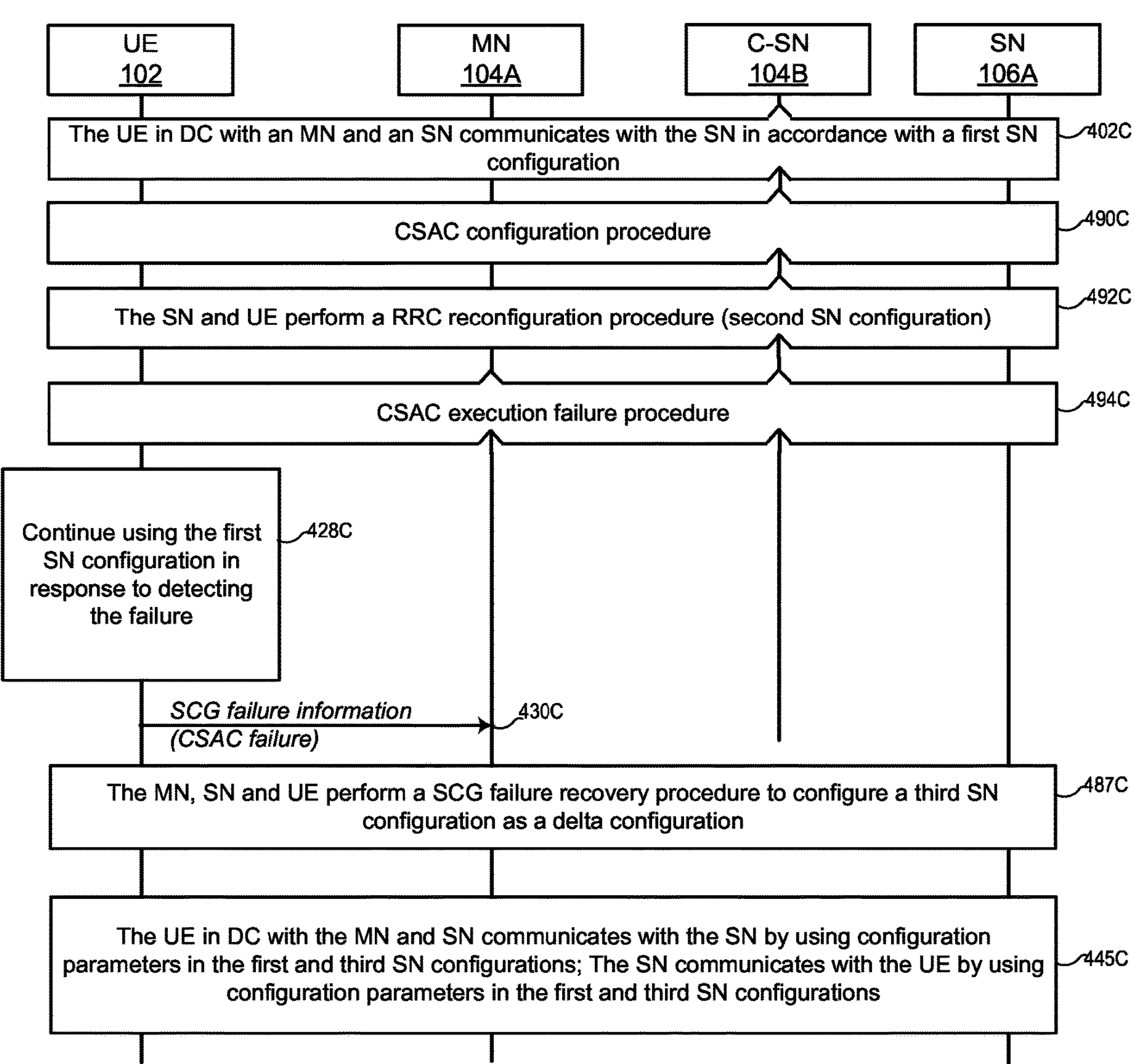

Referring now to FIG. 4C, whereas the UE 102 of FIG. 4A communicates in DC with the MN 104A and the SN 106A by using consistent configuration parameters (i.e., second and/or third SN configurations), the UE 102 of FIG. 4C communicates in DC with the MN 104A and the SN 106A by using different but consistent configuration parameters (i.e., first and third SN configurations). Otherwise, any of the implementations described above in reference to FIG. 4A can generally be applied to scenario 400C of FIG. 4C.

The base station 104A in a scenario 400C operates as an MN, the base station 106A operates as an SN, and the base station 104B operates as a C-SN. Events 402C, 490C, 492C, and 494C occur in scenario 400C, similar to events 402A, 490A, 492A, and 494A of scenario 400A, respectively.

In contrast to the UE 102 of FIG. 4A that continues 429A using the second SN configuration received during the RRC reconfiguration procedure 492A, the UE 102 of FIG. 4C continues 428C using the first SN configuration, e.g., in accordance with section 5.3.5.8.2 in 3GPP TS 38.331 v16.3.0. Subsequently, the UE 102 transmits 430C an SCG failure information message to the MN 104A to indicate the failure, and to notify the MN 104A of the UE 102 reverting back to the first SN configuration.

Based on the SCG failure information message, the MN 104A determines that the UE 102 detected the CSAC reconfiguration failure or CSAC execution failure and reverted back to using the first SN configuration instead of maintaining the second SN configuration. In some implementations, the SCG failure information message includes an explicit indication of the CSAC execution failure that triggers logic stored in the MN 104A to make the determination. In other implementations, the SCG failure information message includes no such explicit indication, and the MN 104A determines that the UE 102 detected the CSAC reconfiguration failure or CSAC execution failure based on the timing of receiving the SCG failure information message from the UE 102. For instance, the MN 104A can be configured to set a timer when the second SN configuration was sent to the UE 102 during the RRC reconfiguration procedure 492C. If the MN 104A receives the SCG failure information message from the UE 102 before the timer expires, the MN 104A determines that the UE 102 detected an immediate failure (e.g., immediate SN addition/change failure). If the MN 104A receives the SCG failure information message from the UE 102 after the timer expires, the MN 104A determines that the UE 102 detected conditional failure (e.g., the CSAC reconfiguration failure or CSAC execution failure).

In any case, based on the SCG failure information message, the MN 104A performs an SCG failure recovery procedure 487C with the SN 106A and UE 102, similar to the SCG failure recovery procedure 387C, to recover from the CSAC failure. Consequently, the SN 106A continues using the first SN configuration instead of the second SN configuration to communicate with the UE 102, and the UE 102 receives a third SN configuration (e.g., a delta configuration that augments the first SN configuration).

Accordingly, the UE 102 in DC with both the MN 104A and the SN 106A can communicate 445C data and control signals with the SN 106A by using consistent (i.e., same) configuration parameters (i.e., first and third SN configurations).

Figure 4D:
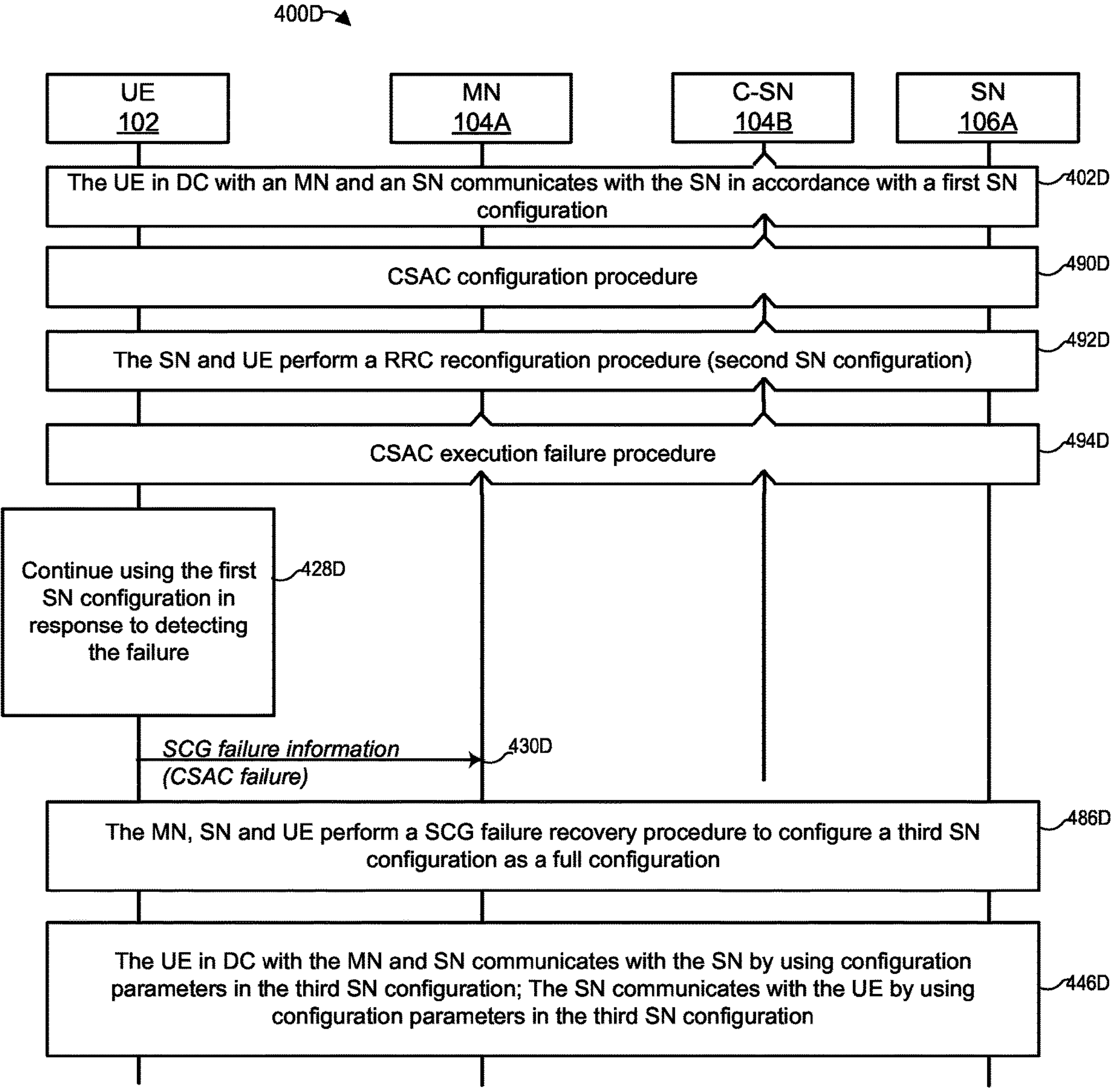

Referring now to FIG. 4D, whereas the UE 102 of FIG. 4C communicates in DC with the MN 104A and the SN 106A by using consistent configuration parameters (i.e., first and third SN configurations), the UE 102 of FIG. 4D communicates in DC with the MN 104A and the SN 106A by using only the third SN configuration, which is a full configuration. Otherwise, any of the implementations described above in reference to FIG. 4C can generally be applied to scenario 400D of FIG. 4D.

The base station 104A in a scenario 400D operates as an MN, the base station 106A operates as an SN, and the base station 104B operates as a C-SN. Events 402D, 490D, 492D, 494D, 428D, and 430D occur in scenario 400D, similar to events 402C, 490C, 492C, 494C, 428C, and 430C of scenario 400C, respectively.

In response to receiving 430D the SCG failure information message from the UE 102, the MN 104A triggers the SN 106A to generate a third SN configuration. In some implementations, based on the SCG failure information message indicative of the UE 102 having detected conditional failure, the MN 104A instructs the SN 106A to generate the third SN configuration as a full configuration during an SCG failure recovery procedure 486D with the SN 106A and UE 102, similar to the SCG failure recovery procedure 386D, to recover from the CSAC failure (i.e., CSAC reconfiguration failure or the CSAC execution failure), in some implementations. In other implementations, based on the SCG failure information message indicative of the UE 102 having detected immediate failure (e.g., immediate SN addition/change failure), the MN 104A triggers the SN 106A to generate the third SN configuration as a delta configuration that augments the first SN configuration during the SCG failure recovery procedure 486D with the SN 106A and UE 102 to recover from an immediate failure.

Accordingly, the UE 102 in DC with both the MN 104A and the SN 106A can communicate 446D data and control signals with the SN 106A by using consistent (i.e., same) configuration parameters (i.e., only the third SN configuration in some implementations, or both the first and third SN configuration in other implementations).

Figure 4E:
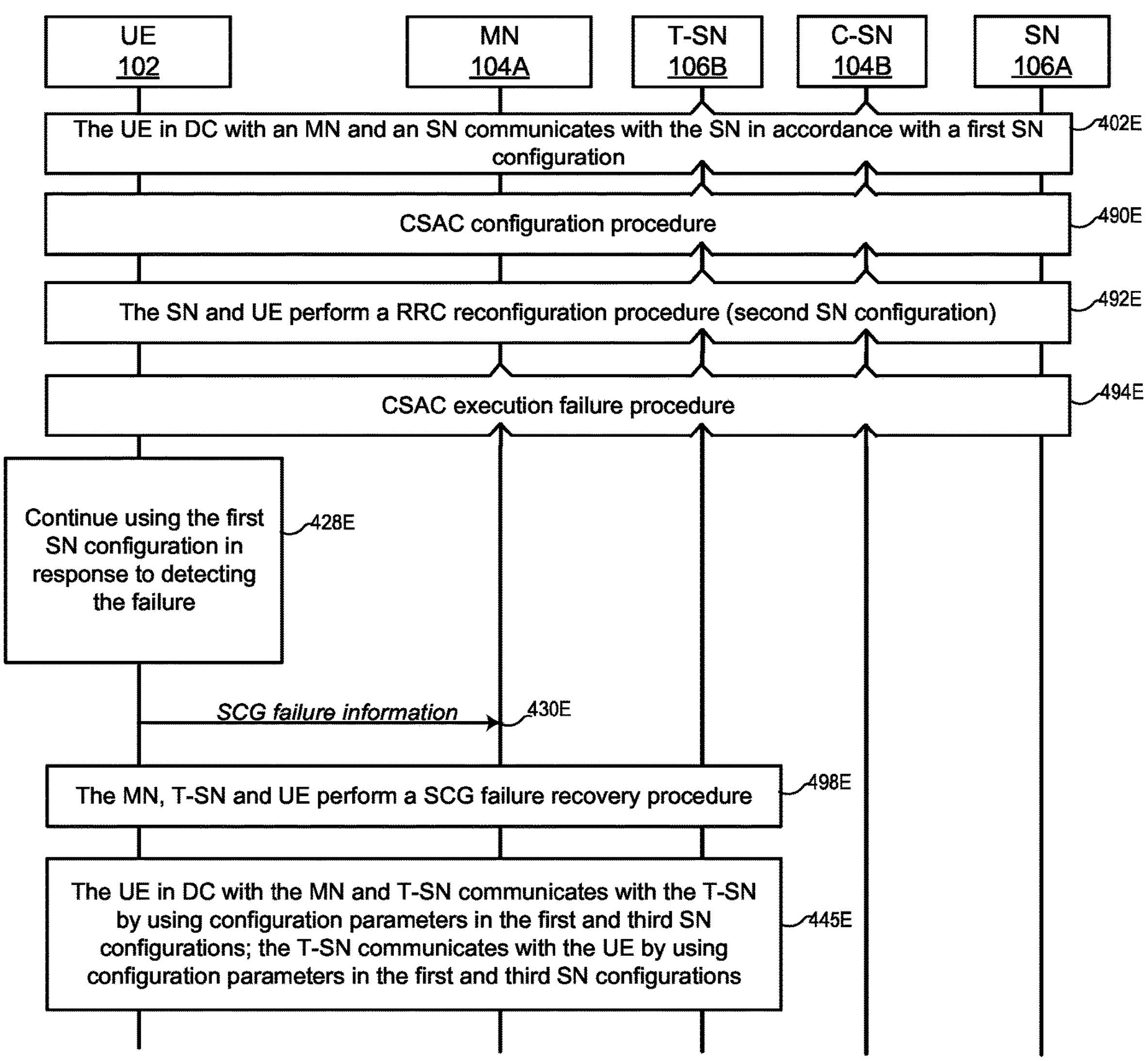

Referring now to FIG. 4E, whereas the UE 102 of FIG. 4B communicates in DC with the MN 104A and T-SN 106B by using consistent configuration parameters (i.e., second and/or third SN configurations), the UE 102 of FIG. 4E communicates in DC with the MN 104A and T-SN 106B by using consistent configuration parameters (i.e., first and third SN configurations). Otherwise, any of the implementations described above in reference to FIG. 4B can generally be applied to scenario 400E of FIG. 4E.

The base station 104A in a scenario 400E operates as an MN, the base station 106A operates as an S-SN, the base station 104B operates as a C-SN, and the base station 106B operates as a T-SN. Events 402E, 490E, 492E, and 494E occur in scenario 400E, similar to events 402B, 490B, 492B, and 494B of scenario 400B, respectively.

In contrast to the UE 102 of FIG. 4B that continues using the second SN configuration in response to or after detecting the CSAC reconfiguration failure or CSAC execution failure in event 429B, the UE 102 of FIG. 4E continues 428E using the first SN configuration, similar to event 428C. Subsequently, the UE 102 transmits 430E an SCG failure information message to the MN 104A, similar to event 430B.

After the MN 104A receives 430E the SCG failure information message, the MN 104A initiates an SCG failure recovery procedure 498E, similar to the SCG failure recovery procedure 398E. Consequently, the T-SN 106B continues using the first SN configuration instead of the second SN configuration to communicate with the UE 102, and the UE 102 receives a third SN configuration (i.e., a delta configuration).

Accordingly, the UE 102 in DC with both the MN 104A and the T-SN 106B can communicate 445E data and control signals with the T-SN 106B by using consistent (i.e., same) configuration parameters (i.e., first and third SN configurations).

Figure 4F:
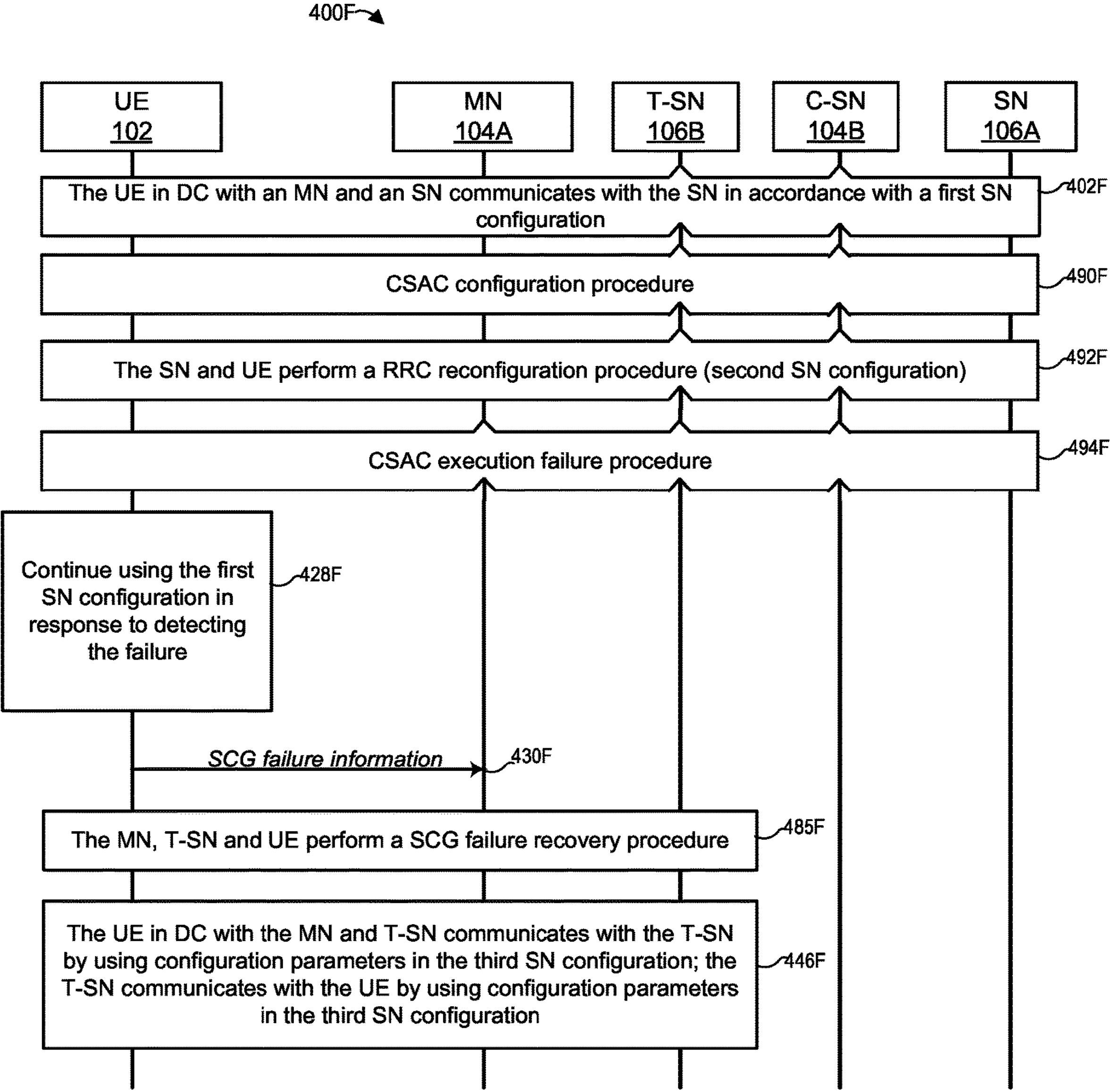

Referring now to FIG. 4F, whereas the UE 102 of FIG. 4E communicates in DC with the MN 104A and T-SN 106B by using consistent configuration parameters (i.e., first and third SN configurations, where the third SN configuration is a delta configuration), the UE 102 of FIG. 4F communicates in DC with the MN 104A and the T-SN 106B by using only the third SN configuration, which is a full configuration. Otherwise, any of the implementations described above in reference to FIG. 4E can generally be applied to scenario 400F of FIG. 4F.

The base station 104A in a scenario 400F operates as an MN, the base station 106A operates as an S-SN, the base station 104B operates as a C-SN, and the base station 106B operates as a T-SN. Events 402F, 490F, 492F, 494F, 428F, and 430F occur in scenario 400F, similar to events 402E, 490E, 492E, 494E, 428E, and 430E of scenario 400E, respectively.

After the MN 104A receives 430F the SCG failure information message, the MN 104A initiates an SCG failure recovery procedure 485F, similar to the SCG failure recovery procedure 385F. That is, the T-SN 106B generates the third SN configuration as a full configuration by default, irrespective of whether the MN 104A provides the configuration (i.e., first SN configuration) utilized by the UE 102 in an SN Request message to the T-SN 106B, and irrespective of whether the SN Request message contains an explicit indication of the CSAC execution failure. Consequently, the T-SN 106B does not continue using the first SN configuration, and by default, provides a third SN configuration as a full configuration to the UE 102.

Because the third SN configuration is a full configuration and therefore does not augment the first SN configuration used by the UE 102 in event 428F, the UE 102 in DC with both the MN 104A and the T-SN 106B can communicate 446F data and control signals with the T-SN 106B by using consistent (i.e., same) configuration parameters (i.e., only the third SN configuration).

Turning now to FIGS. 5A-5F, these figures illustrate inter-base station scenarios that resolve inconsistent configuration usage after CHO reconfiguration failure or CHO execution failure.

Figure 5A:
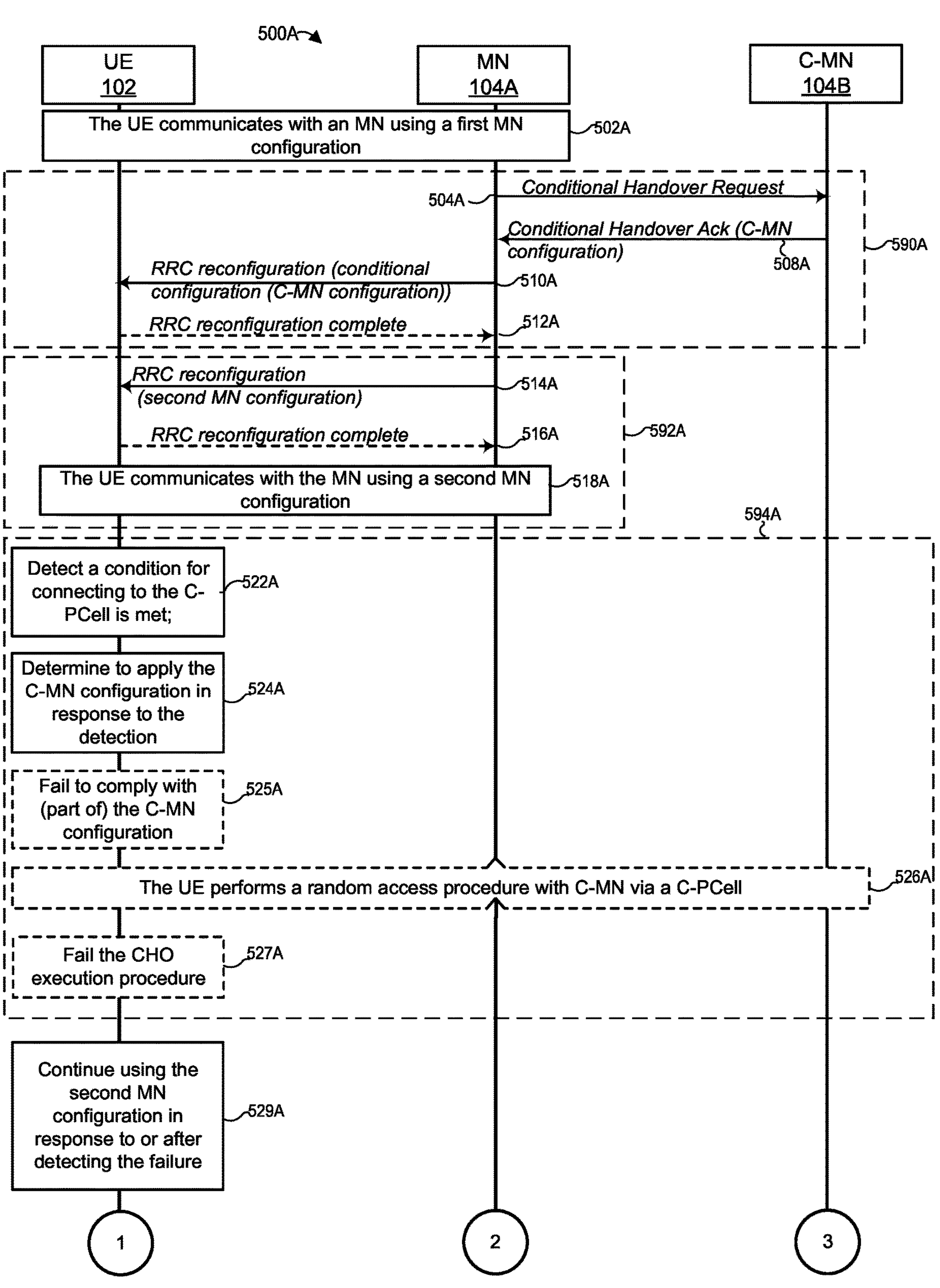
FIGS. 5A-F are messaging diagrams of scenarios generally similar to those of FIGS. 3A-F, respectively, but for conditional handover (CHO) procedures.
Figure 5A:
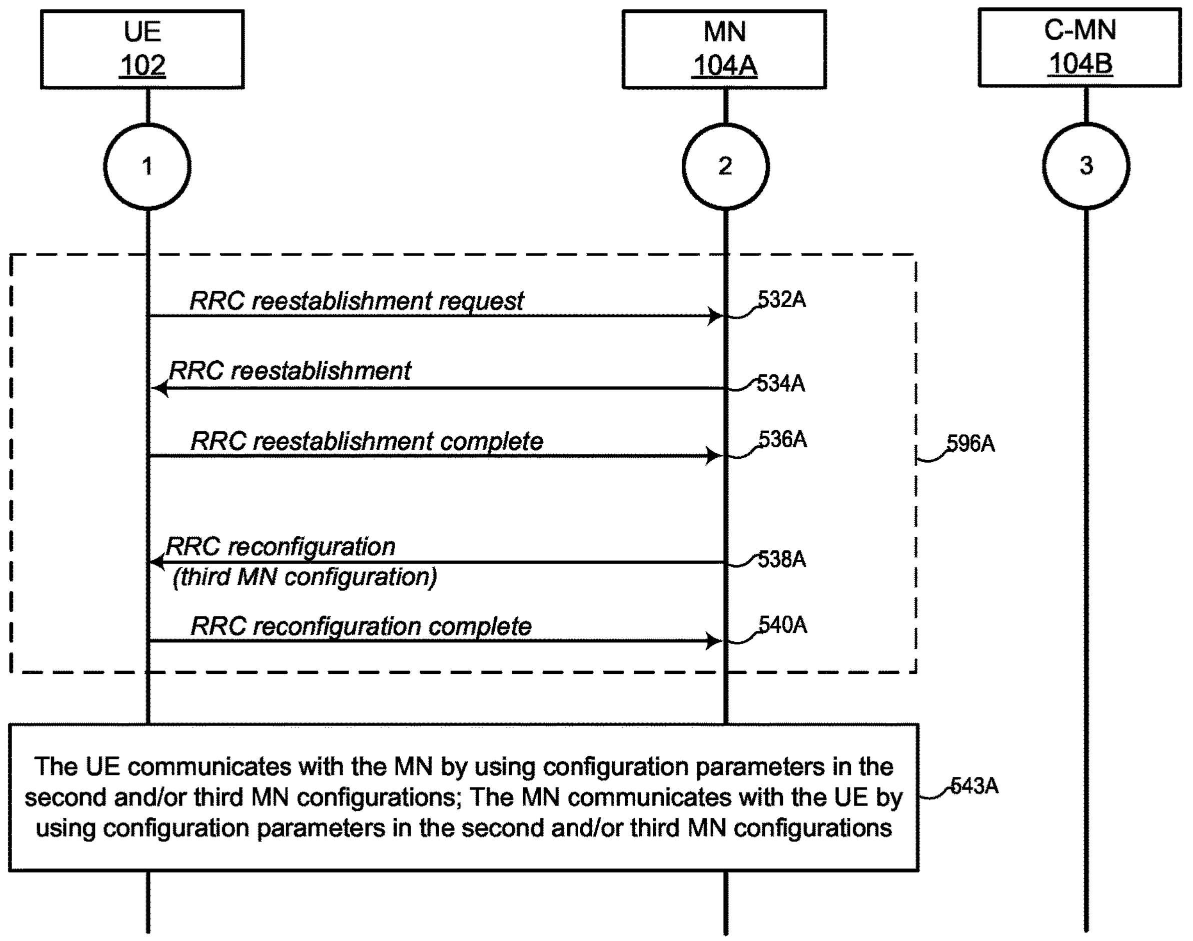

Referring first to FIG. 5A, the base station 104A in a scenario 500A operates as an MN, and the base station 104B operates as a candidate MN (C-MN).

Initially, the UE 102 communicates 502A data (e.g., UL data PDUs and/or DL data PDUs) with the MN 104A via a primary cell (e.g., PCell 124A) in accordance with a first MN configuration.

At a later time, the MN 104A determines to request, from the C-MN 104B, a conditional configuration (e.g., C-MN configuration) to provide to the UE 102 for a CHO procedure so that the UE 102 can communicate with the C-MN 104B via a C-PCell (e.g., cell 124B) when a condition is satisfied. The MN 104A can make this determination based on one or more measurement results received from the UE 102 directly (e.g., via an SRB established between the UE 102 and the MN 104A or via a physical control channel) that are above (or below) one or more predetermined thresholds, or from the MN 104A having analyzed measurements on signals, control channels, or data channels received from the UE 102, for example, or another suitable event (e.g., the UE 102 is moving toward the C-MN 104B).

In response to this determination, the MN 104A transmits 504A a Conditional Handover Request message (e.g., a Handover Request message including a CHO information request) to the C-MN 104B. In response to the Conditional Handover Request message, the C-MN 104B generates a C-MN configuration, which includes information that would enable the UE 102 to communicate with the C-MN 104B via a C-PCell (e.g., cell 124B). The C-MN 104B includes the C-MN configuration in a Conditional Handover Request Acknowledge message (e.g., a Handover Request Acknowledge message) for the UE 102, and subsequently transmits 508A the Conditional Handover Request Acknowledge message to the MN 104A in response to the Conditional Handover Request message. In some implementations, instead of including the C-MN configuration in the Conditional Handover Request Acknowledge message, the C-MN 104B may include a CHO command in the Conditional Handover Request Acknowledge message. In other cases, the C-MN 104B can include the C-MN configuration in the CHO command, and include the CHO command in the Conditional Handover Request Acknowledge message.

The MN 104A transmits 510A an RRC reconfiguration message including the C-MN configuration to the UE 102, which in turn optionally transmits 512A an RRC reconfiguration complete message to the MN 104A in response to receiving the RRC reconfiguration message. In some implementations, the MN 104A includes, in the C-MN configuration or in the RRC reconfiguration message, a condition (or conditions) for the UE 102 to detect, so that the UE 102 can communicate with the C-MN 104B if the condition is satisfied. The MN 104A can include the C-MN configuration in a conditional configuration field or information element (IE) (e.g., CondReconfigToAddMod-r16 IE) of the RRC reconfiguration message. The MN 104A can further include a configuration identity/identifier (ID) associated to the C-MN configuration in the conditional configuration field/IE, so that the UE 102 can identify and store the C-MN configuration. The MN 104A may allocate the configuration ID, or receive the configuration ID from the C-MN 104B. The events 504A, 508A, 510A, and 512A are collectively referred to in FIG. 5A as the CHO configuration procedure 590A.

At a later time, the MN 104A initiates 592A an RRC reconfiguration procedure with the UE 102. In response to the initiation, the MN 104A sends 514A a second RRC reconfiguration message including a second MN configuration to the UE 102. In contrast to the C-MN configuration for a CHO procedure that the UE 102 applies only when the UE 102 determines that a condition associated with the C-MN configuration is satisfied, the second MN configuration is an immediate or non-conditional configuration. Accordingly, in response to the second RRC reconfiguration message, the UE 102 immediately applies the second MN configuration and may transmit 516A a second RRC reconfiguration complete message to the MN 104A. Consequently, the UE 102 communicates 518A with the MN 104A by using the second MN configuration. The events 514A, 516A, and 518A are collectively referred to in FIG. 5A as the RRC reconfiguration procedure 592A.

After performing 592A the RRC reconfiguration procedure, the UE 102 detects 522A that a condition for connecting to a C-PCell 124B is satisfied, similar to event 322A. The UE 102 determines 524A to apply the C-MN configuration received at event 510A in response to the detection, similar to event 324A. In response to the determination, the UE 102 in some implementations performs a compliance check on the C-MN configuration, and according to the compliance check, if the UE 102 fails 525A to comply with the C-MN configuration (or at least part of the C-MN configuration), the UE 102 fails 527A a CHO execution procedure, i.e., CHO execution failure. If the UE 102 complies with the C-MN configuration as a result of the compliance check, the UE 102 initiates 526A a random access procedure on the C-PCell 124B, similar to event 326, but if the UE 102 fails to complete the random access procedure, the UE 102 determines that it has still failed 527A the CHO execution procedure. The events 522A, 524A, 525A, 526A, and 527A are collectively referred to in FIG. 5A as the CHO execution failure procedure 594A.

In response to the CHO reconfiguration failure or CHO execution failure, the UE 102 continues 529A using the second MN configuration received during the RRC reconfiguration procedure 592A instead of, in accordance with section 5.3.5.8.2 in 3GPP TS 38.331 v16.3.0, the first MN configuration. The UE 102 subsequently initiates an RRC connection establishment procedure 596A with the MN 104A to recover from the CHO reconfiguration failure or the CHO execution failure. Particularly, the UE 102 can initiate the RRC connection establishment procedure 596A by sending 532A an RRC reestablishment request message (e.g., a RRCConnectionReestablishmentRequest or RRCReestablishmentRequest message) to the MN 104A. In response, the MN 104A sends 534A an RRC reestablishment message (e.g., a RRCConnectionReestablishment or RRCReestablishment message) to the UE 102, which in turn can send 536A an RRC reestablishment complete message (e.g., a RRCConnectionReestablishmentComplete or RRCReestablishmentComplete message) back to the MN 104A. In response to or after receiving the RRC reestablishment request message or the RRC reestablishment complete message, the MN 104A can send 538A a third RRC reconfiguration message including a third MN configuration to the UE 102. After receiving 538A the third RRC reconfiguration message, the UE 102 can send 540A an RRC reconfiguration complete message back to the MN 104A. Consequently, the UE 102 can perform a random access procedure on a cell (e.g., PCell 124A, or other suitable cell other) in response to receiving or in accordance with the third MN configuration. The events 532A, 534A, 536A, 538A, and 540A are collectively referred to in FIG. 5A as the RRC connection reestablishment procedure 596A. During the RRC connection reestablishment procedure 596A, the MN 104A also retains the most recent configuration (i.e., the second MN configuration) provided to the UE 102 prior to the CHO execution failure procedure 594A.

After successfully completing the random access procedure on the cell with the MN 104A at event 596A, the UE 102 can communicate 543A data and control signals with the MN 104A by using consistent (i.e., same) configuration parameters (i.e., second and/or third MN configurations). In implementations in which the third MN configuration is a delta configuration that augments the second MN configuration, the UE 102 can communicate 543A with the MN 104A by using the second and third MN configurations. In other implementations in which the third MN configuration is a complete and self-contained configuration (i.e., a full configuration) that does not augment the second MN configuration, the UE 102 can communicate 543A with the MN 104A by using the third MN configuration only.

Any of the RRC messages (e.g., RRC reconfiguration message(s), the RRC reconfiguration complete message(s)) and random access procedure utilized in scenario 500A can correspond to those described in scenario 300A. The configurations (e.g., trigger condition configuration, conditional configuration, C-MN configuration, MN configuration(s)) utilized in scenario 500A can correspond to those described in scenario 300A, except that the configurations involve an MN instead of an SN.

Figure 5B:
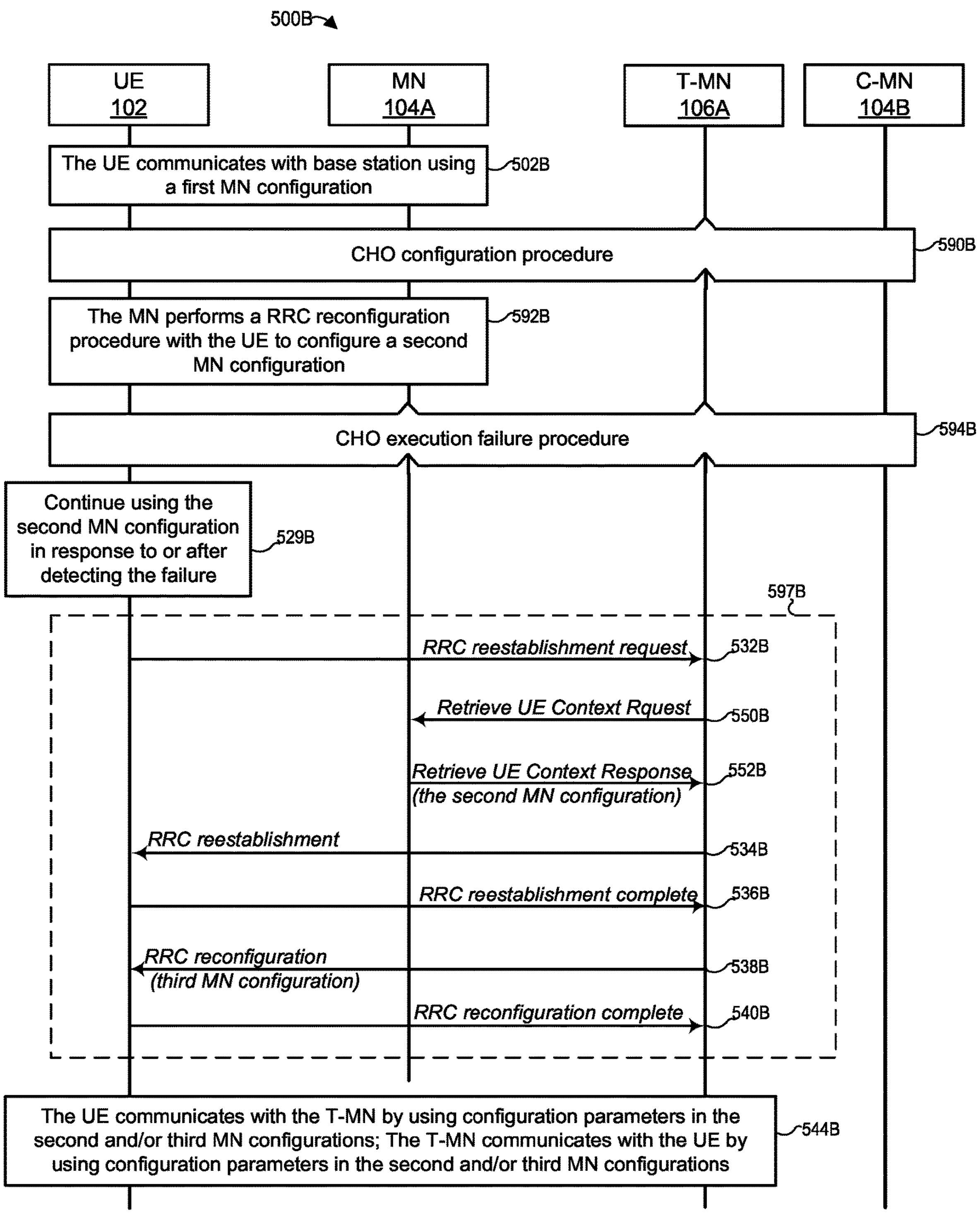

Referring now to FIG. 5B, whereas the UE 102 of FIG. 5A communicates with the MN 104A by using consistent configuration parameters, the UE 102 of FIG. 5B communicates with a different MN (e.g., T-MN 106A) by using consistent configuration parameters. Otherwise, any of the implementations described above in reference to FIG. 5A can generally be applied to scenario 500B of FIG. 5B.

The base station 104A in a scenario 500B operates as an MN, the base station 104B operates as a C-MN, and the base station 106A operates as a T-MN. Events 502B, 590B, 592B, 594B, and 529B occur in scenario 500B, similar to events 502A, 590A, 592A, 594A, and 529A of scenario 500A, respectively.

The UE 102 then initiates an RRC connection establishment procedure 597B, similar to the RRC connection establishment procedure 596A, except with a different MN (e.g., the T-MN 106A) for the UE 102 to recover from the CHO reconfiguration failure or the CHO execution failure. Particularly, the UE 102 can initiate 597B the RRC connection establishment procedure with the T-MN 106A by sending 532B an RRC reestablishment request message to the T-MN 106A. In response, the T-MN 106A sends 550B a Retrieve UE Context Request message to the MN 104A, which in turn sends 552B a Retrieve UE Context Response message including the second MN configuration used by the UE 102 at event 529B to the T-MN 106A. In response, the T-MN 106A transmits 534B an RRC reestablishment message to the UE 102, which in turn can send 536B an RRC reestablishment complete message back to the T-MN 106A. In response to receiving the RRC reestablishment complete message, the T-MN 106A can send 538B a third RRC reconfiguration message including a third MN configuration to the UE 102, which in turn can send 540B an RRC reconfiguration complete message back to the T-MN 106A. The events 532B, 550B, 552B, 534B, 536B, 538B, and 540B are collectively referred to in FIG. 5B as the RRC connection establishment procedure 597B.

Consequently, the UE 102 can perform a random access procedure on a cell (e.g., PCell 126A, or other suitable cell other) in response to receiving or in accordance with the third MN configuration. After successfully completing the random access procedure on the cell with the T-MN 106A at event 597B, the UE 102 can communicate 544B data and control signals with the T-MN 106A by using consistent (i.e., same) configuration parameters (i.e., second and/or third MN configurations). The third MN configuration can be a delta configuration in some implementations, or a full configuration in other implementations, as described above in FIG. 5A.

Figure 5C:
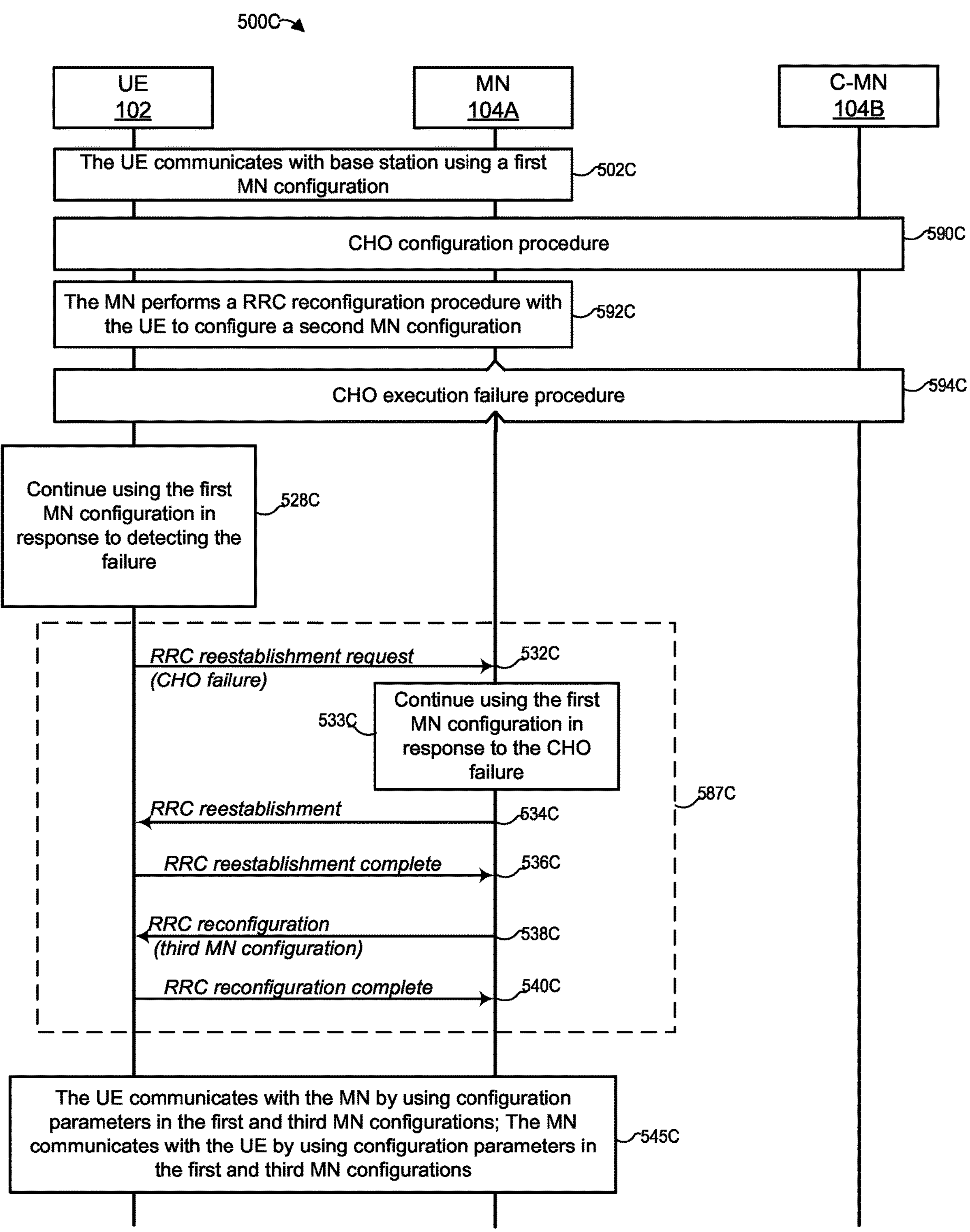

Referring now to FIG. 5C, whereas the UE 102 of FIG. 5A communicates with the MN 104A by using consistent configuration parameters (i.e., second and/or third MN configurations), the UE 102 of FIG. 5C communicates with the MN 104A by using different but consistent configuration parameters (i.e., first and third MN configurations). Otherwise, any of the implementations described above in reference to FIG. 5A can generally be applied to scenario 500C of FIG. 5C.

The base station 104A in a scenario 500C operates as an MN and the base station 104B operates as a C-MN. Events 502C, 590C, 592C, and 594C occur in scenario 500C, similar to events 502A, 590A, 592A, and 594A of scenario 500A, respectively.

In contrast to the UE 102 of FIG. 5A that continues 529A using the second MN configuration received during the RRC reconfiguration procedure 592A, the UE 102 of FIG. 5C continues 528C using the first MN configuration, e.g., in accordance with section 5.3.5.8.2 in 3GPP TS 38.331 v16.3.0. Subsequently, the UE 102 transmits 532C an RRC reestablishment request message to the MN 104A to indicate the failure, and to notify the MN 104A of the UE 102 reverting back to the first MN configuration.

Based on the RRC reestablishment request message, the MN 104A determines that the UE 102 detected the CHO reconfiguration failure or CHO execution failure and reverted back to using the first MN configuration instead of maintaining the second MN configuration. In some implementations, the RRC reestablishment request message includes an explicit indication of the CHO execution failure that triggers logic stored in the MN 104A to make the determination. In other implementations, the RRC reestablishment request message includes no such explicit indication, and the MN 104A determines that the UE 102 detected the CHO reconfiguration failure or CHO execution failure based on the timing of receiving the RRC reestablishment request message from the UE 102. For instance, the MN 104A can be configured to set a timer when the second MN configuration was sent to the UE 102 during the RRC reconfiguration procedure 592C. If the MN 104A receives the RRC reestablishment request message from the UE 102 before the timer expires, the MN 104A determines that the UE 102 detected an immediate failure (e.g., immediate handover failure). If the MN 104A receives the RRC reestablishment request message from the UE 102 after the timer expires, the MN 104A determines that the UE 102 detected conditional failure (e.g., the CHO reconfiguration failure or CHO execution failure).

In any case, in response to receiving 532C the RRC reestablishment request message, the MN 104A continues 533C using the first MN configuration instead of the second MN configuration to communicate with the UE 102, and transmits 534C an RRC reestablishment message to the UE 102. In turn, the UE 102 can send 536C an RRC reestablishment complete message back to the MN 104A. In response to receiving the RRC reestablishment complete message, the MN 104A can send 538C a third RRC reconfiguration message including a third MN configuration (e.g., delta configuration that augments the first MN configuration) to the UE 102, which in turn can send 540C an RRC reconfiguration complete message back to the MN 104A. The events 532C, 533C, 534C, 536C, 538C, and 540C are collectively referred to in FIG. 5C as the RRC connection establishment procedure 587C.

Consequently, the UE 102 can perform a random access procedure on a cell (e.g., PCell 124A, or other suitable cell other) in response to receiving or in accordance with the third MN configuration. After successfully completing the random access procedure on the cell with the MN 104A at event 587C, the UE 102 can communicate 545C data and control signals with the MN 104A by using consistent (i.e., same) configuration parameters (i.e., first and third MN configurations).

Figure 5D:
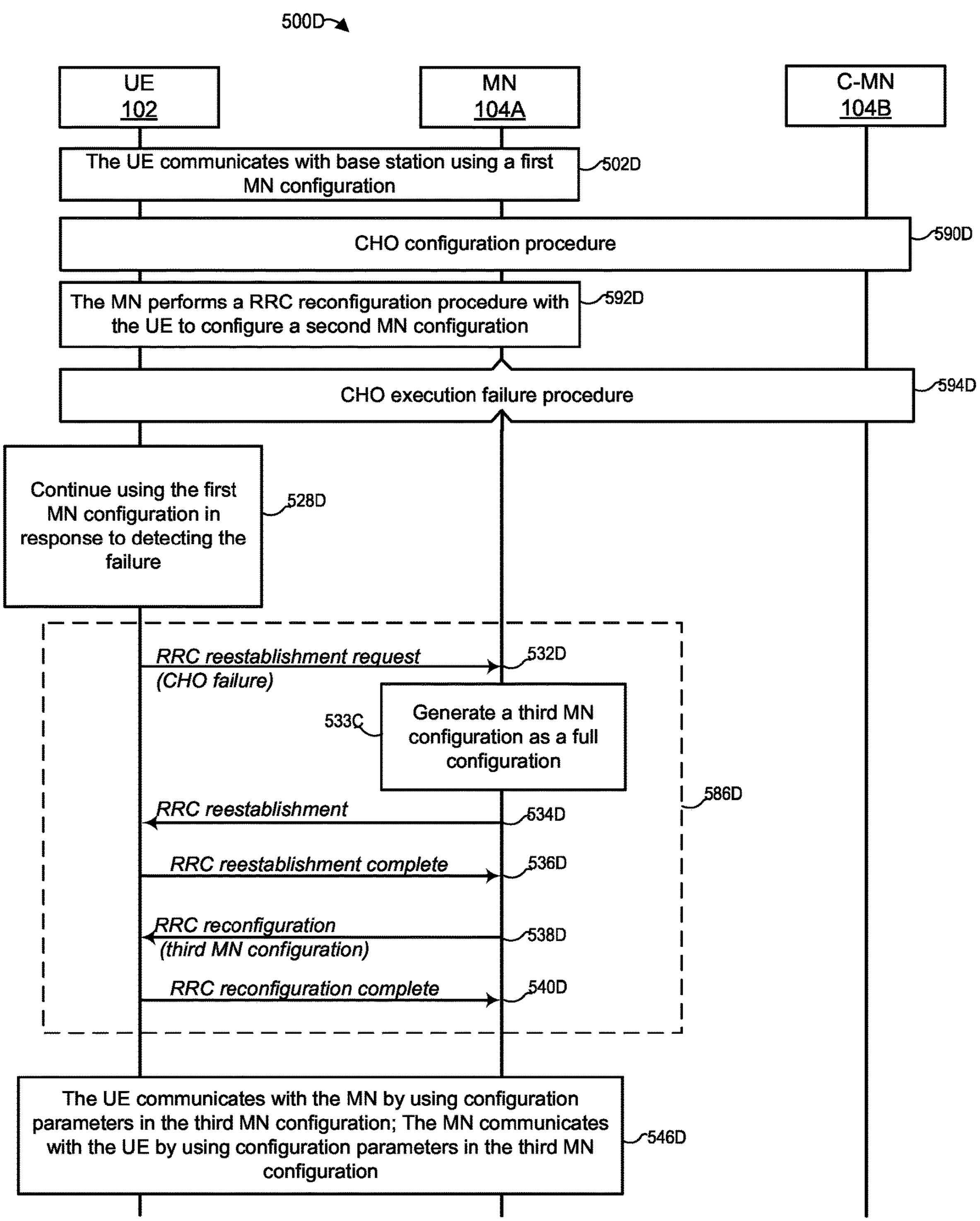

Referring now to FIG. 5D, whereas the UE 102 of FIG. 5C communicates with the MN 104A by using consistent configuration parameters (i.e., first and third MN configurations), the UE 102 of FIG. 5D communicates with the MN 104A by using only the third MN configuration, which is a full configuration. Otherwise, any of the implementations described above in reference to FIG. 5C can generally be applied to scenario 500D of FIG. 5D.

The base station 104A in a scenario 500D operates as an MN and the base station 104B operates as a C-MN. Events 502D, 590D, 592D, 594D, and 528D occur in scenario 500D, similar to events 502C, 590C, 592C, 594C, and 528C of scenario 500C, respectively.

Subsequently, in some implementations, the UE 102 can send 532D an RRC reestablishment request message to the MN 104A, similar to event 532C, except the RRC reestablishment request message triggers the MN 104A to generate a third MN configuration as a full configuration instead of instructing the MN 104A to continue using the first MN configuration, in some implementations. By virtue of the full configuration being independent of the first MN configuration, the MN 104A need not continue using the first MN configuration as in event 533C. In other implementations, the MN 104A determines, based on the RRC reestablishment request message, whether the UE 102 detected conditional failure (e.g., the CHO reconfiguration failure or CHO execution failure) or immediate failure (e.g., immediate handover failure). The RRC reestablishment request message can trigger the MN 104A to generate the third MN configuration as a full configuration if the MN 104A determines that the UE 102 detected conditional failure, or to generate the third MN configuration as a delta configuration that augments the first MN configuration if the MN 104A determines that the UE 102 detected immediate failure.

In response to the RRC reestablishment request message, the MN 104A generates 533C the third MN configuration. Subsequently, the MN 104A sends 534D an RRC reestablishment message to the UE 102, which in turn sends 536D an RRC reestablishment complete message back to the MN 104A. In response to the RRC reestablishment complete message, the MN 104A generates a third RRC reconfiguration message including the third MN configuration and sends 538D the third RRC reconfiguration message to the UE 102. In response, the UE 102 transmits 540D a third RRC reconfiguration complete message to the MN 104A. The events 532D, 533D, 534D, 536D, 538D, and 540D are collectively referred to in FIG. 5D as the RRC connection establishment procedure 586D.

In implementations in which the third MN configuration is a full configuration and therefore does not augment the first MN configuration used by the UE 102 in event 528D, the UE 102 can communicate 546D data and control signals with the MN 104A by using consistent (i.e., same) configuration parameters (i.e., only the third MN configuration). In implementations in which the third MN configuration is a delta configuration that augments the first MN configuration, the UE 102 can communicate 546D data and control signals with the MN 104A by using consistent (i.e., same) configuration parameters (i.e., the first and third MN configurations).

Figure 5E:
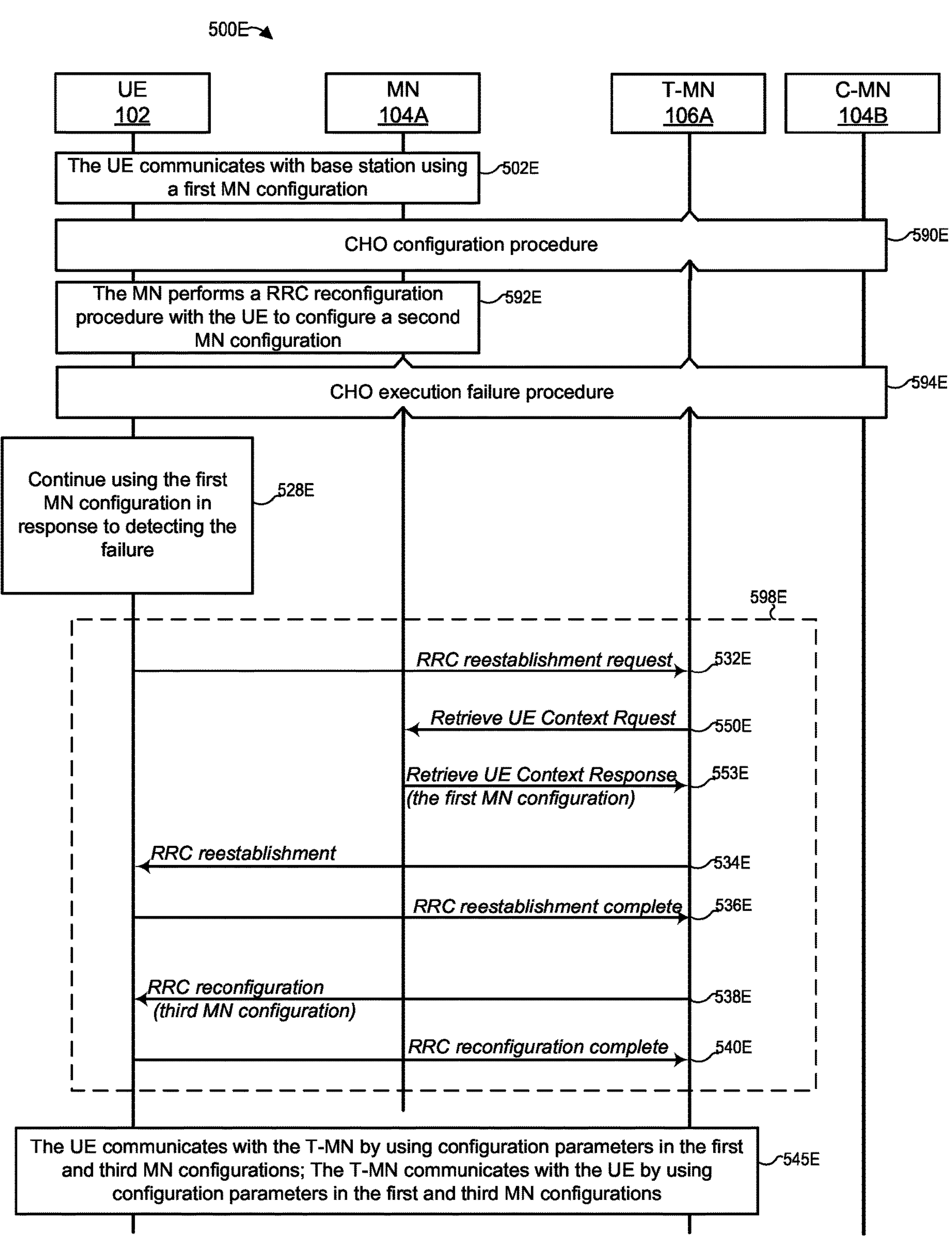

Referring now to FIG. 5E, whereas the UE 102 of FIG. 5B communicates with the T-MN 106A by using consistent configuration parameters (i.e., second and/or third MN configurations), the UE 102 of FIG. 5E communicates with the T-MN 106A by using consistent configuration parameters (i.e., first and third MN configurations). Otherwise, any of the implementations described above in reference to FIG. 5B can generally be applied to scenario 500E of FIG. 5E.

The base station 104A in a scenario 500E operates as an MN, the base station 104B operates as a C-MN, and the base station 106A operates as a T-MN. Events 502E, 590E, 592E, and 594E occur in scenario 500E, similar to events 502B, 590B, 592B, and 594B of scenario 500B, respectively.

In contrast to the UE 102 of FIG. 5B that continues using the second MN configuration in response to or after detecting the CHO reconfiguration failure or CHO execution failure in event 529B, the UE 102 of FIG. 5E continues 528E using the first MN configuration, similar to event 528C. Subsequently, the UE 102 initiates an RRC connection establishment procedure 598E, similar to the RRC connection establishment procedure 597B, except the MN 104A sends the first MN configuration instead of the second MN configuration to the T-MN 106A for the T-MN 106A to generate a third MN configuration as a delta configuration that augments the first MN configuration. Particularly, the UE 102 can initiate 598E the RRC connection establishment procedure with the T-MN 106A by sending 532E an RRC reestablishment request message to the T-MN 106A. In response, the T-MN 106A sends 550E a Retrieve UE Context Request message to the MN 104A, which in turn sends 553E a Retrieve UE Context Response message including the first MN configuration used by the UE 102 at event 528E to the T-MN 106A. In response, the T-MN 106A transmits 534E an RRC reestablishment message to the UE 102, which in turn can send 536E an RRC reestablishment complete message back to the T-MN 106A. In response to receiving the RRC reestablishment complete message, the T-MN 106A can send 538E a third RRC reconfiguration message including a third MN configuration (i.e., a delta configuration) to the UE 102, which in turn can send 540E an RRC reconfiguration complete message back to the T-MN 106A. The events 532E, 550E, 553E, 534E, 536E, 538E, and 540E are collectively referred to in FIG. 5E as the RRC connection establishment procedure 598E.

Consequently, the UE 102 can perform a random access procedure on a cell (e.g., PCell 126A, or other suitable cell other) in response to receiving or in accordance with the third MN configuration. After successfully completing the random access procedure on the cell with the T-MN 106A at event 598E, the UE 102 can communicate 545E data and control signals with the T-MN 106A by using consistent (i.e., same) configuration parameters (i.e., first and third MN configurations).

Figure 5F:
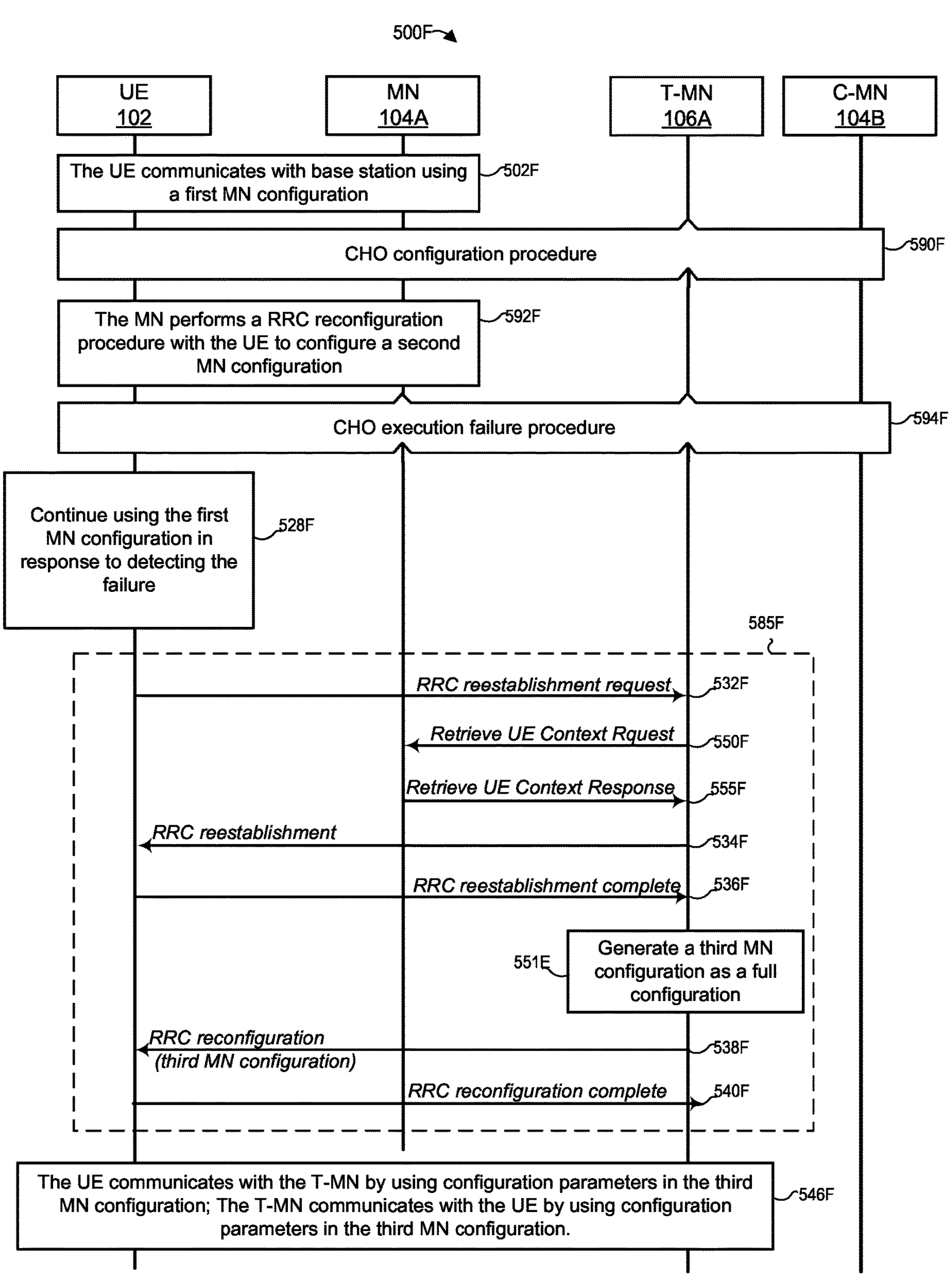

Referring now to FIG. 5F, whereas the UE 102 of FIG. 5E communicates with the T-MN 106A by using consistent configuration parameters (i.e., first and third MN configurations, where the third MN configuration is a delta configuration), the UE 102 of FIG. 5F communicates with the T-MN 106A by using only the third MN configuration, which is a full configuration. Otherwise, any of the implementations described above in reference to FIG. 5E can generally be applied to scenario 500F of FIG. 5F.

The base station 104A in a scenario 500F operates as an MN, the base station 104B operates as a C-MN, and the base station 106A operates as a T-MN. Events 502F, 590F, 592F, 594F, and 528F occur in scenario 500F, similar to events 502E, 590E, 592E, 594E, and 528E of scenario 500E, respectively.

Subsequently, the UE 102 initiates an RRC connection establishment procedure 585F, similar to the RRC connection establishment procedure 598E, except the T-MN 106A generates a third MN configuration always as a full configuration. That is, the T-MN 106A generates the third SN configuration as a full configuration by default, irrespective of whether the MN 104A provides the configuration (i.e., first MN configuration) utilized by the UE 102 in a Retrieve UE Context Response message to the T-MN 106A, and irrespective of whether the RRC reestablishment request contains an explicit indication of the CHO execution failure. Particularly, the UE 102 can initiate 585F the RRC connection establishment procedure with the T-MN 106A by sending 532F an RRC reestablishment request message to the T-MN 106A. In response, the T-MN 106A sends 550F a Retrieve UE Context Request message to the MN 104A, which in turn sends 555F a Retrieve UE Context Response message to the T-MN 106A. In response, the T-MN 106A transmits 534F an RRC reestablishment message to the UE 102, which in turn can send 536F an RRC reestablishment complete message back to the T-MN 106A. In response to receiving the RRC reestablishment complete message, the T-MN 106A can generate 551F a third MN configuration as a full configuration, similar to the manner in which the MN 104A generates the third MN configuration at event 533C, and sends 538F a third RRC reconfiguration message including the third MN configuration to the UE 102. In turn, the UE 102 can send 540F an RRC reconfiguration complete message back to the T-MN 106A. The events 532F, 550F, 555F, 534F, 536F, 551F, 538F, and 540F are collectively referred to in FIG. 5F as the RRC connection establishment procedure 585F.

Because the third MN configuration is a full configuration and therefore does not augment the first MN configuration used by the UE 102 in event 528F, the UE 102 can communicate 546F data and control signals with the T-MN 106A by using consistent (i.e., same) configuration parameters (i.e., only the third MN configuration).

Turning now to FIGS. 6A-6F, these figures illustrate intra-base station scenarios that resolve inconsistent configuration usage after CHO reconfiguration failure or CHO execution failure.

Figure 6A:
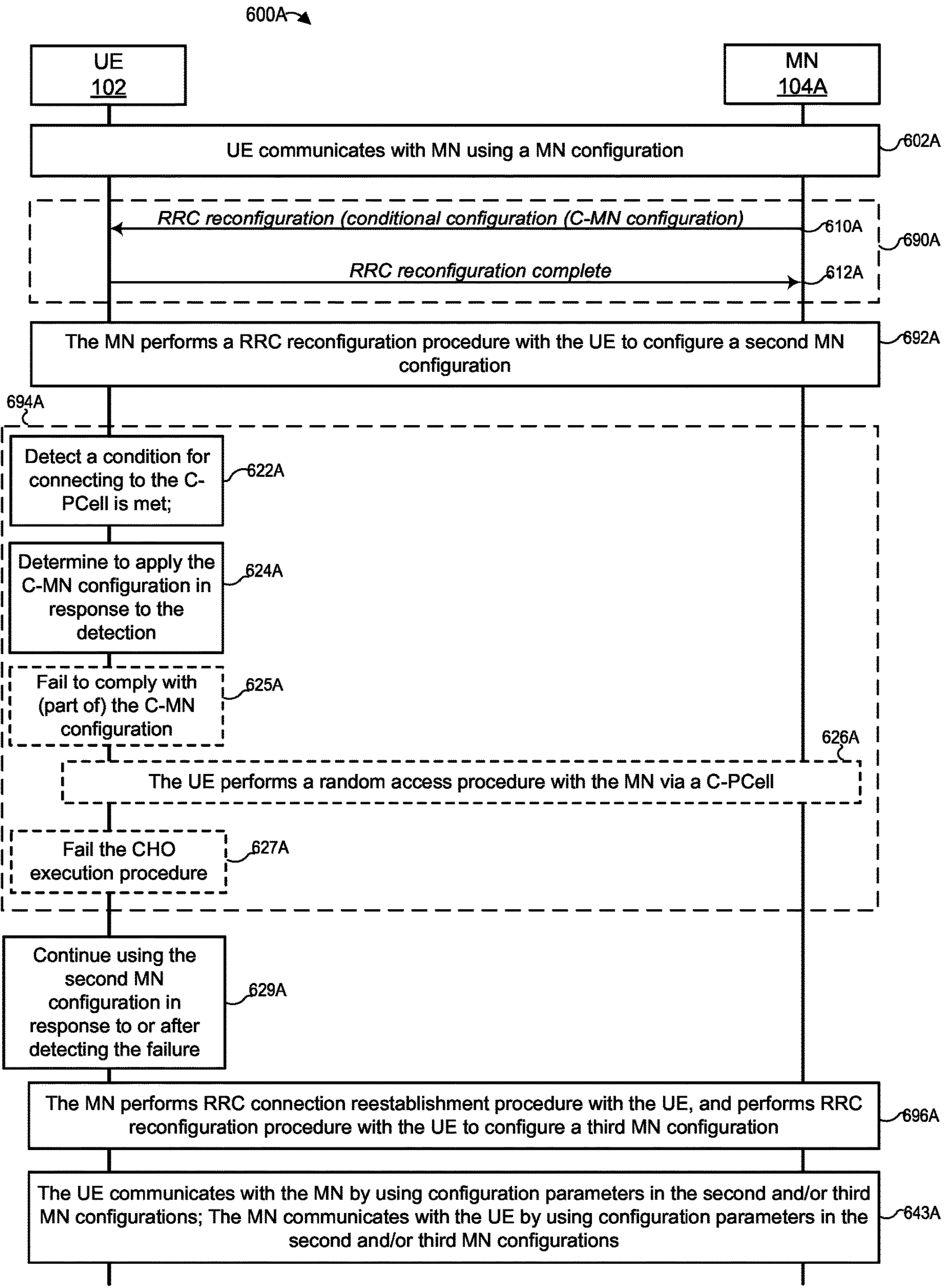
FIGS. 6A-6F are messaging diagrams of scenarios generally similar to those of FIGS. 3A-F, respectively, but for intra-base station CHO procedures.

Referring first to FIG. 6A, the base station 104A in a scenario 600A operates as an MN.

Initially, the UE 102 communicates 602A data with the MN 104A via a primary cell (e.g., PCell 123A) in accordance with a first MN configuration. At a later time, the MN 104A performs a CHO configuration procedure 690A with the UE 102, similar to the CHO configuration procedure 590A, except another MN (e.g., the C-MN 104B of scenario 500A) is not involved in the CHO configuration procedure 690A, so that the UE 102 can communicate with the MN 104A via a C-PCell (e.g., C-PCell 124A) when a condition is satisfied. Particularly, during the CHO configuration procedure 690A, the MN 104A transmits 610A an RRC reconfiguration message including a C-MN configuration to the UE 102, which in turn transmits 612A an RRC reconfiguration complete message to the MN 104A in response to receiving the RRC reconfiguration message. Thus, the MN 104A configures the UE 102 with the C-MN configuration to use to communicate with a C-PCell (e.g., C-PCell 124A) if the UE 102 determines that a condition is satisfied. After performing the CHO configuration procedure 690A, the MN 104A performs an RRC reconfiguration procedure 692A with the UE 102, similar to the RRC reconfiguration procedure 592A, and thus configures the UE 102 with a second MN configuration to use to communicate data with the MN 104A.

After performing the RRC reconfiguration procedure 692A with the MN 104A, the UE 102 detects 622A that a condition for connecting to a C-PCell 124A is satisfied, similar to event 522A. The UE 102 determines 624A to apply the C-MN configuration received at event 610A in response to the detection, similar to event 524A. In response to the determination, the UE 102 in some implementations performs a compliance check on the C-MN configuration, and according to the compliance check, if the UE 102 fails 625A to comply with the C-MN configuration (or at least part of the C-MN configuration), the UE 102 fails 627A a CHO execution procedure, i.e., CHO execution failure. If the UE 102 complies with the C-MN configuration as a result of the compliance check, the UE 102 initiates 626A a random access procedure on the C-PCell 124A, similar to event 526A, but if the UE 102 fails to complete the random access procedure, the UE 102 determines that it has still failed 627A the CHO execution procedure. The events 622A, 624A, 625A, 626A, and 627A are collectively referred to in FIG. 6A as the CHO execution failure procedure 694A.

In response to or after detecting the CHO reconfiguration failure or CHO execution failure, the UE 102 continues 629A using the second MN configuration received during the RRC reconfiguration procedure 692A, similar to event 529A. The UE 102 then initiates an RRC connection establishment procedure 696A with the MN 104A to recover from the CHO reconfiguration failure or the CHO execution failure, similar to the RRC connection establishment procedure 596A.

Accordingly, the UE 102 can communicate 643A data and control signals with the MN 104A by using consistent (i.e., same) configuration parameters (i.e., second and/or third MN configurations), similar to event 543A. In implementations in which the third MN configuration is a delta configuration that augments the second MN configuration, the UE 102 can communicate 643A with the MN 104A by using the second and third MN configurations. In other implementations in which the third MN configuration is a complete and self-contained configuration (i.e., a full configuration) that does not augment the second MN configuration, the UE 102 can communicate 643A with the MN 104A by using the third MN configuration only.

Figure 6B:
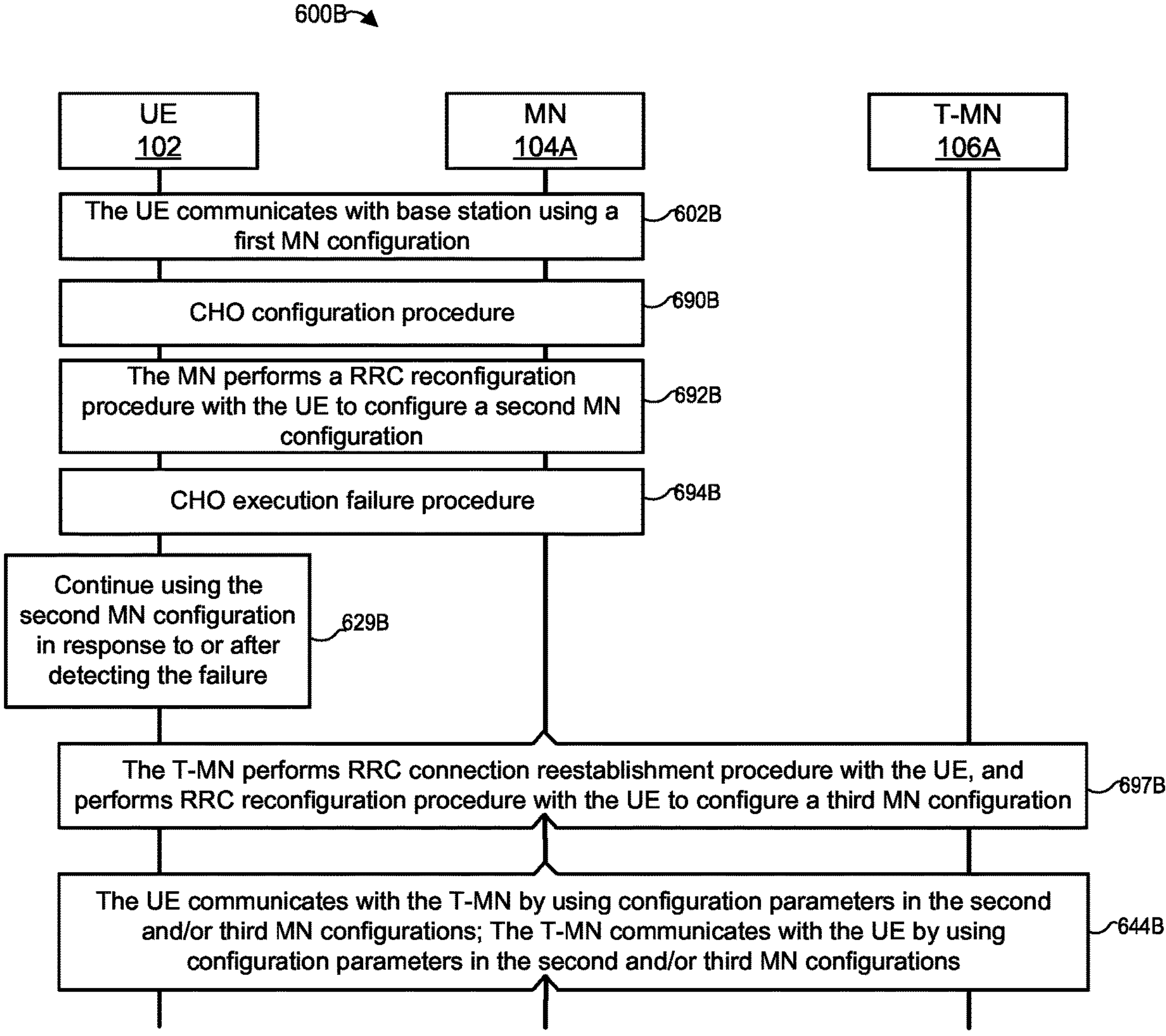

Referring now to FIG. 6B, whereas the UE 102 of FIG. 6A communicates with the MN 104A by using consistent configuration parameters, the UE 102 of FIG. 6B communicates with a different MN (e.g., T-MN 106A) by using consistent configuration parameters. Otherwise, any of the implementations described above in reference to FIG. 6A can generally be applied to scenario 600B of FIG. 6B.

The base station 104A in a scenario 600B operates as an MN and the base station 106A operates as a T-MN. Events 602B, 690B, 692B, 694B, and 629B occur in scenario 600B, similar to events 602A, 690A, 692A, 694A, and 629A of scenario 600A, respectively.

The UE 102 then initiates an RRC connection establishment procedure 697B with a different MN (e.g., the T-MN 106A) for the UE 102 to recover from the CHO reconfiguration failure or the CHO execution failure, similar to event 597B.

Consequently, the UE 102 can perform a random access procedure on a cell (e.g., PCell 126A, or other suitable cell other) in response to receiving or in accordance with the third MN configuration. After successfully completing the random access procedure on the cell with the T-MN 106A at event 697B, the UE 102 can communicate 644B data and control signals with the T-MN 106A by using consistent (i.e., same) configuration parameters (i.e., second and/or third MN configurations). The third MN configuration can be a delta configuration in some implementations, or a full configuration in other implementations, as described above in FIG. 6A.

Figure 6C:
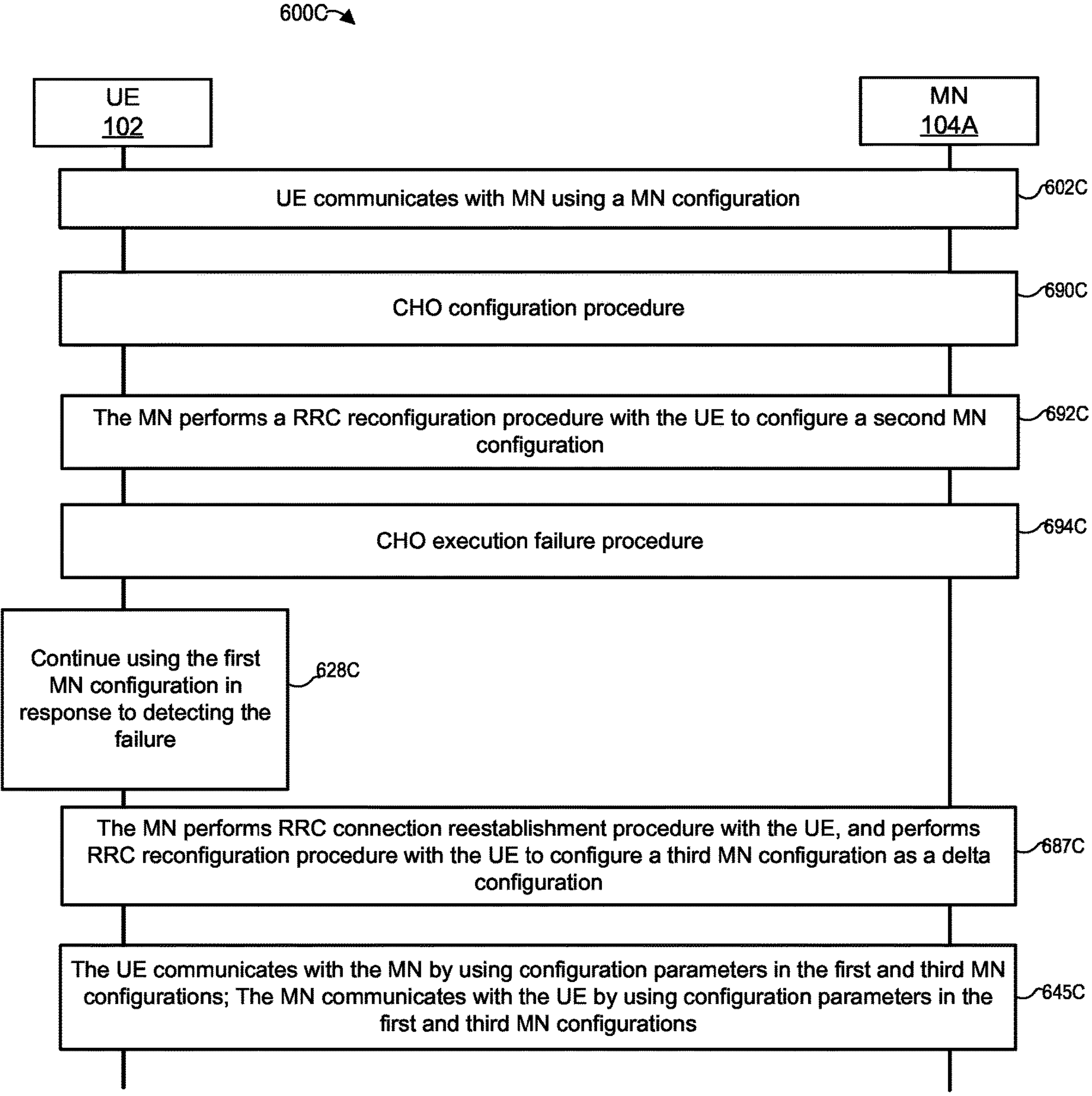

Referring now to FIG. 6C, whereas the UE 102 of FIG. 6A communicates with the MN 104A by using consistent configuration parameters (i.e., second and/or third MN configurations), the UE 102 of FIG. 6C communicates with the MN 104A by using different but consistent configuration parameters (i.e., first and third MN configurations). Otherwise, any of the implementations described above in reference to FIG. 6A can generally be applied to scenario 600C of FIG. 6C.

The base station 104A in a scenario 600C operates as an MN. Events 602C, 690C, 692C, and 694C occur in scenario 600C, similar to events 602A, 690A, 692A, and 694A of scenario 600A, respectively.

In contrast to the UE 102 of FIG. 6A that continues 629A using the second MN configuration received during the RRC reconfiguration procedure 692A, the UE 102 of FIG. 6C continues 628C using the first MN configuration, e.g., in accordance with section 5.3.5.8.2 in 3GPP TS 38.331 v16.3.0, similar to event 528C. Subsequently, the UE 102 and MN 104A can perform an RRC connection establishment procedure 687C, similar to the RRC connection establishment procedure 587C to recover from the CHO failure. As such, the MN 104A configures the UE 102 with a third MN configuration (e.g., delta configuration that augments the first MN configuration).

Consequently, the UE 102 can perform a random access procedure on a cell (e.g., PCell 124A, or other suitable cell other) in response to receiving or in accordance with the third MN configuration. After successfully completing the random access procedure on the cell with the MN 104A at event 687C, the UE 102 can communicate 645C data and control signals with the MN 104A by using consistent (i.e., same) configuration parameters (i.e., first and third MN configurations), similar to event 545C.

Figure 6D:
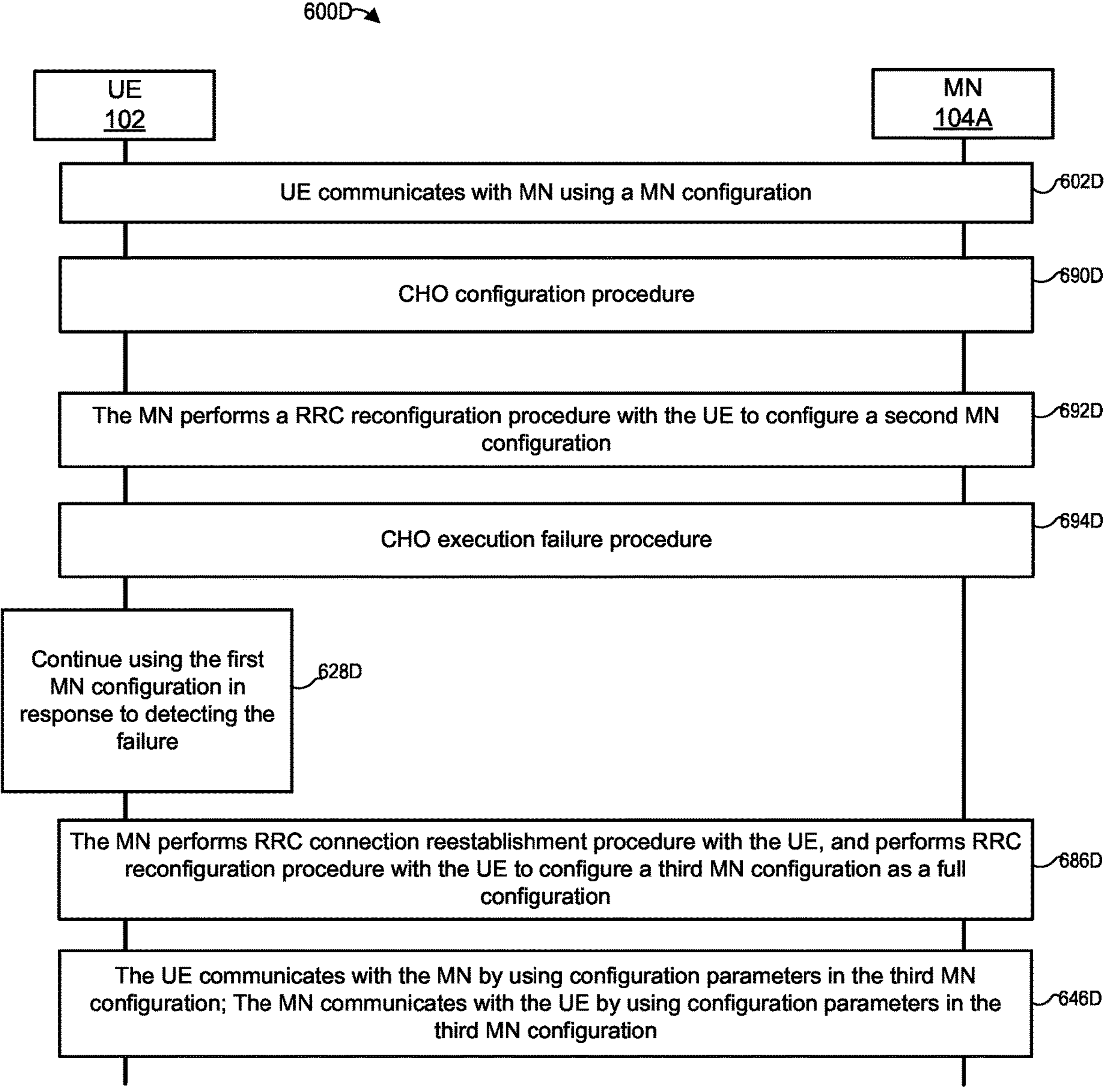

Referring now to FIG. 6D, whereas the UE 102 of FIG. 6C communicates with the MN 104A by using consistent configuration parameters (i.e., first and third MN configurations), the UE 102 of FIG. 6D communicates with the MN 104A by using only the third MN configuration, which is a full configuration. Otherwise, any of the implementations described above in reference to FIG. 6C can generally be applied to scenario 600D of FIG. 6D.

The base station 104A in a scenario 600D operates as an MN. Events 602D, 690D, 692D, 694D, and 628D occur in scenario 600D, similar to events 602C, 690C, 692C, 694C, and 628C of scenario 600C, respectively.

Subsequently, the UE 102 and MN 104A can perform an RRC connection establishment procedure 686D, similar to the RRC connection establishment procedure 586D, to recover from the CHO failure, in some implementations, or from an immediate handover failure, in other implementations. As such, the MN 104A does not continue using the first MN configuration, generates a third MN configuration as a full configuration in some implementations, or as a delta configuration in other implementations, and configures the UE 102 with the third MN configuration.

In implementations in which the third MN configuration is a full configuration and therefore does not augment the first MN configuration used by the UE 102 in event 628D, the UE 102 can communicate 646D data and control signals with the MN 104A by using consistent (i.e., same) configuration parameters (i.e., only the third MN configuration), similar to event 546D. In implementations in which the third MN configuration is a delta configuration that augments the first MN configuration, the UE 102 can communicate 646D data and control signals with the MN 104A by using consistent (i.e., same) configuration parameters (i.e., the first and third MN configurations).

Figure 6E:
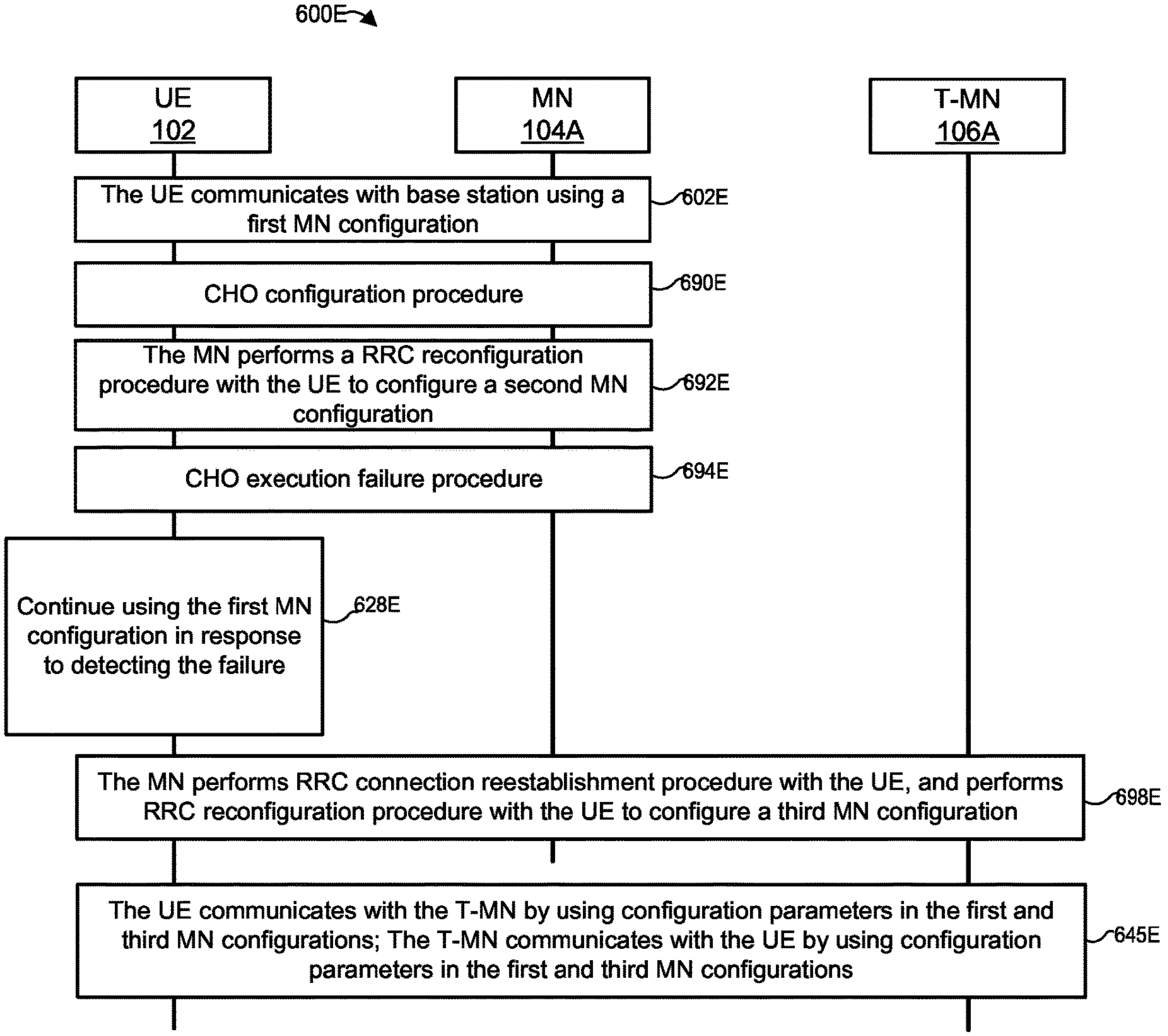

Referring now to FIG. 6E, whereas the UE 102 of FIG. 6B communicates with the T-MN 106A by using consistent configuration parameters (i.e., second and/or third MN configurations), the UE 102 of FIG. 6E communicates with the T-MN 106A by using consistent configuration parameters (i.e., first and third MN configurations). Otherwise, any of the implementations described above in reference to FIG. 6B can generally be applied to scenario 600E of FIG. 6E.

The base station 104A in a scenario 600E operates as an MN and the base station 106A operates as a T-MN. Events 602E, 690E, 692E, and 694E occur in scenario 600E, similar to events 602B, 690B, 692B, and 694B of scenario 600B, respectively.

In contrast to the UE 102 of FIG. 6B that continues using the second MN configuration in response to or after detecting the CHO reconfiguration failure or CHO execution failure in event 629B, the UE 102 of FIG. 6E continues 628E using the first MN configuration, similar to event 628C. Subsequently, the UE 102 and MN 104A perform an RRC connection establishment procedure 698E, similar to the RRC connection establishment procedure 598E. As such, the T-MN 106A configures the UE 102 with a third MN configuration (i.e., a delta configuration that augments the first MN configuration).

Consequently, the UE 102 can perform a random access procedure on a cell (e.g., PCell 126A, or other suitable cell other) in response to receiving or in accordance with the third MN configuration. After successfully completing the random access procedure on the cell with the T-MN 106A at event 698E, the UE 102 can communicate 645E data and control signals with the T-MN 106A by using consistent (i.e., same) configuration parameters (i.e., first and third MN configurations), similar to event 545E.

Figure 6F:
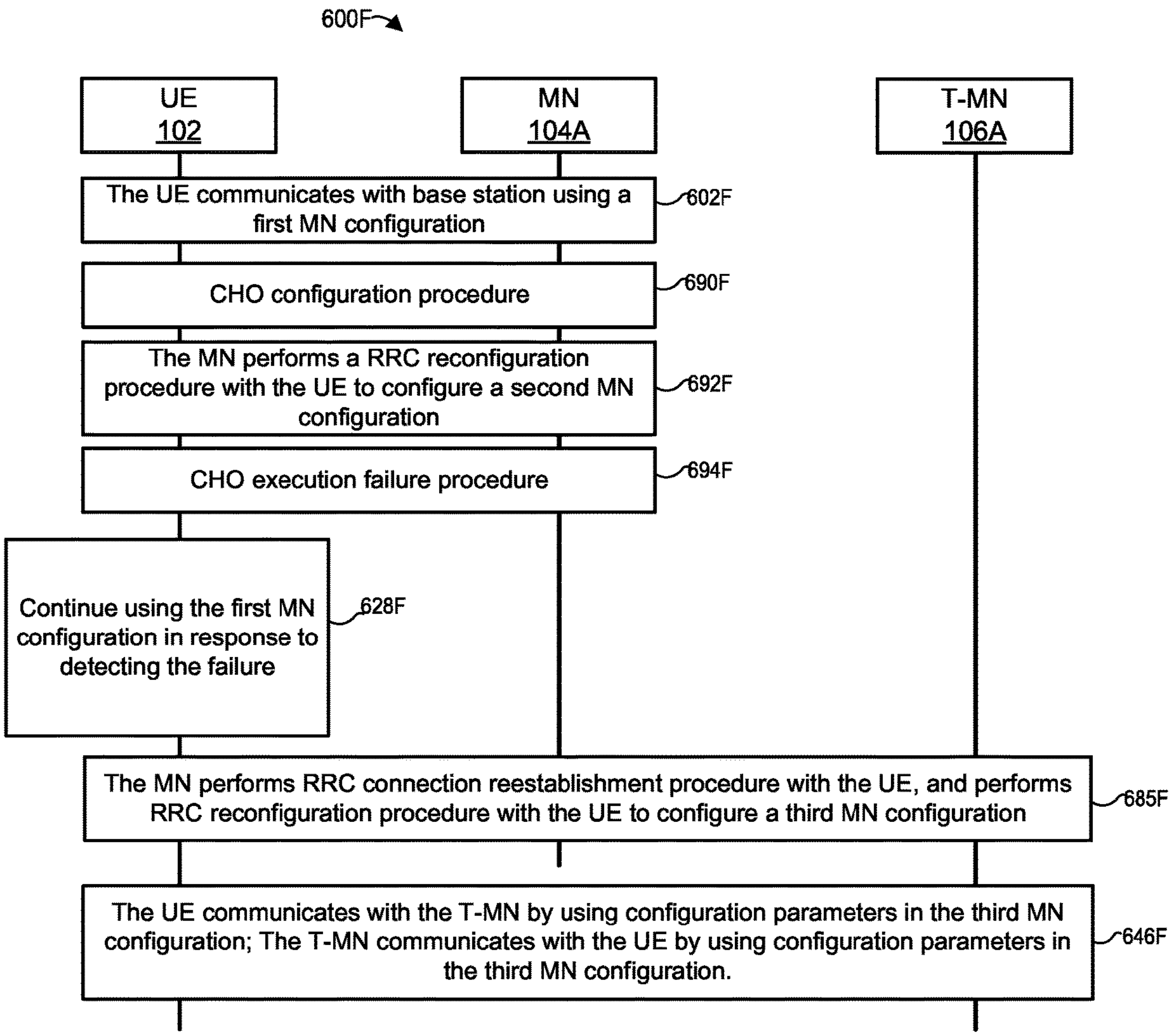

Referring now to FIG. 6F, whereas the UE 102 of FIG. 6E communicates with the T-MN 106A by using consistent configuration parameters (i.e., first and third MN configurations, where the third MN configuration is a delta configuration), the UE 102 of FIG. 6F communicates with the T-MN 106A by using only the third MN configuration, which is a full configuration. Otherwise, any of the implementations described above in reference to FIG. 6E can generally be applied to scenario 600F of FIG. 6F.

The base station 104A in a scenario 600F operates as an MN and the base station 106A operates as a T-MN. Events 602F, 690F, 692F, 694F, and 628F occur in scenario 600F, similar to events 602E, 690E, 692E, 694E, and 628E of scenario 600E, respectively.

Subsequently, the UE 102 and MN 104A perform an RRC connection establishment procedure 685F, similar to the RRC connection establishment procedure 585F. As such, the T-MN 106A can configure the UE 102 with a third MN configuration as a full configuration.

Because the third MN configuration is a full configuration and therefore does not augment the first MN configuration used by the UE 102 in event 628F, the UE 102 can communicate 646F data and control signals with the T-MN 106A by using consistent (i.e., same) configuration parameters (i.e., only the third MN configuration).

Now referring to FIGS. 7-12, several example methods that the UE (e.g., UE 102) and/or RAN (e.g., RAN 105) of this disclosure can implement are considered next. Each of these methods can be implemented using suitable processing hardware such as for example one or more processors configured to execute instructions stored on a non-transitory computer-readable medium.

Figure 7:
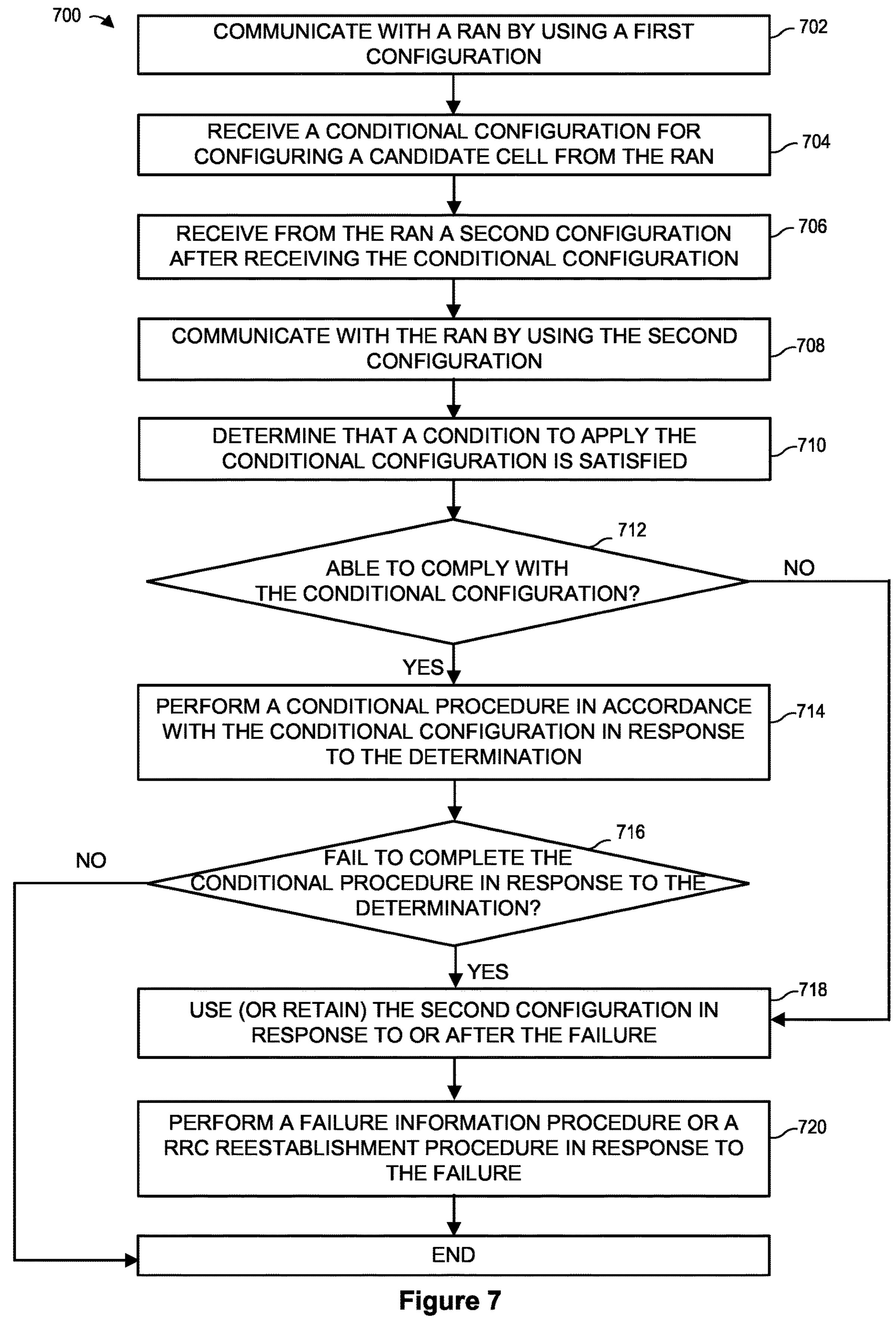
FIG. 7 is a flow diagram of an example method that includes managing configurations after the UE fails to perform a conditional procedure, which can be implemented in the UE of FIG. 1A.

Referring first to FIG. 7, an example method 700 can be implemented in a UE (e.g., UE 102) in response to failing to perform or complete a conditional procedure with a RAN (e.g., RAN 105).

At block 702, a UE is initially configured to communicate with a RAN by using a first configuration (e.g., in events 302A, 302B, 302C, 302D, 302E, 302F, 402A, 402B, 402C, 402D, 402E, 402F, 502A, 502B, 502C, 502D, 502E, 502F, 602A, 602B, 602C, 602D, 602E, 602F).

At block 704, later in time, the UE receives conditional configuration information from the RAN (e.g., in events 390A, 390B, 390C, 390D, 390E, 390F, 490A, 490B, 490C, 490D, 490E, 490F, 590A, 590B, 590C, 590D, 590E, 590F, 690A, 690B, 690C, 690D, 690E, 690F). The conditional configuration information includes a conditional configuration for communicating with the RAN via a candidate cell (e.g., C-PSCell, C-PCell), and a condition to be satisfied before the UE applies the conditional configuration in a conditional procedure. The conditional procedure can be a CPAC procedure, CSAC procedure, or CHO procedure.

At block 706, the UE receives a second configuration after receiving the conditional configuration information, and as a result, at block 708, the UE is reconfigured to communicate with the RAN by using the second configuration (e.g., in events 392A, 392B, 392C, 392D, 392E, 392F, 492A, 492B, 492C, 492D, 492E, 492F, 592A, 592B, 592C, 592D, 592E, 592F, 692A, 692B, 692C, 692D, 692E, 692F).

At block 710, the UE determines that the condition to apply the conditional configuration is satisfied, and at block 712, the UE determines whether the UE complies with the conditional configuration (e.g., in events 394A, 394B, 394C, 394D, 394E, 394F, 494A, 494B, 494C, 494D, 494E, 494F, 594A, 594B, 594C, 594D, 594E, 594F, 694A, 694B, 694C, 694D, 694E, 694F).

If the UE at block 712 does not comply with the conditional configuration, the UE is unable to perform the conditional procedure to which the conditional configuration is associated, and thus fails the conditional procedure. As a result, the UE at block 718 uses (or retains) the second configuration in response to or after the failure to communicate with the RAN (e.g., in events 329A, 329B, 429A, 429B, 529A, 529B, 629A, 629B). Subsequently, the UE at block 720 performs a failure information procedure or an RRC reestablishment procedure with the RAN to recover from the failed conditional procedure (e.g., in events 396A, 397B, 496A, 497B, 596A, 597B, 696A, 697B).

If the UE at block 712 complies with the conditional configuration, the UE at block 714 begins to perform the conditional configuration in accordance with the conditional configuration. If the UE at block 716 fails to complete the conditional procedure (e.g., the UE may fail a random access procedure associated with the conditional procedure), as described above, the UE at block 718 uses (or retains) the second configuration in response to or after the failure to communicate with the RAN, and subsequently performs the failure information procedure or the RRC reestablishment procedure with the RAN at block 720. The method 700 then ends. If the UE at block 716 succeeds to complete the conditional procedure, the method 700 then ends.

Figure 8:
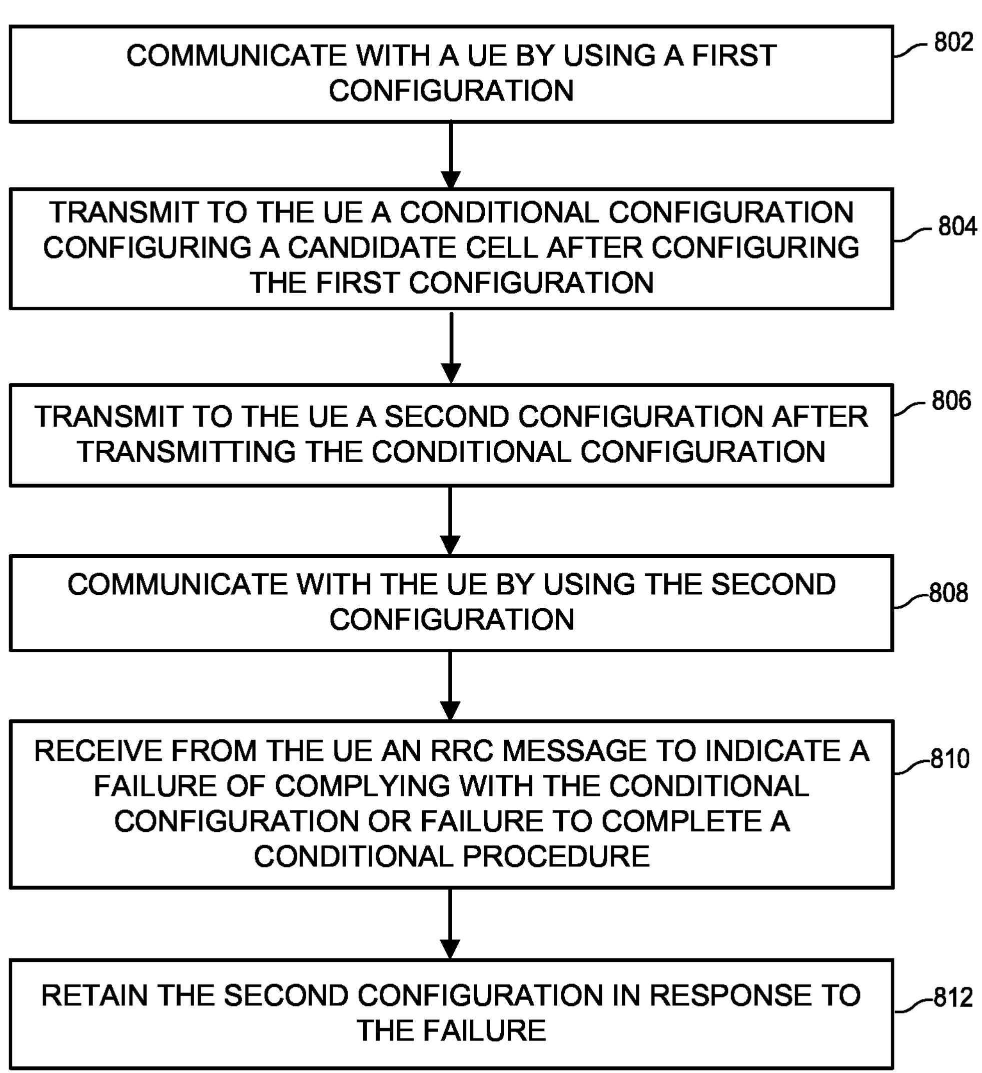
FIG. 8 is a flow diagram of an example method that includes using a configuration associated with a reconfiguration procedure to communicate with the UE after the UE fails to perform a conditional procedure subsequently to the reconfiguration procedure, which can be implemented in the RAN of FIG. 1A or FIG. 1B.

Referring now to FIG. 8, an example method 800 can be implemented in a RAN (e.g., RAN 105) for communicating with a UE (e.g., UE 102) in response to the UE failing to perform or complete a conditional procedure with the RAN.

At block 802, similar to block 702, a RAN communicates with a UE that is initially configured to communicate with the RAN by using a first configuration (e.g., in events 302A, 302B, 302C, 302D, 302E, 302F, 402A, 402B, 402C, 402D, 402E, 402F, 502A, 502B, 502C, 502D, 502E, 502F, 602A, 602B, 602C, 602D, 602E, 602F).

At block 804, similar to block 704, the RAN transmits conditional configuration information to the UE (e.g., in events 390A, 390B, 390C, 390D, 390E, 390F, 490A, 490B, 490C, 490D, 490E, 490F, 590A, 590B, 590C, 590D, 590E, 590F, 690A, 690B, 690C, 690D, 690E, 690F).

At block 806, similar to block 706, the RAN transmits a second configuration to the UE after transmitting the conditional configuration information, and as a result, at block 808, the RAN communicates with the UE that is reconfigured to communicate with the RAN by using the second configuration (e.g., in events 392A, 392B, 392C, 392D, 392E, 392F, 492A, 492B, 492C, 492D, 492E, 492F, 592A, 592B, 592C, 592D, 592E, 592F, 692A, 692B, 692C, 692D, 692E, 692F), similar to block 708.

At block 810, the RAN receives an RRC message (e.g., SCG failure information message, RRC reestablishment request message) from the UE, indicative that the UE either failed to comply with the conditional configuration received at block 804 or failed to complete a conditional procedure (e.g., in events 330A, 330B, 330C, 330D, 330E, 330F, 430A, 430B, 430C, 430D, 430E, 430F, 532A, 532B, 532C, 532D, 532E, 532F, 696A, 697B, 687C, 686D, 698E).

At block 812, in response to the RRC message, the RAN retains the second configuration, which is also retained by the UE, so that the RAN can communicate with the UE using the common second configuration (e.g., in events 343A, 344B, 443A, 444B, 543A, 544B, 643A, 644B).

Figure 9:
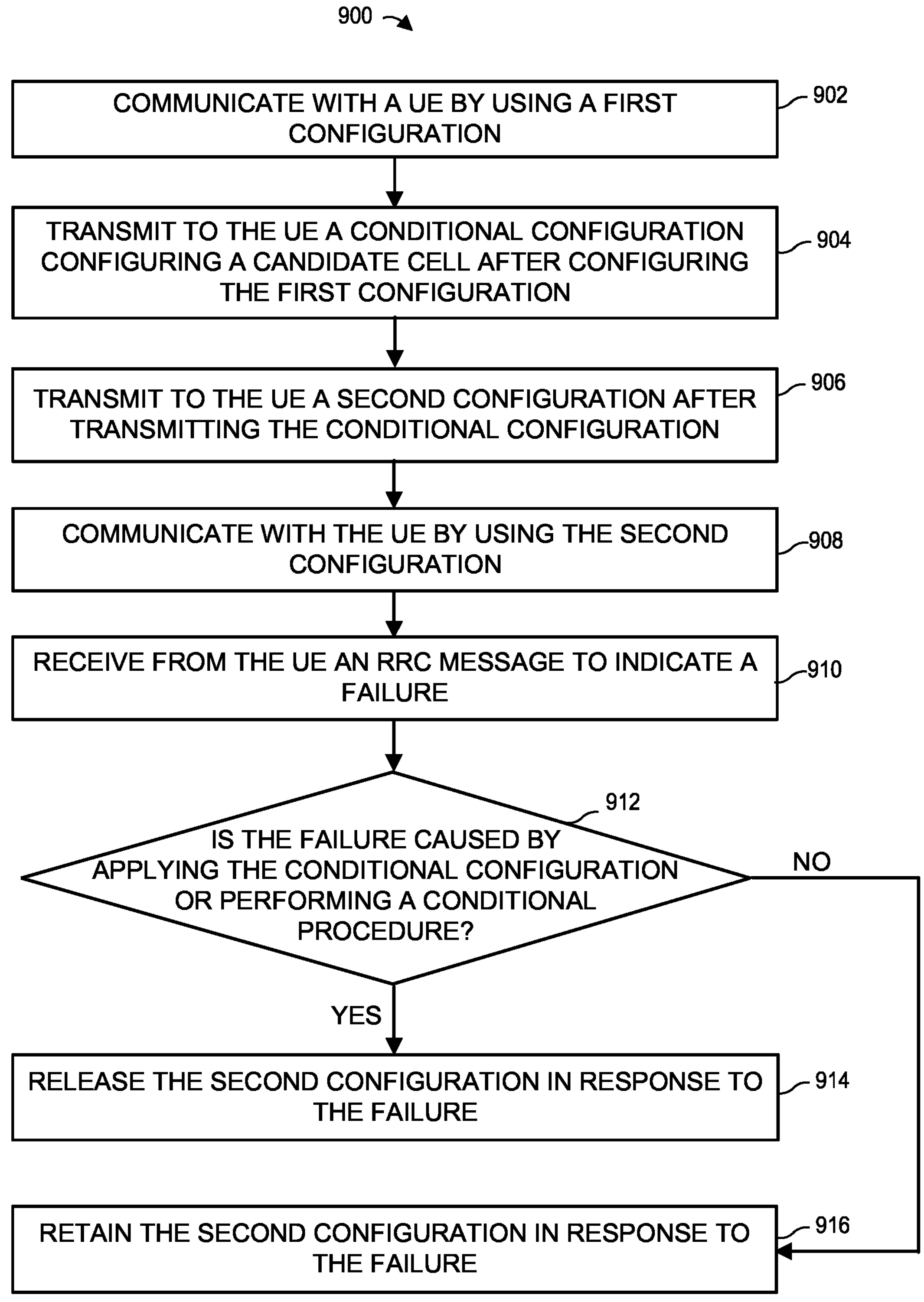
FIG. 9 is a flow diagram of an example method that includes reverting back to using a configuration configured at the UE prior to a reconfiguration procedure to communicate with the UE after the UE fails to perform a conditional procedure subsequently to the reconfiguration procedure, which can be implemented in the RAN of FIG. 1A or FIG. 1B.

Referring now to FIG. 9, an example method 900 can be implemented in a RAN (e.g., RAN 105) for communicating with a UE (e.g., UE 102) in response to the UE failing to perform or complete a conditional procedure with the RAN. Whereas the RAN and UE of FIG. 8 retains the second configuration associated with a reconfiguration procedure to communicate with each other after the UE fails to perform a conditional procedure subsequently to the reconfiguration procedure, the RAN releases the second configuration, and each of the RAN and UE of FIG. 9 reverts back to using the first configuration configured at the UE prior to the reconfiguration procedure to communicate with each other.

At block 902, similar to block 802, a RAN communicates with a UE that is initially configured to communicate with the RAN by using a first configuration. At block 904, similar to block 804, the RAN transmits conditional configuration information to the UE. At block 906, similar to block 806, the RAN transmits a second configuration to the UE after transmitting the conditional configuration information, and as a result, at block 908, the RAN communicates with the UE that is reconfigured to communicate with the RAN by using the second configuration, similar to block 808. At block 910, similar to block 810, the RAN receives an RRC message from the UE.

At block 912, based on the RRC message, if the RAN determines that the UE either failed to comply with the conditional configuration or failed to complete the conditional procedure, the RAN at block 914 releases the second configuration. Instead of communicating with the UE using the second configuration, the RAN communicates with the UE using the first configuration (e.g., in events 345C, 345E, 445C, 445E, 545C, 545E, 645C, 645E).

Otherwise, if the RAN at block 912 determines that the UE did not fail to comply with the conditional configuration or did not fail to complete the conditional procedure, the RAN determines that the UE failed in some other manner (e.g., immediate SN addition/change failure, immediate PSCell change failure, immediate handover failure). Accordingly, at block 916, in response to the RRC message, the RAN retains the second configuration, which is also retained by the UE, so that the RAN can communicate with the UE using the common second configuration, similar to block 812.

Figure 10:
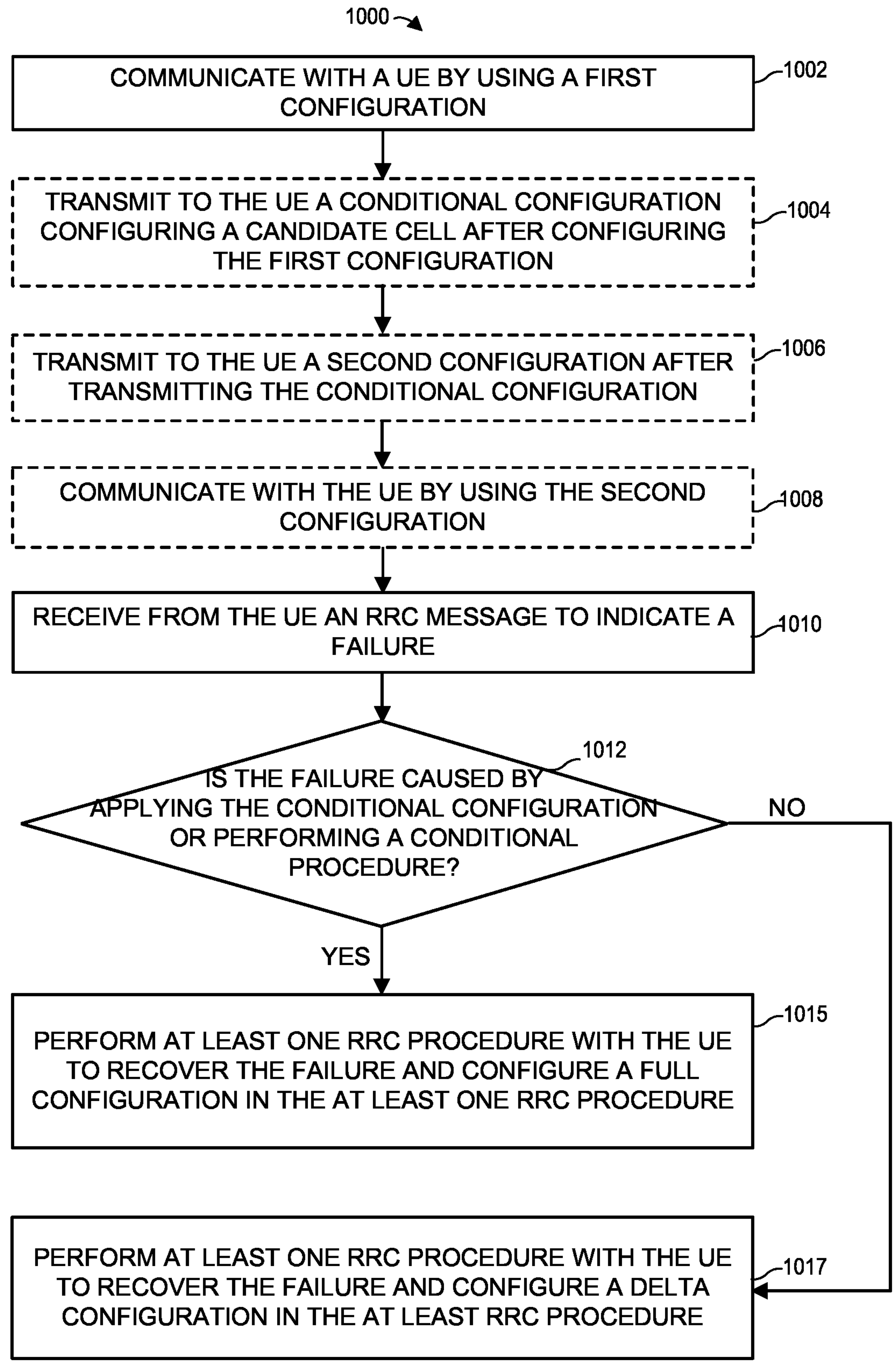
FIG. 10 is a flow diagram of an example method that includes using a full configuration or delta configuration to communicate with the UE based on whether the UE fails to perform a conditional procedure or an immediate procedure, which can be implemented in the RAN of FIG. 1A or FIG. 1B.

Referring now to FIG. 10, an example method 1000 can be implemented in a RAN (e.g., RAN 105) for communicating with a UE (e.g., UE 102) using a full configuration or delta configuration based on whether the UE fails to perform a conditional procedure or an immediate procedure with the RAN.

At block 1002, similar to block 902, a RAN communicates with a UE that is initially configured to communicate with the RAN by using a first configuration.

In some implementations, at block 1004, similar to block 904, the RAN transmits conditional configuration information to the UE. At block 1006, similar to block 906, the RAN transmits a second configuration to the UE after transmitting the conditional configuration information, and as a result, at block 1008, the RAN communicates with the UE that is reconfigured to communicate with the RAN by using the second configuration, similar to block 908. At block 1010, similar to block 910, the RAN receives an RRC message from the UE.

At block 1012, based on the RRC message, if the RAN determines that the UE either failed to comply with the conditional configuration or failed to complete the conditional procedure, the RAN at block 1015 performs an RRC procedure with the UE to recover from the failure. During the RRC procedure, the RAN provides a full configuration to the UE, so that the UE can communicate with the RAN using the full configuration (e.g., in events 343A, 344B, 346D, 346F, 443A, 444B, 446D, 446F, 543A, 544B, 546D, 546F, 643A, 644B, 646D, 646F).

Otherwise, if the RAN at block 1012 determines that the UE did not fail to comply with the conditional configuration or did not fail to complete the conditional procedure, the RAN determines that the UE failed in some other manner (e.g., immediate SN addition/change failure, immediate PSCell change failure, immediate handover failure). Accordingly, at block 1017, in response to the RRC message, the RAN performs an RRC procedure with the UE to recover from the failure. During the RRC procedure, the RAN provides a delta configuration to the UE, so that the UE can communicate with the RAN using the delta configuration (e.g., in events 343A, 344B, 345C, 345E, 443A, 444B, 445C, 445E, 543A, 544B, 545C, 545E, 643A, 644B, 645C, 645E).

Figure 11:
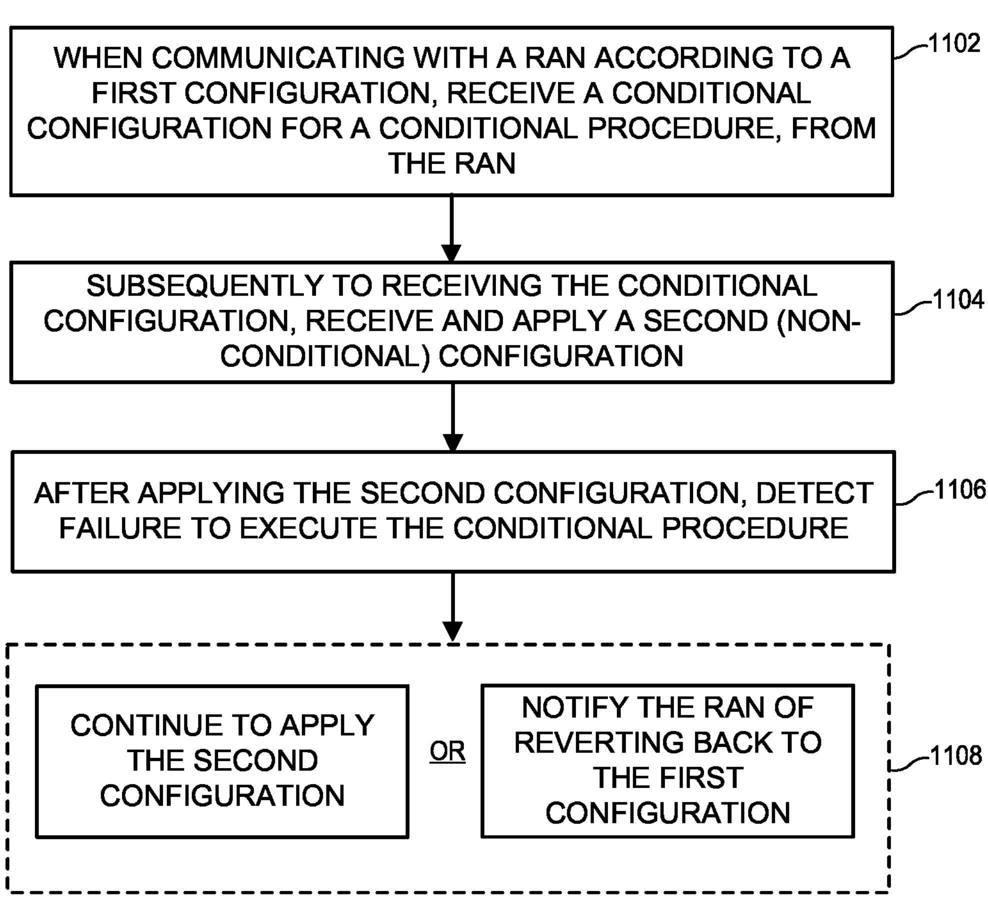
FIG. 11 is a flow diagram of an example configuration method that can be implemented in the UE of FIG. 1A or FIG. 1B.

Referring now to FIG. 11, an example method 1100 can be implemented in a UE (e.g., UE 102) when communicating with a RAN (e.g., RAN 105).

At block 1102, a UE, when communicating with a RAN in accordance with a first configuration, receives, from the RAN, a conditional configuration for application in a conditional procedure when a corresponding condition is satisfied (e.g., in events 306A, 390B, 390C, 390D, 390E, 390F, 408A, 490B, 490C, 490D, 490E, 490F, 510A, 590B, 590C, 590D, 590E, 590F, 610A, 690B, 690C, 690D, 690E, 690F). The conditional procedure can be for CHO, CPAC, or CSAC.

At block 1104, subsequently to receiving the conditional configuration, the UE applies a second (non-conditional) configuration received from the RAN (e.g., in events 314A, 392B, 392C, 392D, 392E, 392F, 492A, 492B, 492C, 492D, 492E, 492F, 514A, 592B, 592C, 592D, 592E, 592F, 692A, 692B, 692C, 692D, 692E, 692F).

At block 1106, after applying the second configuration, the UE detects a failure to execute the conditional procedure (e.g., in events 325A, 394B, 394C, 394D, 394E, 394F, 427A, 494B, 494C, 494D, 494E, 494F, 525A, 594B, 594C, 594D, 594E, 594F, 694A, 694B, 694C, 694D, 694E, 694F). The failure can be a CHO failure, CPAC failure, or CSAC failure.

At block 1108, the UE, in response to the detecting, in some implementations, continues to apply the second configuration (e.g., in events 329A, 329B, 429A, 429B, 529A, 529B, 629A, 629B). In other implementations, the UE notifies the RAN of the UE reverting back to the first configuration (e.g., in events 330C, 330D, 330E, 330F, 430C, 430D, 430E, 430F, 532C, 532D, 532E, 532F, 687C, 686D, 698E, 685F). The UE can notify the RAN by transmitting a failure message (e.g., SCG failure information), or by transmitting a request message (e.g., RRC reestablishment request message) to reestablish a radio connection between the UE and a base station operating in the RAN. In some cases, the failure message or request message can include an explicit notification or indication of the failure (e.g., CHO failure, CPAC failure, or CSAC failure).

Figure 12:
FIG. 12 is a flow diagram of an example configuration method that can be implemented in the RAN of FIG. 1A or FIG. 1B.
Figure 12:
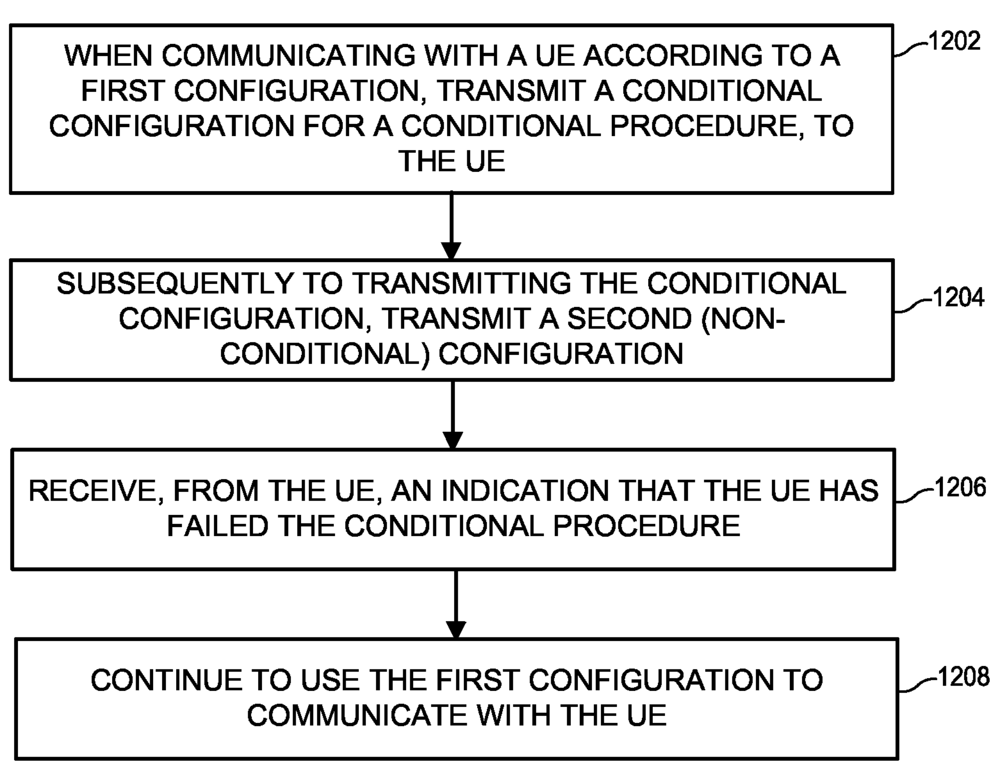

Referring now to FIG. 12, an example method 1200 can be implemented in a RAN (e.g., RAN 105) when communicating with a UE (e.g., UE 102).

At block 1202, a RAN, when communicating with a UE in accordance with a first configuration, transmits, the UE, a conditional configuration for application in a conditional procedure when a corresponding condition is satisfied (e.g., in events 306A, 390B, 390C, 390D, 390E, 390F, 408A, 490B, 490C, 490D, 490E, 490F, 510A, 590B, 590C, 590D, 590E, 590F, 610A, 690B, 690C, 690D, 690E, 690F). The conditional procedure can be for CHO, CPAC, or CSAC.

At block 1204, subsequently to transmitting the conditional configuration, the RAN transmits a second (non-conditional) configuration to the UE (e.g., in events 314A, 392B, 392C, 392D, 392E, 392F, 492A, 492B, 492C, 492D, 492E, 492F, 514A, 592B, 592C, 592D, 592E, 592F, 692A, 692B, 692C, 692D, 692E, 692F).

At block 1206, the RAN receives, from the UE, an indication that the UE has failed to perform the conditional procedure (e.g., in events 330A, 330B, 330C, 330D, 330E, 330F, 430A, 430B, 430C, 430D, 430E, 430F, 532A, 532B, 532C, 532D, 532E, 532F, 696A, 697B, 687C, 686D, 698E, 685F). The indication can be a failure message (e.g., SCG failure information), or a request message (e.g., RRC reestablishment request message) to reestablish a radio connection between the UE and a base station operating in the RAN. In some cases, the failure message or request message can include an explicit notification or indication of the failure (e.g., CHO failure, CPAC failure, or CSAC failure).

At block 1208, in response to the indication, the RAN continues to use the first configuration to communicate with the UE (e.g., in events 350C, 345E, 487C, 445E, 587C, 545E, 687C, 645E).

The following description may be applied to the description above.

In some implementations, "message" is used and can be replaced by "information element (IE)". In some implementations, "IE" is used and can be replaced by "field". In some implementations, "configuration" can be replaced by "configurations" or the configuration parameters included in the MN or SN configuration described above. For example, "configuration" can be replaced by "configurations" or "configuration parameters". The MN configuration or SN configuration can be replaced by a cell group configuration and/or radio bearer configuration.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for managing configurations through the disclosed principles herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

Aspect 1. A configuration method in a user equipment (UE) in communication with a radio access network (RAN) in accordance with a first configuration, the method comprising: receiving, by processing hardware from the RAN, a conditional configuration for application in a conditional procedure when a corresponding condition is satisfied; subsequently to receiving the conditional configuration, applying, by the processing hardware, a second configuration received from the RAN; detecting, by the processing hardware and after applying the second configuration, a failure to execute the conditional procedure; and in response to the detecting, continuing to apply the second configuration or notifying the RAN of the UE reverting back to the first configuration.

Aspect 2. The method of aspect 1, including, in response to the detecting: continuing to use the second configuration.

Aspect 3. The method of aspect 1, including, in response to the detecting: reverting back to the first configuration.

Aspect 4. The method of aspect 3, wherein: the UE communicates with the RAN in dual connectivity (DC) with a master node (MN) over master cell group (MCG) and an SN over a secondary cell group (SCG); and notifying the RAN includes: transmitting, by the processing hardware, an indication of the SCG failure, the indication including a notification of the failure.

Aspect 5. The method of aspect 3, wherein: notifying the RAN includes: transmitting, by the processing hardware, a request to reestablish a radio connection between the UE and a base station operating in the RAN, the indication including a notification of the failure.

Aspect 6. The method of any of the preceding aspects, further comprising: receiving, by the processing hardware and subsequently to the continuing to apply or the reverting, a third configuration from the RAN.

Aspect 7. The method of aspect 6, wherein: the third configuration is a delta configuration; the method further comprising: augmenting the first configuration or the second configuration with the third configuration.

Aspect 8. The method of aspect 6, wherein: the third configuration is a full configuration; the method further comprising: replacing the first configuration or the second configuration with the third configuration.

Aspect 9. The method of any of aspects 6-8, wherein the second configuration and the third configuration pertain to same network node.

Aspect 10. The method of aspect 6 or 8, wherein the second configuration and the third configuration pertain to different network nodes.

Aspect 11. The method of any of the preceding aspects, wherein the conditional procedure is one of: conditional handover (CHO), conditional primary secondary cell (PSCell) addition or change (CPAC), or conditional secondary node (SN) addition or change (CSAC).

Aspect 12. A user equipment (UE) comprising processing hardware and configured to implement a method according to any of the preceding aspects.

Aspect 13. A method in a radio access network (RAN) for configuring a user equipment (UE) in communication with the RAN in accordance with a first configuration, the method comprising: transmitting, by processing hardware to the UE, a conditional configuration for application in a conditional procedure when a corresponding condition is satisfied; subsequently to transmitting the conditional configuration, transmitting, by the processing hardware, a second configuration to the UE; receiving, by the processing hardware from the UE, an indication that the UE has failed to perform the conditional procedure; and in response to the indication, continuing to use the first configuration to communicate with the UE.

Aspect 14. The method of aspect 13, wherein receiving the indication includes receiving a message indicating SCG failure.

Aspect 15. The method of aspect 14, wherein the message includes a notification that the UE has failed to perform the conditional procedure.

Aspect 16. The method of aspect 14, further comprising: receiving the message including the notification at a master node (MN); and forwarding the notification to a secondary node (SN), wherein the UE communicates in dual connectivity (DC) with the MN and the SN.

Aspect 17. The method of aspect 13, wherein receiving the indication includes receiving a request to reestablish a radio connection, the request including a notification that the UE has failed to perform the conditional procedure.

Aspect 18. The method of any of aspects 13-17, further comprising: generating, by the processing hardware, a third configuration for the UE.

Aspect 19. The method of aspect 18, wherein the third configuration is a delta configuration.

Aspect 20. The method of aspect 18, wherein the third configuration is a full configuration.

Aspect 21. The method of any of aspects 18-20, wherein the second configuration and the third configuration pertain to same network node.

Aspect 22. The method of any of aspects 18-20, wherein the second configuration and the third configuration pertain to different network nodes.

Aspect 23. The method of any of aspects 13-22, wherein the conditional procedure is one of: conditional handover (CHO), conditional primary secondary cell (PSCell) addition or change (CPAC), or conditional secondary node (SN) addition or change (CSAC).

Aspect 24. One or more network nodes comprising processing hardware and configured to implement a method according to any aspects 13-23.

What is claimed is:

1. A configuration method in a user equipment (UE) in communication with a radio access network (RAN) in accordance with a first configuration, the method comprising:

receiving, by the UE and from the RAN via a signaling radio bearer 3 (SRB3), a conditional configuration for application in a conditional procedure when a corresponding condition is satisfied;

subsequently to the receiving of the conditional configuration, applying, by the UE, a second configuration received from the RAN, the second configuration being a non-conditional configuration;

detecting, by the UE and after applying the second configuration, a failure to execute the conditional procedure when the corresponding condition is satisfied; and in response to the detecting, continuing to apply the second configuration.

2. The method of claim 1, further comprising receiving, by the UE and subsequently to the continuing to apply, a third configuration from the RAN.

3. The method of claim 2, wherein:

the third configuration is a delta configuration; and the method further comprises augmenting the first configuration or the second configuration with the third configuration.

4. The method of claim 2, wherein:

the third configuration is a full configuration; and the method further comprises replacing the first configuration or the second configuration with the third configuration.

5. The method of claim 2, wherein the second configuration and the third configuration pertain to a same network node.

6. The method of claim 2, wherein the second configuration and the third configuration pertain to different network nodes.

7. The method of claim 1, wherein the conditional procedure is one of conditional primary secondary cell (PSCell) addition or change (CPAC), or conditional secondary node (SN) addition or change (CSAC).

8. A user equipment (UE) comprising processing hardware and configured to implement the method according to claim 1.

9. A method in a radio access network (RAN) for configuring a user equipment (UE) in communication with the RAN in accordance with a first configuration, the method comprising:

transmitting, by the RAN via a signaling radio bearer 3 (SRB3) and to the UE, a conditional configuration for application in a conditional procedure when a corresponding condition is satisfied;

subsequently to the transmitting of the conditional configuration, transmitting, by the RAN, a second configuration to the UE, the second configuration being a non-conditional configuration; and continuing to use the second configuration to communicate with the UE after the UE fails to perform the conditional procedure when the corresponding condition is satisfied.

10. The method of claim 9, further comprising receiving, by the RAN and from the UE, an indication that the UE has failed to perform the conditional procedure when the corresponding condition is satisfied, wherein continuing to use the second configuration includes continuing to use the second configuration in response to the indication.

11. The method of claim 9, further comprising generating, by the RAN, a third configuration for the UE.

12. The method of claim 11, wherein the third configuration is a delta configuration or a full configuration.

13. The method of claim 11, wherein the second configuration and the third configuration pertain to a same network node or to different network nodes.

14. The method of claim 9, wherein the conditional procedure is one of conditional primary secondary cell (PSCell) addition or change (CPAC), or conditional secondary node (SN) addition or change (CSAC).

15. One or more network nodes comprising processing hardware and configured to implement the method according to claim 9.

* * * * *